US010280336B2

(12) United States Patent
Shin et al.

(10) Patent No.: US 10,280,336 B2
(45) Date of Patent: May 7, 2019

(54) COATING METHOD FOR PREVENTING BENDING PHENOMENON OF SUBSTRATE

(71) Applicant: DONGJIN SEMICHEM. CO., LTD, Incheon (KR)

(72) Inventors: Kyu Soon Shin, Seongnam-si (KR); Hee Jung Jung, Seongnam-si (KR); Seung Sock Choi, Seongnam-si (KR)

(73) Assignee: DONGJIN SEMICHEM CO., LTD., Incheon (KR)

( * ) Notice: Subject to any disclaimer, the term of this patent is extended or adjusted under 35 U.S.C. 154(b) by 384 days.

(21) Appl. No.: 15/129,416

(22) PCT Filed: Mar. 31, 2015

(86) PCT No.: PCT/KR2015/003192
§ 371 (c)(1),
(2) Date: Oct. 13, 2016

(87) PCT Pub. No.: WO2015/152617
PCT Pub. Date: Oct. 8, 2015

(65) Prior Publication Data
US 2017/0174938 A1 Jun. 22, 2017

(30) Foreign Application Priority Data

Mar. 31, 2014 (KR) .................. 10-2014-0038126
Mar. 31, 2015 (KR) .................. 10-2015-0044976

(51) Int. Cl.
| *C09D 183/04* | (2006.01) |
| *B05D 7/04* | (2006.01) |
| *B05D 7/00* | (2006.01) |
| *C03C 17/30* | (2006.01) |
| *C08J 7/04* | (2006.01) |
| *C03C 17/32* | (2006.01) |
| *C03C 17/34* | (2006.01) |
| *B05D 5/00* | (2006.01) |

(52) U.S. Cl.
CPC ............. *C09D 183/04* (2013.01); *B05D 7/04* (2013.01); *B05D 7/53* (2013.01); *B05D 7/57* (2013.01); *C03C 17/30* (2013.01); *C03C 17/32* (2013.01); *C03C 17/3405* (2013.01); *C08J 7/042* (2013.01); *B05D 5/00* (2013.01); *B05D 7/52* (2013.01); *B05D 2201/00* (2013.01); *B05D 2203/20* (2013.01); *B05D 2203/35* (2013.01); *C08J 2369/00* (2013.01); *C08J 2483/04* (2013.01)

(58) Field of Classification Search
CPC ... C09D 183/04; C03C 17/32; C03C 17/3405; C03C 17/30; B05D 5/00; B05D 7/04; B05D 7/57; B05D 7/52; B05D 7/53; B05D 2203/35; B05D 2203/20; B05D 2201/00; C08J 7/042; C08J 2483/04; C08J 2369/00
See application file for complete search history.

(56) References Cited

U.S. PATENT DOCUMENTS

| 5,746,814 | A | 5/1998 | Malhotra | |
| 6,284,858 | B1* | 9/2001 | Fujiyama | ............... C08G 77/04 525/474 |
| 2002/0090572 | A1* | 7/2002 | Sooriyakumaran | ... G03F 7/0045 430/271.1 |
| 2004/0068075 | A1* | 4/2004 | Lichtenhan | ........... C07F 7/0874 528/15 |
| 2012/0058333 | A1 | 3/2012 | Yamamoto | |
| 2013/0072609 | A1 | 3/2013 | Haddad | |

FOREIGN PATENT DOCUMENTS

| KR | 10-1249798 | 4/2013 |
| WO | 2010-058987 | 5/2010 |

OTHER PUBLICATIONS

Lichtenhan et al.; Macromolecules, 1993, vol. 26, p. 2141-2142.*
Schwab et al.; Applied Organometallic Chemistry, 1998, vol. 12, p. 707-713.*

* cited by examiner

*Primary Examiner* — Robert S Jones
(74) *Attorney, Agent, or Firm* — Lex IP Meister, PLLC

(57) ABSTRACT

The present invention relates to a coating method for preventing warpage of a substrate, and more specifically, to a coating method for preventing substrate warpage comprising forming two or more coating layers by coating the surface of a substrate with coating compositions having different densities, wherein at least one layer of the two or more coating layers is coated and cured with a coating composition containing a silsesquioxane composite polymer represented by a specific chemical formula, thereby not only preventing substrate warpage but also providing high surface hardness, excellent transparency, scratch resistance, water repellent characteristics, anti-fouling characteristics, anti-fingerprint property, thermal stability and gloss characteristics to the surface of the substrate.

16 Claims, 2 Drawing Sheets

COATING METHOD FOR PREVENTING BENDING PHENOMENON OF SUBSTRATE

FIELD OF THE INVENTION

The present invention relates to a coating method for preventing warpage of a substrate, and more specifically, to a coating method for preventing substrate warpage comprising forming two or more coating layers by coating the surface of a substrate with coating compositions having different densities, wherein at least one layer of the two or more coating layers is coated and cured with a coating composition containing a silsesquioxane composite polymer represented by a specific chemical formula, thereby not only preventing substrate warpage but also providing high surface hardness, excellent transparency, scratch resistance, water repellent characteristics, anti-fouling characteristics, anti-fingerprint property, thermal stability and gloss characteristics to the surface of the substrate.

BACKGROUND OF THE INVENTION

Substrates such as plastics, glass, timber or paper are used for various purposes. However, warpage occurs in these substrates as the areas get bigger. Also, at first it had excellent flatness as the solid line of FIG. 1, but warpage may be generated as time goes by as the thick solid line of FIG. 1, and warpage maybe occurs when the surface of a substrate is coated with functional substances for providing functionality. Such substrate warpage may cause the malfunction of a device and also deteriorate its appearance thereby decreasing the overall product usefulness.

Previously, in order to prevent substrate warpage, a supporting fixture was installed on the substrate or a separate substrate of which the warpage is less was attached to the surface of the substrate, but lots of efforts were needed for most applications. Therefore, researches for preventing substrate warpage by a simple method such as coating are urgently in need.

SUMMARY OF THE INVENTION

In order to solve the above problems, it is an object of the present invention to provide a coating method for preventing substrate warpage through a simple coating process on the surface of a substrate whereby the warpage of the substrate can be prevented and at the same time, high surface hardness, excellent transparency, scratch resistance, water repellent characteristics, anti-fouling characteristics, anti-fingerprint property, thermal stability and gloss characteristics can be provided to the surface of the substrate, and a warpage preventing substrate.

Further, it is an object of the invention to provide an article comprising the warpage preventing substrate.

In order to achieve the above objects, the present invention provides a coating method for preventing substrate warpage comprising forming two or more coating layers by coating the surface of a substrate with coating compositions having different densities, wherein at least one layer of the two or more coating layers is coated and cured with a coating composition containing a silsesquioxane composite polymer represented by any one of the following chemical formulae 1 to 9:

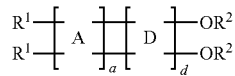

[Chemical formula 1]

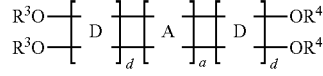

[Chemical formula 2]

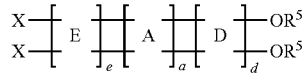

[Chemical formula 3]

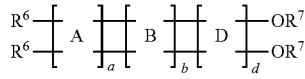

[Chemical formula 4]

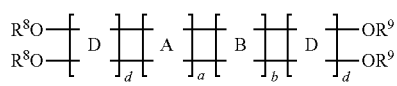

[Chemical formula 5]

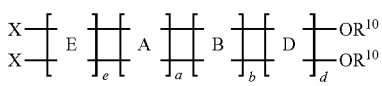

[Chemical formula 6]

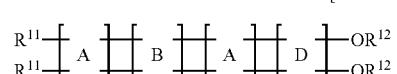

[Chemical formula 7]

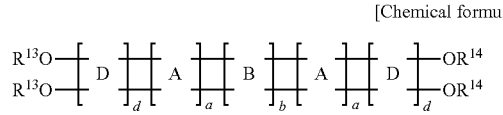

[Chemical formula 8]

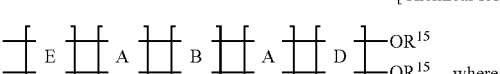

[Chemical formula 9]

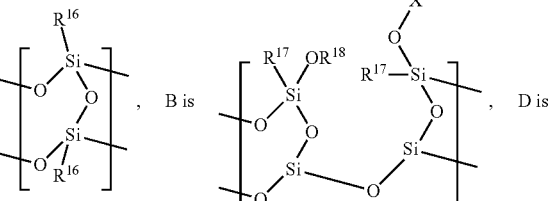

wherein, A is

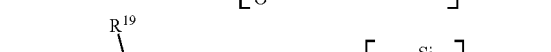

, B is

, D is

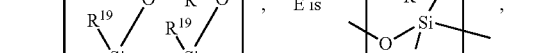

, E is

Y is each independently O, $NR^{21}$ or $[(SiO_{3/2}R)_{4+2n}O]$, with the proviso that at least one is $[(SiO_{3/2}R)_{4+2n}O]$, X is each independently $R^{22}$ or $[(SiO_{3/2}R)_{4+2n}R]$, with the proviso that at least one is $[(SiO_{3/2}R)_{4+2n}R]$, R, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ are each independently hydrogen; deuterium; halogen; amine group; epoxy group; cyclohexylepoxy group; (meth)acryl group; thiol group; isocyanate group; nitrile group; nitro group; phenyl group; alkyl group of $C_1$~$C_{40}$; alkenyl group of $C_2$~$C_{40}$; alkoxy group of $C_1$~$C_{40}$; cycloalkyl group of $C_3$~$C_{40}$; heterocycloalkyl group of $C_3$~$C_{40}$; aryl group of $C_6$~$C_{40}$; heteroaryl group of $C_3$~$C_{40}$; aralkyl group of $C_3$~$C_{40}$; aryloxy group of $C_3$~$C_{40}$; or arylthiol group of $C_3$~$C_{40}$ unsubstituted or substituted by deuterium, halogen, amine group, epoxy group, (meth)acryl group, thiol group, isocyanate group, nitrile group, nitro group, or phenyl group, and preferably, comprise alkyl group of $C_1$~$C_{40}$ or alkenyl group of $C_2$~$C_{40}$ unsubstituted or substituted by deuterium, halogen, amine group, (meth)acryl group, thiol group, isocyanate group, nitrile group, nitro group, phenyl group or cyclohexyl epoxy group, amine group, epoxy group, cyclohexyl epoxy group, (meth)acryl group, thiol group, phenyl group, or isocyanate group, a and d are each independently an integer of 1 to 100,000, preferably a is 3 to 1000 and d is 1 to 500, and more preferably a is 5 to 300 and d is 2 to 100, b is each independently an integer of 1 to 500, e is each independently 1 to 2, preferably 1, and n is each independently an integer of 1 to 20, preferably 3 to 10.

In another aspect, the invention provides a warpage preventing substrate comprising two or more coating layers formed by coating its surface with coating compositions having different densities wherein at least one of the coating layers is formed with a coating composition containing a silsesquioxane composite polymer represented by any one of the above chemical formulae 1 to 9.

In another aspect, the invention provides an article comprising the warpage preventing substrate.

The coating method for preventing substrate warpage in accordance with the present invention can prevent substrate warpage through a simple coating method and at the same time, it can provide high surface hardness, excellent transparency, scratch resistance, water repellent characteristics, anti-fouling characteristics, anti-fingerprint property, thermal stability and gloss characteristics to the surface of the substrate, thereby significantly improving the durability and the usefulness of the product.

DETAILED DESCRIPTION OF THE INVENTION

Figure 1:
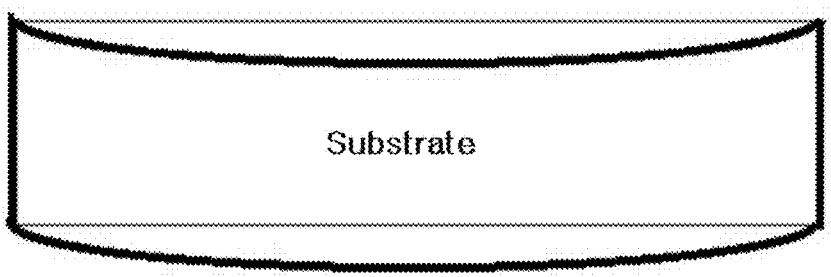
FIG. 1 is a schematic view showing substrate warpage according to the prior arts.

Hereinafter, the invention will be described in detail.

The present invention provides a coating method for preventing substrate warpage, comprising forming two or more coating layers by coating the surface of a substrate with coating compositions having different densities, wherein at least one layer of the two or more coating layers is coated and cured with a coating composition containing a silsesquioxane composite polymer represented by any one of the following chemical formulae 1 to 9:

[Chemical formula 1]
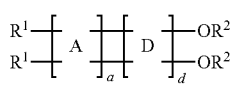

[Chemical formula 2]
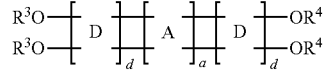

[Chemical formula 3]
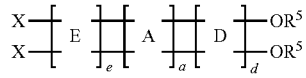

[Chemical formula 4]
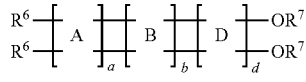

[Chemical formula 5]
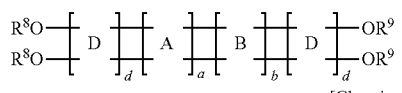

[Chemical formula 6]
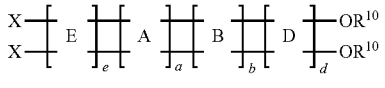

[Chemical formula 7]
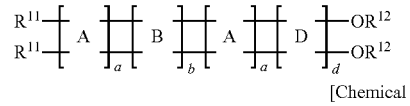

[Chemical formula 8]
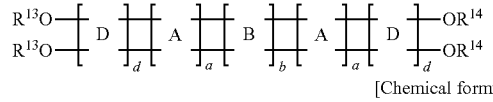

[Chemical formula 9]
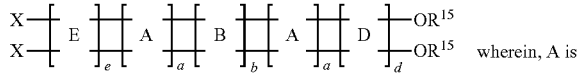

wherein, A is 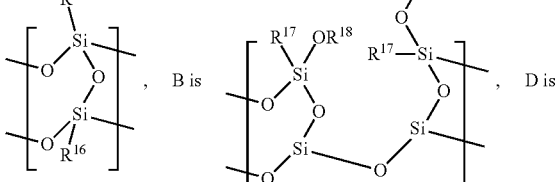, B is, D is

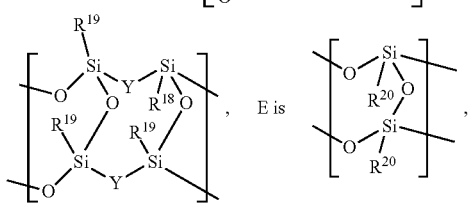, E is

Y is each independently O, $NR^{21}$ or $[(SiO_{3/2}R)_{4+2n}O]$, with the proviso that at least one is $[(SiO_{3/2}R)_{4+2n}O]$, X is each independently $R^{22}$ or $[(SiO_{3/2}R)_{4+2n}R]$, with the proviso that at least one is $[(SiO_{3/2}R)_{4+2n}R]$, R, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ are each independently hydrogen; deuterium; halogen; amine group; epoxy group; cyclohexylepoxy group; (meth)acryl group; thiol group; isocyanate group; nitrile group; nitro group; phenyl group; alkyl group of $C_1$~$C_{40}$; alkenyl group of $C_2$~$C_{40}$; alkoxy group of $C_1$~$C_{40}$; cycloalkyl group of $C_3$~$C_{40}$; heterocycloalkyl group of $C_3$~$C_{40}$; aryl group of $C_6$~$C_{40}$; heteroaryl group of $C_3$~$C_{40}$; aralkyl group of $C_3$~$C_{40}$; aryloxy group of $C_3$~$C_{40}$; or arylthiol group of $C_3$~$C_{40}$ unsubstituted or substituted by deuterium, halogen, amine group, epoxy group, (meth)acryl group, thiol group, isocyanate group, nitrile group, nitro group, or phenyl group, and preferably, comprise alkyl group of $C_1$~$C_{40}$ or alkenyl group of $C_2$~$C_{40}$ unsubstituted or substituted by deuterium, halogen, amine group, (meth)acryl group, thiol group, isocyanate group, nitrile group, nitro group, phenyl group or cyclohexyl epoxy group, amine group, epoxy group, cyclohexyl epoxy group, (meth)acryl group, thiol group, phenyl group, or isocyanate group, a and d are each independently an integer of 1 to 100,000, preferably a is 3 to 1000 and d is 1 to 500, and more preferably a is 5 to 300 and d is 2 to 100, b is each independently an integer of 1 to 500, e is each independently 1 to 2, preferably 1, and n is each independently an integer of 1 to 20, preferably 3 to 10.

The silsesquioxane composite polymer represented by the above chemical formula 1 of the invention may be prepared comprising a step 1 of mixing a basic catalyst and an organic solvent in a reactor and then adding an organic silane compound thereto and performing condensation to prepare the following chemical formula 10; a step 2 of adding an acidic catalyst to the reactor to adjust the reaction solution to acidic state in order to incorporate $[D]d(OR^2)_2$ structure into the chemical formula 10 after the step 1 and then adding an organic silane compound and stirring them; and a step 3 of adding a basic catalyst to the reactor after the step 2 to convert the reaction solution into its basic state and performing condensation reaction:

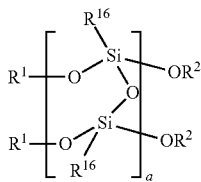

[Chemical formula 10]

wherein, $R^1$, $R^2$, $R^{16}$, D, a, and d are as defined in chemical formulae 1 to 9.

The silsesquioxane composite polymer represented by the above chemical formula 2 of the invention may be prepared comprising a step 1 of mixing a basic catalyst and an organic solvent in a reactor and then adding an organic silane compound thereto and performing condensation to prepare the above chemical formula 10; a step 2 of adding an acidic catalyst to the reactor to adjust the reaction solution to acidic state in order to incorporate $[D]d(OR^3)_2$ and $[D]d(OR^4)_2$ structures into the chemical formula 10 after the step 1, as in chemical formula 2 and then adding an excessive amount of an organic silane compound and stirring them; a step 3 of adding a basic catalyst to the reactor after the step 2 to convert the reaction solution into its basic state and performing condensation reaction: and a purification step of eliminating a cage structure, which is a single byproduct generated through the step 3 reaction, using recrystallization.

The silsesquioxane composite polymer represented by the above chemical formula 3 of the invention may be prepared comprising a step 1 of mixing a basic catalyst and an organic solvent in a reactor and then adding an organic silane compound thereto and performing condensation to prepare the above chemical formula 10; a step 2 of adding an acidic catalyst to the reactor to adjust the reaction solution to acidic state in order to incorporate $[D]d(OR^5)_2$ structure into the chemical formula 10 after the step 1 and then adding an organic silane compound and stirring them; a step 3 of adding a basic catalyst to the reactor after the step 2 to convert the reaction solution into its basic state and performing condensation reaction: and a step 4 of adding an acidic catalyst to the reactor in order to incorporate $[E]eX_2$ structure into a terminal of the composite polymer after the step 3 to convert the reaction solution into an acidic atmosphere and mixing it with an organic silane compound and then stirring them.

The silsesquioxane composite polymer represented by the above chemical formula 4 of the invention may be prepared comprising a step 1 of mixing a basic catalyst and an organic solvent in a reactor and then adding an organic silane compound thereto and adjusting a condensation rate to prepare the above chemical formula 10; a step 2 of adding an acidic catalyst to the reactor to adjust the reaction solution to acidic state in order to incorporate [B]b structure and $[D]d(OR^7)_2$ structure into the chemical formula 10 after the step 1 and then adding an organic silane compound and stirring them; and a step 3 of adding a basic catalyst to the reactor after the step 2 to convert the reaction solution into its basic state and performing condensation reaction.

The silsesquioxane composite polymer represented by the above chemical formula 5 of the invention may be prepared comprising a step 1 of mixing a basic catalyst and an organic solvent in a reactor and then adding an organic silane compound thereto and performing condensation to prepare the above chemical formula 10; a step 2 of adding an acidic catalyst to the reactor to adjust the reaction solution to acidic state in order to incorporate [B]b structure and $[D]d(OR^8)_2$ and $[D]d(OR^9)_2$ structures into the chemical formula 10 after the step 1 and then adding an excessive amount of an organic silane compound and stirring them; a step 3 of adding a basic catalyst to the reactor after the step 2 to convert the reaction solution into its basic state and performing condensation reaction: and a step 4 of eliminating a single cage formation structure, via recrystallization and filtering process after the step 3.

The silsesquioxane composite polymer represented by the above chemical formula 6 of the invention may be prepared comprising a step 1 of mixing a basic catalyst and an organic solvent in a reactor and then adding an organic silane compound thereto and performing condensation to prepare the above chemical formula 10; a step 2 of adding an acidic catalyst to the reactor to adjust the reaction solution to acidic state in order to incorporate [B]b structure and $[D]d(OR^{10})_2$ structure into the chemical formula 10 after the step 1 and then adding an organic silane compound and stirring them; a step 3 of adding a basic catalyst to the reactor after the step 2 to convert the reaction solution into its basic state and performing condensation reaction: and a step 4 of adding an acidic catalyst to the reactor in order to incorporate $[E]eX_2$ structure into a terminal of the composite polymer after the step 3 to convert the reaction solution into an acidic atmosphere and mixing it with an organic silane compound and then stirring them.

Preferably, in the methods of preparing the above chemical formulae 1 to 6, the pH of the reaction solution of the step 1 of the invention may be 9 to 11.5, the pH of the reaction solution of the step 2 may be 2 to 4, the pH of the reaction solution of the step 3 may be 8 to 11.5, and the pH of the reaction solution of the step 4 of incorporating Ee may be 1.5 to 4. If the pH is within the above ranges, it can not only provide higher yields of the silsesquioxane composite polymer to be produced but also improve the mechanical properties of the produced silsesquioxane composite polymer.

The silsesquioxane composite polymer represented by the above chemical formula 7 of the invention may be prepared comprising a step 1 of mixing a basic catalyst and an organic solvent in a reactor and then adding an organic silane compound thereto to prepare two types of the above chemical formula 10 of which the condensation rates are controlled; a step 2 of adding an acidic catalyst to the reactor to adjust the reaction solution to acidic state in order to incorporate [B]b structure and [D]d(OR$^{12}$)$_2$ structure into the chemical formula 10 obtained from the step 1 and then adding an organic silane compound and stirring them; a step 3 of adding a basic catalyst to the reactor after each reaction of the step 2 to convert the reaction solution into its basic state and performing condensation reaction: and a step 4 of condensing two or more substances obtained through the step 3 under basic condition to connect them.

The silsesquioxane composite polymer represented by the above chemical formula 8 of the invention may be prepared comprising a step 1 of mixing a basic catalyst and an organic solvent in a reactor and then adding an organic silane compound to prepare two types of the above chemical formula 10 of which the condensation rates are controlled; a step 2 of adding an acidic catalyst to the reactor to adjust the reaction solution to acidic state in order to incorporate [B]b structure and [D]d(OR$^{14}$)$_2$ structure into the chemical formula 10 obtained from the above step 1 and then adding an organic silane compound and stirring them; a step 3 of adding a basic catalyst to the reactor after each reaction of the above step 2 to convert the reaction solution into its basic state and performing condensation reaction; a step 4 of condensing two or more substances obtained through the above step 3 under basic condition to connect them; a step 5 of adding an acidic catalyst to adjust the reaction solution to acidic state in order to incorporate [D]d(OR$^{13}$)$_2$ structure after the step 4 and then adding an organic silane compound and stirring them; and a step 6 of adding a basic catalyst to the reactor after the reaction of the step 5 to convert the reaction solution into its basic state and performing condensation reaction.

The silsesquioxane composite polymer represented by the above chemical formula 9 of the invention may be prepared comprising a step 1 of mixing a basic catalyst and an organic solvent in a reactor and then adding an organic silane compound to prepare two types of the above chemical formula 10 of which the condensation rates are controlled; a step 2 of adding an acidic catalyst to the reactor to adjust the reaction solution to acidic state in order to incorporate [B]b structure into the chemical formula 10 obtained from the step 1 and then adding an organic silane compound and stirring them; a step 3 of adding a basic catalyst to the reactor after each reaction of the above step 2 to convert the reaction solution into its basic state and performing condensation reaction; a step 4 of condensing two or more substances obtained through the above step 3 under basic condition to connect them; a step 5 of adding an acidic catalyst to adjust the reaction solution to acidic state in order to incorporate [D]d(OR$^5$)$_2$ after the step 4 and then adding an organic silane compound and stirring them; a step 6 of adding a basic catalyst to the reactor after the reaction of the step 5 to convert the reaction solution into its basic state and performing condensation reaction; and a step 7 of adding an acidic catalyst to the reactor in order to incorporate [E]eX$_2$ structure to a terminal of the composite polymer after the step 6 to convert the reaction solution into an acidic atmosphere and mixing it with an organic silane compound and then stirring them.

Preferably, in the methods of preparing the above chemical formulae 7 to 9, the pH of the reaction solution of the step 1 of the invention may be 9 to 11.5, the pH of the reaction solution of the step 2 may be 2 to 4, the pH of the reaction solution of the step 3 may be 8 to 11.5, the pH of the reaction solution of the step 4 may be 9 to 11.5, the pH of the reaction solution of the step 5 may be 2 to 4, the pH of the reaction solution of the step 6 may be 8 to 11.5, and the pH of the reaction solution of the step 7 of incorporating Ee may be 1.5 to 4. If the pH is within the above ranges, it can not only provide higher yields of the silsesquioxane composite polymer to be produced but also improve the mechanical properties of the produced silsesquioxane composite polymer.

In addition, if necessary, in order to further incorporate [B]b structure and [D]d(OR)$_2$ structure into each of the composite polymers, it may further go through a step of adding an acidic catalyst to a reactor to adjust the reaction solution to acidic state and then adding an organic silane compound and stirring them; and a step of adding a basic catalyst to the reactor after the above step to convert the reaction solution into its basic state and performing condensation reaction, and thus include [B]b repeat units in the composite polymers.

In addition, if necessary, in order to incorporate [E]eX$_2$ structure into the terminal of each of the composite polymers, it may further comprise a step of adding an acidic catalyst to the reactor to convert the reaction solution into an acidic atmosphere, and mixing it with an organic silane compound and then stirring them, and thus include [E]e repeat units at the terminal of the composite polymers.

In the methods of preparing the silsesquioxane composite polymers, it is preferable to use a mixture catalyst of two or more basic catalysts as the basic catalyst, and it is neutralized and acidified with an acidic catalyst to induce re-hydrolysis, followed by condensation process under basic condition using a mixture catalyst of two or more basic catalysts again, whereby acidity and basicity can be successively adjusted in a single reactor.

The basic catalyst may be prepared by suitably combining two or more substances selected from a metal type basic catalyst selected from the group consisting of Li, Na, K, Ca and Ba, and an amine type basic catalyst. Preferably, the amine type basic catalyst may be tetramethylammonium hydroxide (TMAH), and the metal basic catalyst may be potassium hydroxide (KOH) or sodium bicarbonate (NaHCO$_3$). In the mixture catalyst, preferably, the content of each component may be optionally adjusted within such a range that the ratio of the amine type basic catalyst and the metal type basic catalyst can be 10 to 90:10 to 90 parts by weight. Within the above ranges, reactivity between functional groups and catalysts can be minimized during hydrolysis, thereby remarkably reducing defects of organic functional groups such as Si—OH or Si-alkoxy to achieve the advantage that the condensation rate can be freely adjusted. In addition, as the above acidic catalyst, any acidic substances ordinarily used in the pertinent art can be used without limitation, and for example, it may use ordinary acidic substances such as HCl, H$_2$SO$_4$, HNO$_3$, and CH$_3$COOH, and it may also use organic acidic substances such as lactic acid, tartaric acid, maleic acid, citric acid, and so on.

In the methods of preparing the silsesquioxane composite polymers of the invention, the organic solvent may use any organic solvent ordinarily used in the pertinent art, and for example, it may use not only alcohols such as methyl alcohol, ethyl alcohol, isopropyl alcohol, butyl alcohol, and cellosolve types, ketones such as acetone, and methyl (isobutyl) ethylketone, glycols such as ethyleneglycol, furans such as tetrahydrofuran, polar solvents such as dimethylformaldehyde, dimethylacetamide and N-methyl-2-pyrrolidone, but also various solvents such as hexane, cyclohexane, cyclohexanone, toluene, xylene, cresol, chloroform, dichlorobenzene, dimethylbenzene, trimethylbenzene, pyridine, methylnaphthalene, nitromethane, acrylonitrile, methylene chloride, octadecylamine, aniline, dimethyl sulfoxide, benzyl alcohol, etc.

Further, the organic silane-based compound may use an organic silane comprising R, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, or $R^{22}$ of chemical formulae 1 to 9 of the silsesquioxane composite polymer of the present invention, and preferably, it may use an organic silane compound comprising a phenyl group or an amino group which is effective for improving the non-swelling property by increasing chemical resistance of the silsesquioxane composite polymer, or an organic silane compound comprising an epoxy group or a (meth) acryl group which is effective for improving mechanical strength and hardness of the cured layer by increasing the cure density of the composite polymer.

Specific examples of the organic silane-based compound may include (3-glycidoxypropyl) trimethoxysilane, (3-glycidoxypropyl) triethoxysilane, (3-glycidoxypropyl) methyl dimethoxysilane, (3-glycidoxypropyl) dimethyl ethoxy silane, 3-(methacryloxy)propyl trimethoxysilane, 3,4-epoxy-butyl trimethoxysilane, 3,4-epoxy-butyl triethoxysilane, 2-(3,4-epoxycyclohexyl) ethyl trimethoxysilane, 2-(3, 4-epoxycyclohexyl) ethyl triethoxysilane, aminopropyl triethoxysilane, vinyl triethoxysilane, vinyl tri-t-butoxy silane, vinyl triisobutoxy silane, vinyl triisopropoxy silane, vinyl triphenoxy silane, phenyl triethoxysilane, phenyl trimethoxysilane, aminopropyl trimethoxysilane, N-phenyl-3-aminopropyl trimethoxysilane, dimethyl tetramethoxysiloxanne, diphenyltetramethoxysiloxane, and the like, and they may be used alone or in a combination of two or more. For the final composition to be prepared, it is more preferable to use a mixture of two or more types.

In the present invention, n of $[(SiO_{3/2}R)_{4+2n}O]$ structure incorporated into the repeat unit [D]d of the above chemical formulae may be substituted by an integer of 1 to 20, preferably, 3 to 10, and more preferably, the average n value is 4 to 5 and for example, when n is 4, the substituted structure may be represented by the following formula 11:

[Chemical formula 11]

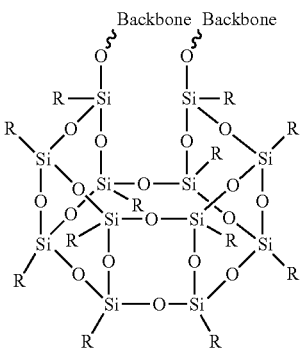

wherein, R is as defined in the above.

In the present invention, n of $[(SiO_{3/2}R)_{4+2n}R]$ structure incorporated into the repeat unit [B]b or [E]e of the above chemical formulae may be substituted by an integer of 1 to 20, preferably, 3 to 10, and more preferably, the average n value is 4 to 5 and for example, when n is 4, the substituted structure may be represented by the following formula 12:

[Chemical formula 12]

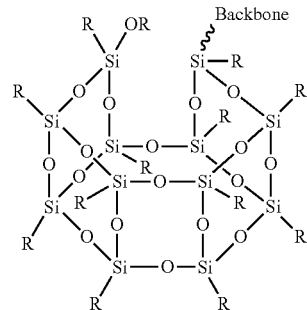

wherein, R is as defined in the above.

As specific examples, the silsesquioxane composite polymers in accordance with the present invention may be polymers listed in Tables 1 to 18 below. In the Tables 1 to 9, ECHE refers to (epoxycyclohexyl)ethyl, GlyP refers to glycidoxypropyl, and POMMA refers to (methacryloyloxy) propyl, and when two or more are listed, it refers to the use of their mixture. n is each independently 1 to 8.

The silsesquioxane composite polymer of the above chemical formula 1 may be polymers listed in the following Table 1 or 2.

TABLE 1

| No | R1 | R2 | R16 | R19 | R of Y |
|---|---|---|---|---|---|
| 1-1 | OH, methoxy | H, methyl | ECHE | ECHE | ECHE |
| 1-2 | OH, methoxy | H, methyl | Phenyl | Phenyl | Phenyl |
| 1-3 | OH, methoxy | H, methyl | Methyl | Methyl | Methyl |
| 1-4 | OH, methoxy | H, methyl | GlyP | GlyP | GlyP |
| 1-5 | OH, methoxy | H, methyl | POMMA | POMMA | POMMA |
| 1-6 | OH, methoxy | H, methyl | ECHE | Phenyl | Phenyl |
| 1-7 | OH, methoxy | H, methyl | ECHE | Methyl | Methyl |
| 1-8 | OH, methoxy | H, methyl | ECHE | GlyP | GlyP |
| 1-9 | OH, methoxy | H, methyl | ECHE | POMMA | POMMA |
| 1-10 | OH, methoxy | H, methyl | Phenyl | ECHE | ECHE |
| 1-11 | OH, methoxy | H, methyl | Phenyl | Methyl | Methyl |
| 1-12 | OH, methoxy | H, methyl | Phenyl | GlyP | GlyP |
| 1-13 | OH, methoxy | H, methyl | Phenyl | POMMA | POMMA |
| 1-14 | OH, methoxy | H, methyl | Methyl | ECHE | ECHE |
| 1-15 | OH, methoxy | H, methyl | Methyl | Phenyl | Phenyl |
| 1-16 | OH, methoxy | H, methyl | Methyl | GlyP | GlyP |
| 1-17 | OH, methoxy | H, methyl | Methyl | POMMA | POMMA |
| 1-18 | OH, methoxy | H, methyl | GlyP | ECHE | ECHE |
| 1-19 | OH, methoxy | H, methyl | GlyP | Phenyl | Phenyl |
| 1-20 | OH, methoxy | H, methyl | GlyP | Methyl | Methyl |
| 1-21 | OH, methoxy | H, methyl | GlyP | POMMA | POMMA |
| 1-22 | OH, methoxy | H, methyl | POMMA | ECHE | ECHE |

TABLE 1-continued

| No | R1 | R2 | R16 | R19 | R of Y |
|---|---|---|---|---|---|
| 1-23 | OH, methoxy | H, methyl | POMMA | Phenyl | Phenyl |
| 1-24 | OH, methoxy | H, methyl | POMMA | Methyl | Methyl |
| 1-25 | OH, methoxy | H, methyl | POMMA | GlyP | GlyP |

TABLE 2

| No | R1 | R2 | R16 | R19 | R of Y | n |
|---|---|---|---|---|---|---|
| 2-1 | OH, methoxy | H, methyl | ECHE | Alkylthiol | ECHE | 1~8 |
| 2-2 | OH, CF$_3$ | H, ethyl | Phenyl | Phenyl | Phenyl | 1~8 |
| 2-3 | OH, methoxy | H, acetyl | Alkylthiol | Methyl | Methyl | 1~8 |
| 2-4 | CF$_3$, methoxy | Vinyl, methyl | GlyP | Dodecyl | GlyP | 1~8 |
| 2-5 | OH, methoxy | H, methyl | POMMA | Alkylthiol | POMMA | 1~8 |
| 2-6 | OH, C$_8$F$_{13}$ | H, F | ECHE | Phenyl | Phenyl | 1~8 |
| 2-7 | OH, CF$_3$ | CF$_3$, methyl | ECHE | Octyl | Methyl | 1~8 |
| 2-8 | OH, C$_8$F$_{13}$ | H, methyl | F | Alkylthiol | GlyP | 1~8 |
| 2-9 | OH, methoxy | H, CF$_3$ | ECHE | POMMA | POMMA | 1~8 |
| 2-10 | OH, methoxy | H, methyl | Phenyl | Alkylthiol | ECHE | 1~8 |
| 2-11 | OH, C$_8$F$_{13}$ | Aryl, methyl | Alkylthiol | Methyl | Hexyl | 1~8 |
| 2-12 | OH, alkylthiol | H, methacryl | Phenyl | GlyP | GlyP | 1~8 |
| 2-13 | OH, methoxy | H, methyl | Alkylthiol | POMMA | POMMA | 1~8 |
| 2-14 | OH, acryl | H, octyl | Methyl | ECHE | Aminopropyl | 1~8 |
| 2-15 | Vinyl, methoxy | H, methyl | Methyl | Alkylthiol | Phenyl | 1~8 |
| 2-16 | Alkylamine | H, methyl | Methyl | GlyP | GlyP | 1~8 |
| 2-17 | OH, ethyl, methyl | Alkylthiol, methyl | Methyl | POMMA | POMMA | 1~8 |
| 2-18 | Acetoxy, methoxy | H, methyl | GlyP | ECHE | Aminopropyl | 1~8 |
| 2-19 | Propoxy, methoxy | H, CF$_3$ | GlyP | Phenyl | Phenyl | 1~8 |
| 2-20 | OH, methoxy | H, methyl | Aminopropyl | Methyl | Octyl | 1~8 |
| 2-21 | C$_8$F$_{13}$, methoxy | C$_8$F$_{13}$, methyl | GlyP | POMMA | POMMA | 1~8 |
| 2-22 | OH, aryl | H, propyl | POMMA | Propyl | ECHE | 1~8 |
| 2-23 | OH, methoxy | F, methyl | POMMA | Phenyl | Phenyl | 1~8 |
| 2-24 | CF$_3$, methacryl | H, methyl | POMMA | Methyl | Methyl | 1~8 |
| 2-25 | OH, methoxy | H, ethyl | Aminopropyl | GlyP | GlyP | 1~8 |

As specific examples, the silsesquioxane composite polymer of the above chemical formula 2 may be polymers listed in the following Tables 3 and 4.

TABLE 3

| No | R3 | R4 | R16 | R19 | R of Y |
|---|---|---|---|---|---|
| 3-1 | H, methyl | H, methyl | ECHE | ECHE | ECHE |
| 3-2 | H, methyl | H, methyl | Phenyl | Phenyl | Phenyl |
| 3-3 | H, methyl | H, methyl | Methyl | Methyl | Methyl |
| 3-4 | H, methyl | H, methyl | GlyP | GlyP | GlyP |
| 3-5 | H, methyl | H, methyl | POMMA | POMMA | POMMA |
| 3-6 | H, methyl | H, methyl | ECHE | Phenyl | Phenyl |
| 3-7 | H, methyl | H, methyl | ECHE | Methyl | Methyl |
| 3-8 | H, methyl | H, methyl | ECHE | GlyP | GlyP |
| 3-9 | H, methyl | H, methyl | ECHE | POMMA | POMMA |
| 3-10 | H, methyl | H, methyl | Phenyl | ECHE | ECHE |
| 3-11 | H, methyl | H, methyl | Phenyl | Methyl | Methyl |
| 3-12 | H, methyl | H, methyl | Phenyl | GlyP | GlyP |
| 3-13 | H, methyl | H, methyl | Phenyl | POMMA | POMMA |
| 3-14 | H, methyl | H, methyl | Methyl | ECHE | ECHE |
| 3-15 | H, methyl | H, methyl | Methyl | Phenyl | Phenyl |
| 3-16 | H, methyl | H, methyl | Methyl | GlyP | GlyP |
| 3-17 | H, methyl | H, methyl | Methyl | POMMA | POMMA |
| 3-18 | H, methyl | H, methyl | GlyP | ECHE | ECHE |
| 3-19 | H, methyl | H, methyl | GlyP | Phenyl | Phenyl |
| 3-20 | H, methyl | H, methyl | GlyP | Methyl | Methyl |
| 3-21 | H, methyl | H, methyl | GlyP | POMMA | POMMA |
| 3-22 | H, methyl | H, methyl | POMMA | ECHE | ECHE |
| 3-23 | H, methyl | H, methyl | POMMA | Phenyl | Phenyl |
| 3-24 | H, methyl | H, methyl | POMMA | Methyl | Methyl |
| 3-25 | H, methyl | H, methyl | POMMA | GlyP | GlyP |

TABLE 4

| No | R3 | R4 | R16 | R19 | R of Y |
|---|---|---|---|---|---|
| 4-1 | OH, methoxy | H, methyl | ECHE | Alkylthiol | ECHE |
| 4-2 | OH, CF₃ | H, ethyl | Phenyl | Phenyl | Phenyl |
| 4-3 | OH, methoxy | H, acetyl | Alkylthiol | Methyl | Methyl |
| 4-4 | CF₃, methoxy | Vinyl, methyl | POMMA | Dodecyl | GlyP |
| 4-5 | OH, acryl | H, methyl | POMMA | Alkylthiol | Octyl |
| 4-6 | Vinyl, methoxy | H, F | ECHE | Phenyl | POMMA |
| 4-7 | Alkylamine | CF₃, methyl | ECHE | Octyl | Methyl |
| 4-8 | OH, ethyl, methyl | H, methyl | F | Aminopropyl | GlyP |
| 4-9 | Acetoxy, methoxy | H, CF₃ | Aminopropyl | POMMA | Hexyl |
| 4-10 | Propoxy, methoxy | H, methyl | Phenyl | Alkylthiol | ECHE |
| 4-11 | OH, C₈F₁₃ | Aryl, methyl | Alkylthiol | Methyl | Hexyl |
| 4-12 | OH, methoxy | H, methacryl | Phenyl | GlyP | GlyP |
| 4-13 | CF₃, methoxy | H, methyl | Octyl | POMMA | POMMA |
| 4-14 | OH, acryl | H, octyl | Methyl | ECHE | Aminopropyl |
| 4-15 | Vinyl, methoxy | H, methyl | Octyl | Alkylthiol | Phenyl |
| 4-16 | Alkylamine | H, methyl | Octyl | GlyP | GlyP |
| 4-17 | OH, methoxy | Alkylthiol, methyl | Methyl | POMMA | POMMA |
| 4-18 | Acetoxy, methoxy | H, methyl | GlyP | ECHE | Aminopropyl |
| 4-19 | Propoxy, methoxy | H, CF₃ | GlyP | Aminopropyl | Phenyl |
| 4-20 | OH, methoxy | H, methyl | Aminopropyl | Methyl | Octyl |
| 4-21 | Propoxy, methoxy | C₈F₁₃, methyl | GlyP | POMMA | POMMA |
| 4-22 | OH, methoxy | H, propyl | POMMA | Propyl | ECHE |
| 4-23 | C₈F₁₃, methoxy | F, methyl | POMMA | Phenyl | Phenyl |
| 4-24 | OH, aryl | H, methyl | GlyP | Methyl | GlyP |
| 4-25 | OH, methoxy | H, ethyl | Aminopropyl | GlyP | GlyP |

As specific examples, the silsesquioxane composite polymer of the above chemical formula 3 may be polymers listed in the following Table 5 or 6.

TABLE 5

| No | R5 | R16 | R19 | R20 | R of Y | R of X |
|---|---|---|---|---|---|---|
| 5-1 | H, methyl | ECHE | ECHE | ECHE | ECHE | ECHE |
| 5-2 | H, methyl | Phenyl | Phenyl | Phenyl | Phenyl | Phenyl |
| 5-3 | H, methyl | Methyl | Methyl | Methyl | Methyl | Methyl |
| 5-4 | H, methyl | GlyP | EGCDX | GlyP | EGCDX | GlyP |
| 5-5 | H, methyl | POMMA | POMMA | POMMA | POMMA | POMMA |
| 5-6 | H, methyl | ECHE | ECHE | Phenyl | ECHE | Phenyl |
| 5-7 | H, methyl | ECHE | ECHE | Methyl | ECHE | Methyl |
| 5-8 | H, methyl | ECHE | ECHE | GlyP | ECHE | GlyP |
| 5-9 | H, methyl | ECHE | ECHE | POMMA | ECHE | POMMA |
| 5-10 | H, methyl | ECHE | Phenyl | ECHE | Phenyl | ECHE |
| 5-11 | H, methyl | ECHE | Methyl | ECHE | Methyl | ECHE |
| 5-12 | H, methyl | ECHE | GlyP | ECHE | GlyP | ECHE |
| 5-13 | H, methyl | ECHE | POMMA | ECHE | POMMA | ECHE |
| 5-14 | H, methyl | Phenyl | Phenyl | ECHE | Phenyl | ECHE |
| 5-15 | H, methyl | Phenyl | Phenyl | Methyl | Phenyl | Methyl |
| 5-16 | H, methyl | Phenyl | Phenyl | EGDCX | Phenyl | EGDCX |
| 5-17 | H, methyl | Phenyl | Phenyl | POMMA | Phenyl | POMMA |
| 5-18 | H, methyl | Phenyl | ECHE | Phenyl | ECHE | Phenyl |
| 5-19 | H, methyl | Phenyl | Methyl | Phenyl | Methyl | Phenyl |
| 5-20 | H, methyl | Phenyl | GlyP | Phenyl | GlyP | Phenyl |
| 5-21 | H, methyl | Phenyl | POMMA | Phenyl | POMMA | Phenyl |
| 5-22 | H, methyl | Methyl | Methyl | ECHE | Methyl | ECHE |
| 5-23 | H, methyl | Methyl | Methyl | Phenyl | Methyl | Phenyl |
| 5-25 | H, methyl | Methyl | Methyl | GlyP | Methyl | GlyP |
| 5-25 | H, methyl | Methyl | Methyl | POMMA | Methyl | POMMA |
| 5-26 | H, methyl | Methyl | ECHE | Methyl | ECHE | Methyl |

TABLE 5-continued

| No | R5 | R16 | R19 | R20 | R of Y | R of X |
|---|---|---|---|---|---|---|
| 5-27 | H, methyl | Methyl | Phenyl | Methyl | Phenyl | Methyl |
| 5-28 | H, methyl | Methyl | GlyP | Methyl | GlyP | Methyl |
| 5-29 | H, methyl | Methyl | POMMA | Methyl | POMMA | Methyl |
| 5-30 | H, methyl | GlyP | GlyP | ECHE | GlyP | ECHE |
| 5-31 | H, methyl | GlyP | GlyP | Phenyl | GlyP | Phenyl |
| 5-32 | H, methyl | GlyP | GlyP | Methyl | GlyP | Methyl |
| 5-33 | H, methyl | GlyP | GlyP | POMMA | GlyP | POMMA |
| 5-34 | H, methyl | GlyP | ECHE | GlyP | ECHE | GlyP |
| 5-35 | H, methyl | GlyP | Phenyl | GlyP | Phenyl | GlyP |
| 5-36 | H, methyl | GlyP | Methyl | GlyP | Methyl | GlyP |
| 5-37 | H, methyl | GlyP | POMMA | GlyP | POMMA | GlyP |
| 5-35 | H, methyl | POMMA | POMMA | ECHE | POMMA | ECHE |
| 5-39 | H, methyl | POMMA | POMMA | Phenyl | POMMA | Phenyl |
| 5-40 | H, methyl | POMMA | POMMA | Methyl | POMMA | Methyl |
| 5-41 | H, methyl | POMMA | POMMA | GlyP | POMMA | GlyP |
| 5-42 | H, methyl | POMMA | ECHE | POMMA | ECHE | POMMA |
| 5-43 | H, methyl | POMMA | Phenyl | POMMA | Phenyl | POMMA |
| 5-44 | H, methyl | POMMA | Methyl | POMMA | Methyl | POMMA |
| 5-45 | H, methyl | POMMA | GlyP | POMMA | GlyP | POMMA |

TABLE 6

| No | R5 | R16 | R19 | R20 | R of Y | R of X |
|---|---|---|---|---|---|---|
| 6-1 | H, methyl | ECHE | ECHE | ECHE | ECHE | ECHE |
| 6-2 | H, ethyl | Phenyl | Phenyl | Phenyl | Phenyl | Phenyl |
| 6-3 | H, acetyl | Alkylthiol | Methyl | Methyl | Methyl | Methyl |
| 6-4 | Vinyl, methyl | POMMA | Dodecyl | GlyP | EGCDX | GlyP |
| 6-5 | H, methyl | POMMA | Alkylthiol | POMMA | POMMA | POMMA |
| 6-6 | H, F | ECHE | Phenyl | Phenyl | ECHE | Phenyl |
| 6-7 | $CF_3$, methyl | ECHE | Octyl | Methyl | ECHE | Methyl |
| 6-8 | H, methyl | F | Aminopropyl | GlyP | ECHE | GlyP |
| 6-9 | H, $CF_3$ | Aminopropyl | POMMA | POMMA | ECHE | POMMA |
| 6-10 | H, methyl | Phenyl | Alkylthiol | ECHE | Phenyl | ECHE |
| 6-11 | Aryl, methyl | Alkylthiol | Methyl | ECHE | Methyl | ECHE |
| 6-12 | H, methacryl | Phenyl | GlyP | ECHE | GlyP | ECHE |
| 6-13 | H, methyl | Octyl | POMMA | ECHE | POMMA | ECHE |
| 6-14 | H, octyl | Methyl | ECHE | ECHE | Phenyl | ECHE |
| 6-15 | H, methyl | Octyl | Alkylthiol | Methyl | Phenyl | Methyl |
| 6-16 | H, methyl | Octyl | GlyP | EGDCX | Phenyl | EGDCX |
| 6-17 | Alkylthiol, methyl | Methyl | POMMA | POMMA | Phenyl | POMMA |
| 6-18 | H, methyl | GlyP | GlyP | Phenyl | ECHE | Phenyl |
| 6-19 | H, $CF_3$ | POMMA | POMMA | Phenyl | Methyl | Phenyl |
| 6-20 | H, methyl | ECHE | Aminopropyl | Phenyl | GlyP | Phenyl |
| 6-21 | $C_8F_{13}$, methyl | Alkylthiol | Phenyl | Phenyl | POMMA | Phenyl |
| 6-22 | H, propyl | GlyP | GlyP | ECHE | Methyl | ECHE |
| 6-23 | F, methyl | POMMA | POMMA | Phenyl | Methyl | Phenyl |
| 6-24 | H, methyl | ECHE | Aminopropyl | GlyP | Methyl | GlyP |
| 6-25 | H, ethyl | Aminopropyl | Phenyl | POMMA | Methyl | POMMA |
| 6-26 | H, acetyl | Methyl | Octyl | Methyl | ECHE | Methyl |
| 6-27 | Vinyl, methyl | POMMA | POMMA | Methyl | Phenyl | Methyl |
| 6-28 | H, methyl | Methyl | Methyl | Methyl | GlyP | Methyl |
| 6-29 | H, F | Dodecyl | GlyP | Methyl | POMMA | Methyl |
| 6-30 | $CF_3$, methyl | Alkylthiol | Octyl | ECHE | GlyP | ECHE |
| 6-31 | H, methyl | Phenyl | POMMA | Phenyl | GlyP | Phenyl |
| 6-32 | H, octyl | Octyl | Methyl | Methyl | GlyP | Methyl |
| 6-33 | H, methyl | Aminopropyl | GlyP | POMMA | GlyP | POMMA |
| 6-34 | H, methyl | POMMA | Hexyl | GlyP | ECHE | GlyP |
| 6-35 | H, acetyl | Alkylthiol | ECHE | GlyP | Phenyl | GlyP |
| 6-36 | Vinyl, methyl | Methyl | Hexyl | GlyP | Methyl | GlyP |
| 6-37 | H, methyl | GlyP | GlyP | GlyP | POMMA | GlyP |
| 6-38 | H, F | POMMA | POMMA | ECHE | POMMA | ECHE |
| 6-39 | $CF_3$, methyl | ECHE | Aminopropyl | Phenyl | POMMA | Phenyl |
| 6-40 | H, methyl | Alkylthiol | Phenyl | Methyl | POMMA | Methyl |
| 6-41 | Vinyl, methyl | GlyP | GlyP | GlyP | POMMA | GlyP |
| 6-42 | H, methyl | POMMA | POMMA | POMMA | ECHE | POMMA |
| 6-43 | H, F | ECHE | Aminopropyl | POMMA | Phenyl | POMMA |
| 6-44 | $CF_3$, methyl | Aminopropyl | Phenyl | POMMA | Methyl | POMMA |
| 6-45 | H, methyl | POMMA | GlyP | POMMA | GlyP | POMMA |

As specific examples, the silsesquioxane composite polymer of the above chemical formula 4 may be polymers listed in the following Tables 7 and 8.

TABLE 7

| No | R6 | R7 | R16 | R17 | R18 | R19 | R of X | R of Y |
|---|---|---|---|---|---|---|---|---|
| 7-1 | OH, methoxy | H, methyl | ECHE | ECHE | H, methyl | ECHE | ECHE | ECHE |
| 7-2 | OH, methoxy | H, methyl | Phenyl | Phenyl | H, methyl | Phenyl | Phenyl | Phenyl |
| 7-3 | OH, methoxy | H, methyl | Methyl | Methyl | H, methyl | Methyl | Methyl | Methyl |
| 7-4 | OH, methoxy | H, methyl | GlyP | GlyP | H, methyl | GlyP | GlyP | GlyP |
| 7-5 | OH, methoxy | H, methyl | POMMA | POMMA | H, methyl | POMMA | POMMA | POMMA |
| 7-6 | OH, methoxy | H, methyl | ECHE | ECHE | H, methyl | Phenyl | ECHE | Phenyl |
| 7-7 | OH, methoxy | H, methyl | ECHE | ECHE | H, methyl | Methyl | ECHE | Methyl |
| 7-8 | OH, methoxy | H, methyl | ECHE | ECHE | H, methyl | GlyP | ECHE | GlyP |
| 7-9 | OH, methoxy | H, methyl | ECHE | ECHE | H, methyl | POMMA | ECHE | POMMA |
| 7-10 | OH, methoxy | H, methyl | Phenyl | Phenyl | H, methyl | ECHE | Phenyl | ECHE |
| 7-11 | OH, methoxy | H, methyl | Phenyl | Phenyl | H, methyl | Methyl | Phenyl | Methyl |
| 7-12 | OH, methoxy | H, methyl | Phenyl | Phenyl | H, methyl | GlyP | Phenyl | GlyP |
| 7-13 | OH, methoxy | H, methyl | Phenyl | Phenyl | H, methyl | POMMA | Phenyl | POMMA |
| 7-14 | OH, methoxy | H, methyl | Methyl | Methyl | H, methyl | ECHE | Methyl | ECHE |
| 7-15 | OH, methoxy | H, methyl | Methyl | Methyl | H, methyl | Phenyl | Methyl | Phenyl |
| 7-16 | OH, methoxy | H, methyl | Methyl | Methyl | H, methyl | GlyP | Methyl | GlyP |
| 7-17 | OH, methoxy | H, methyl | Methyl | Methyl | H, methyl | POMMA | Methyl | POMMA |
| 7-18 | OH, methoxy | H, methyl | GlyP | GlyP | H, methyl | ECHE | GlyP | ECHE |
| 7-19 | OH, methoxy | H, methyl | GlyP | GlyP | H, methyl | Phenyl | GlyP | Phenyl |
| 7-20 | OH, methoxy | H, methyl | GlyP | GlyP | H, methyl | Methyl | GlyP | Methyl |
| 7-21 | OH, methoxy | H, methyl | GlyP | GlyP | H, methyl | POMMA | GlyP | POMMA |
| 7-22 | OH, methoxy | H, methyl | POMMA | POMMA | H, methyl | ECHE | POMMA | ECHE |
| 7-23 | OH, methoxy | H, methyl | POMMA | POMMA | H, methyl | Phenyl | POMMA | Phenyl |
| 7-24 | OH, methoxy | H, methyl | POMMA | POMMA | H, methyl | Methyl | POMMA | Methyl |
| 7-25 | OH, methoxy | H, methyl | POMMA | POMMA | H, methyl | GlyP | POMMA | GlyP |

TABLE 8

| No | R6 | R7 | R16 | R17 | R18 | R19 | R of X | R of Y |
|---|---|---|---|---|---|---|---|---|
| 8-1 | OH, methoxy | H, methyl | ECHE | Alkylthiol | H, methyl | ECHE | Alkylthiol | ECHE |
| 8-2 | OH, $CF_3$ | H, ethyl | ECHE | Phenyl | H, octyl | Phenyl | Phenyl | Phenyl |
| 8-3 | OH, methoxy | H, acetyl | ECHE | Methyl | H, methyl | Methyl | Methyl | Methyl |
| 8-4 | $CF_3$, methoxy | Vinyl, methyl | Phenyl | GlyP | H, methyl | GlyP | GlyP | GlyP |
| 8-5 | OH, methoxy | H, methyl | Phenyl | POMMA | Alkylthiol, methyl | POMMA | POMMA | POMMA |
| 8-6 | OH, $C_8F_{13}$ | H, F | Phenyl | ECHE | H, methyl | Phenyl | ECHE | Phenyl |
| 8-7 | OH, $CF_3$ | $CF_3$, methyl | ECHE | ECHE | H, $CF_3$ | Methyl | ECHE | Methyl |
| 8-8 | OH, $C_8F_{13}$ | H, methyl | Hexyl | ECHE | H, ethyl | GlyP | ECHE | GlyP |
| 8-9 | OH, methoxy | H, $CF_3$ | GlyP | ECHE | H, acetyl | POMMA | ECHE | POMMA |
| 8-10 | OH, methoxy | H, methyl | POMMA | Phenyl | Vinyl, methyl | ECHE | Phenyl | ECHE |
| 8-11 | OH, $C_8F_{13}$ | Aryl, methyl | Aryl | Aminopropyl | Phenyl | H, methyl | Hexyl | Phenyl | Hexyl |

TABLE 8-continued

| No | R6 | R7 | R16 | R17 | R18 | R19 | R of X | R of Y |
|---|---|---|---|---|---|---|---|---|
| 8-12 | OH, alkylthiol | H, methacryl | Phenyl | Phenyl | H, F | GlyP | Phenyl | GlyP |
| 8-13 | OH, methoxy | H, methyl | GlyP | ECHE | Vinyl, methyl | POMMA | Phenyl | POMMA |
| 8-14 | OH, acryl | H, octyl | POMMA | Hexyl | H, methyl | Aminopropyl | Methyl | Aminopropyl |
| 8-15 | Vinyl, methoxy | H, methyl | Aminopropyl | GlyP | H, F | Phenyl | Methyl | Phenyl |
| 8-16 | Alkylamine | H, methyl | Phenyl | POMMA | $CF_3$, methyl | GlyP | Methyl | GlyP |
| 8-17 | OH, ethyl, methyl | Alkylthiol, methyl | Octyl | Aminopropyl | H, methyl | POMMA | Methyl | POMMA |
| 8-18 | Acetoxy, methoxy | H, methyl | POMMA | Phenyl | H, $CF_3$ | Aminopropyl | GlyP | Aminopropyl |
| 8-19 | Propoxy, methoxy | H, $CF_3$ | ECHE | GlyP | H, methyl | Phenyl | GlyP | Phenyl |
| 8-20 | OH, methoxy | H, methyl | Phenyl | POMMA | H, methyl | Octyl | GlyP | Octyl |
| 8-21 | $C_8F_{13}$, methoxy | $C_8F_{13}$, methyl | Methyl | Aminopropyl | H, methyl | POMMA | GlyP | POMMA |
| 8-22 | OH, aryl | H, propyl | GlyP | Phenyl | Alkylthiol, methyl | ECHE | POMMA | ECHE |
| 8-23 | OH, methoxy | F, methyl | POMMA | Octyl | H, methyl | Phenyl | POMMA | Phenyl |
| 8-24 | $CF_3$, methacryl | H, methyl | POMMA | POMMA | H, $CF_3$ | Methyl | POMMA | Methyl |
| 8-25 | OH, methoxy | H, ethyl | POMMA | ECHE | H, methyl | GlyP | POMMA | GlyP |

As specific examples, the silsesquioxane composite polymer of the above chemical formula 5 may be polymers listed in the following Tables 9 and 10.

TABLE 9

| No | R8 | R9 | R16 | R17 | R18 | R19 | R of X | R of Y |
|---|---|---|---|---|---|---|---|---|
| 9-1 | H, methyl | H, methyl | ECHE | ECHE | H, methyl | ECHE | ECHE | ECHE |
| 9-2 | H, methyl | H, methyl | Phenyl | Phenyl | H, methyl | Phenyl | Phenyl | Phenyl |
| 9-3 | H, methyl | H, methyl | Methyl | Methyl | H, methyl | Methyl | Methyl | Methyl |
| 9-4 | H, methyl | H, methyl | GlyP | GlyP | H, methyl | GlyP | GlyP | GlyP |
| 9-5 | H, methyl | H, methyl | POMMA | POMMA | H, methyl | POMMA | POMMA | POMMA |
| 9-6 | H, methyl | H, methyl | ECHE | ECHE | H, methyl | Phenyl | ECHE | Phenyl |
| 9-7 | H, methyl | H, methyl | ECHE | ECHE | H, methyl | Methyl | ECHE | Methyl |
| 9-8 | H, methyl | H, methyl | ECHE | ECHE | H, methyl | GlyP | ECHE | GlyP |
| 9-9 | H, methyl | H, methyl | ECHE | ECHE | H, methyl | POMMA | ECHE | POMMA |
| 9-10 | H, methyl | H, methyl | Phenyl | Phenyl | H, methyl | ECHE | Phenyl | ECHE |
| 9-11 | H, methyl | H, methyl | Phenyl | Phenyl | H, methyl | Methyl | Phenyl | Methyl |
| 9-12 | H, methyl | H, methyl | Phenyl | Phenyl | H, methyl | GlyP | Phenyl | GlyP |
| 9-13 | H, methyl | H, methyl | Phenyl | Phenyl | H, methyl | POMMA | Phenyl | POMMA |
| 9-14 | H, methyl | H, methyl | Methyl | Methyl | H, methyl | ECHE | Methyl | ECHE |
| 9-15 | H, methyl | H, methyl | Methyl | Methyl | H, methyl | Phenyl | Methyl | Phenyl |
| 9-16 | H, methyl | H, methyl | Methyl | Methyl | H, methyl | GlyP | Methyl | GlyP |
| 9-17 | H, methyl | H, methyl | Methyl | Methyl | H, methyl | POMMA | Methyl | POMMA |
| 9-18 | H, methyl | H, methyl | GlyP | GlyP | H, methyl | ECHE | GlyP | ECHE |
| 9-19 | H, methyl | H, methyl | GlyP | GlyP | H, methyl | Phenyl | GlyP | Phenyl |
| 9-20 | H, methyl | H, methyl | GlyP | GlyP | H, methyl | Methyl | GlyP | Methyl |
| 9-21 | H, methyl | H, methyl | GlyP | GlyP | H, methyl | POMMA | GlyP | POMMA |
| 9-22 | H, methyl | H, methyl | POMMA | POMMA | H, methyl | ECHE | POMMA | ECHE |
| 9-23 | H, methyl | H, methyl | POMMA | POMMA | H, methyl | Phenyl | POMMA | Phenyl |
| 9-24 | H, methyl | H, methyl | POMMA | POMMA | H, methyl | Methyl | POMMA | Methyl |
| 9-25 | H, methyl | H, methyl | POMMA | POMMA | H, methyl | GlyP | POMMA | GlyP |

TABLE 10

| No | R8 | R9 | R16 | R17 | R18 | R19 | R of B | R of D |
|---|---|---|---|---|---|---|---|---|
| 10-1 | H, methyl | $CF_3$, methyl | ECHE | Alkylthiol | H, methyl | ECHE | Alkylthiol | ECHE |
| 10-2 | H, ethyl | H, methyl | ECHE | Phenyl | Alkylthiol, methyl | Hexyl | Phenyl | Hexyl |
| 10-3 | H, acetyl | H, $CF_3$ | ECHE | Methyl | H, methyl | GlyP | Methyl | GlyP |
| 10-4 | Vinyl, methyl | H, methyl | Phenyl | GlyP | H, $CF_3$ | POMMA | GlyP | POMMA |

TABLE 10-continued

| No | R8 | R9 | R16 | R17 | R18 | R19 | R of B | R of D |
|---|---|---|---|---|---|---|---|---|
| 10-5 | H, methyl | H, methyl | Phenyl | POMMA | H, ethyl | Aminopropyl | POMMA | Aminopropyl |
| 10-6 | H, F | H, octyl | Phenyl | ECHE | H, F | Phenyl | ECHE | Phenyl |
| 10-7 | $CF_3$, methyl | H, methyl | ECHE | ECHE | Vinyl, methyl | GlyP | ECHE | GlyP |
| 10-8 | H, methyl | H, methyl | Hexyl | ECHE | H, methyl | POMMA | ECHE | POMMA |
| 10-9 | H, $CF_3$ | Alkylthiol, methyl | GlyP | ECHE | H, F | Aminopropyl | ECHE | Aminopropyl |
| 10-10 | H, methyl | H, methyl | POMMA | Phenyl | $CF_3$, methyl | Phenyl | Phenyl | Phenyl |
| 10-11 | Aryl, methyl | H, methyl | Aminopropyl | Phenyl | H, methyl | Octyl | Phenyl | Octyl |
| 10-12 | H, methacryl | H, methyl | Phenyl | Phenyl | H, $CF_3$ | POMMA | Phenyl | POMMA |
| 10-13 | H, methyl | Alkylthiol, methyl | GlyP | ECHE | H, methyl | ECHE | ECHE | ECHE |
| 10-14 | H, octyl | H, methyl | POMMA | Hexyl | H, methyl | Phenyl | Hexyl | Phenyl |
| 10-15 | H, methyl | H, F | Aminopropyl | GlyP | H, octyl | Methyl | GlyP | Methyl |
| 10-16 | H, methyl | $CF_3$, methyl | Phenyl | POMMA | H, methyl | GlyP | POMMA | GlyP |
| 10-17 | Alkylthiol, methyl | H, methyl | Octyl | Aminopropyl | H, methyl | POMMA | Aminopropyl | POMMA |
| 10-18 | H, methyl | H, $CF_3$ | POMMA | Phenyl | Alkylthiol, methyl | Aminopropyl | Phenyl | Aminopropyl |
| 10-19 | H, $CF_3$ | H, methyl | ECHE | GlyP | H, methyl | Phenyl | GlyP | Phenyl |
| 10-20 | H, methyl | H, methyl | Phenyl | POMMA | H, methyl | Octyl | POMMA | Octyl |
| 10-21 | $C_8F_{13}$, methyl | H, methyl | Methyl | Aminopropyl | H, methyl | POMMA | Aminopropyl | POMMA |
| 10-22 | H, propyl | Alkylthiol, methyl | GlyP | Phenyl | Alkylthiol, methyl | ECHE | Phenyl | ECHE |
| 10-23 | F, methyl | H, methyl | POMMA | Octyl | H, methyl | Phenyl | Octyl | Phenyl |
| 10-24 | H, methyl | H, $CF_3$ | POMMA | POMMA | H, $CF_3$ | Methyl | POMMA | Methyl |
| 10-25 | H, ethyl | H, methyl | POMMA | ECHE | H, methyl | GlyP | ECHE | GlyP |

As specific examples, the silsesquioxane composite polymer of the above chemical formula 6 may be polymers listed in the following Tables 11 and 12.

TABLE 11

| No | R16 | R17 | R18 | R19 | R20 | R of X | R of Y | R of X of E |
|---|---|---|---|---|---|---|---|---|
| 11-1 | ECHE | ECHE | H, methyl | ECHE | ECHE | ECHE | ECHE | ECHE |
| 11-2 | Phenyl | Phenyl | H, methyl | Phenyl | Phenyl | Phenyl | Phenyl | Phenyl |
| 11-3 | Methyl | Methyl | H, methyl | Methyl | Methyl | Methyl | Methyl | Methyl |
| 11-4 | GlyP | EGCDX | H, methyl | EGCDX | GlyP | EGCDX | EGCDX | GlyP |
| 11-5 | POMMA | POMMA | H, methyl | POMMA | POMMA | POMMA | POMMA | POMMA |
| 11-6 | ECHE | ECHE | H, methyl | ECHE | Phenyl | ECHE | ECHE | Phenyl |
| 11-7 | ECHE | ECHE | H, methyl | ECHE | Methyl | ECHE | ECHE | Methyl |
| 11-8 | ECHE | ECHE | H, methyl | ECHE | GlyP | ECHE | ECHE | GlyP |
| 11-9 | ECHE | ECHE | H, methyl | ECHE | POMMA | ECHE | ECHE | POMMA |
| 11-10 | ECHE | Phenyl | H, methyl | Phenyl | ECHE | Phenyl | Phenyl | ECHE |
| 11-11 | ECHE | Methyl | H, methyl | Methyl | ECHE | Methyl | Methyl | ECHE |
| 11-12 | ECHE | GlyP | H, methyl | GlyP | ECHE | GlyP | GlyP | ECHE |
| 11-13 | ECHE | POMMA | H, methyl | POMMA | ECHE | POMMA | POMMA | ECHE |
| 11-14 | Phenyl | Phenyl | H, methyl | Phenyl | ECHE | Phenyl | Phenyl | ECHE |
| 11-15 | Phenyl | Phenyl | H, methyl | Phenyl | Methyl | Phenyl | Phenyl | Methyl |
| 11-16 | Phenyl | Phenyl | H, methyl | Phenyl | EGDCX | Phenyl | Phenyl | EGDCX |
| 11-17 | Phenyl | Phenyl | H, methyl | Phenyl | POMMA | Phenyl | Phenyl | POMMA |
| 11-18 | Phenyl | ECHE | H, methyl | ECHE | Phenyl | ECHE | ECHE | Phenyl |
| 11-19 | Phenyl | Methyl | H, methyl | Methyl | Phenyl | Methyl | Methyl | Phenyl |
| 11-20 | Phenyl | GlyP | H, methyl | GlyP | Phenyl | GlyP | GlyP | Phenyl |
| 11-21 | Phenyl | POMMA | H, methyl | POMMA | Phenyl | POMMA | POMMA | Phenyl |
| 11-22 | Methyl | Methyl | H, methyl | Methyl | ECHE | Methyl | Methyl | ECHE |
| 11-23 | Methyl | Methyl | H, methyl | Methyl | Phenyl | Methyl | Methyl | Phenyl |
| 11-24 | Methyl | Methyl | H, methyl | Methyl | GlyP | Methyl | Methyl | GlyP |
| 11-25 | Methyl | Methyl | H, methyl | Methyl | POMMA | Methyl | Methyl | POMMA |
| 11-26 | Methyl | ECHE | H, methyl | ECHE | Methyl | ECHE | ECHE | Methyl |
| 11-27 | Methyl | Phenyl | H, methyl | Phenyl | Methyl | Phenyl | Phenyl | Methyl |
| 11-28 | Methyl | GlyP | H, methyl | GlyP | Methyl | GlyP | GlyP | Methyl |
| 11-29 | Methyl | POMMA | H, methyl | POMMA | Methyl | POMMA | POMMA | Methyl |
| 11-30 | GlyP | GlyP | H, methyl | GlyP | ECHE | GlyP | GlyP | ECHE |
| 11-31 | GlyP | GlyP | H, methyl | GlyP | Phenyl | GlyP | GlyP | Phenyl |
| 11-32 | GlyP | GlyP | H, methyl | GlyP | Methyl | GlyP | GlyP | Methyl |
| 11-33 | GlyP | GlyP | H, methyl | GlyP | POMMA | GlyP | GlyP | POMMA |
| 11-34 | GlyP | ECHE | H, methyl | ECHE | GlyP | ECHE | ECHE | GlyP |

TABLE 11-continued

| No | R16 | R17 | R18 | R19 | R20 | R of X | R of Y | R of X of E |
|---|---|---|---|---|---|---|---|---|
| 11-35 | GlyP | Phenyl | H, methyl | Phenyl | GlyP | Phenyl | Phenyl | GlyP |
| 11-36 | GlyP | Methyl | H, methyl | Methyl | GlyP | Methyl | Methyl | GlyP |
| 11-37 | GlyP | POMMA | H, methyl | POMMA | GlyP | POMMA | POMMA | GlyP |
| 11-38 | POMMA | POMMA | H, methyl | POMMA | ECHE | POMMA | POMMA | ECHE |
| 11-39 | POMMA | POMMA | H, methyl | POMMA | Phenyl | POMMA | POMMA | Phenyl |
| 11-40 | POMMA | POMMA | H, methyl | POMMA | Methyl | POMMA | POMMA | Methyl |
| 11-41 | POMMA | POMMA | H, methyl | POMMA | GlyP | POMMA | POMMA | GlyP |
| 11-42 | POMMA | ECHE | H, methyl | ECHE | POMMA | ECHE | ECHE | POMMA |
| 11-43 | POMMA | Phenyl | H, methyl | Phenyl | POMMA | Phenyl | Phenyl | POMMA |
| 11-44 | POMMA | Methyl | H, methyl | Methyl | POMMA | Methyl | Methyl | POMMA |
| 11-45 | POMMA | GlyP | H, methyl | GlyP | POMMA | GlyP | GlyP | POMMA |

TABLE 12

| No | R16 | R17 | R18 | R19 | R20 | R of X | R of Y | R of X of E |
|---|---|---|---|---|---|---|---|---|
| 12-1 | ECHE | POMMA | H, methyl | ECHE | POMMA | POMMA | ECHE | POMMA |
| 12-2 | Phenyl | POMMA | H, ethyl | Phenyl | POMMA | POMMA | Phenyl | POMMA |
| 12-3 | POMMA | ECHE | H, acetyl | Methyl | ECHE | ECHE | Methyl | ECHE |
| 12-4 | Methyl | ECHE | Vinyl, methyl | EGCDX | ECHE | ECHE | EGCDX | ECHE |
| 12-5 | POMMA | F | H, methyl | POMMA | F | F | POMMA | F |
| 12-6 | Propyl | Aminopropyl | CF$_3$, methyl | ECHE | Aminopropyl | Aminopropyl | ECHE | Aminopropyl |
| 12-7 | Phenyl | Phenyl | H, methyl | ECHE | Phenyl | Phenyl | ECHE | Phenyl |
| 12-8 | Methyl | Alkylthiol | H, acetyl | ECHE | Alkylthiol | Alkylthiol | ECHE | Alkylthiol |
| 12-9 | GlyP | Phenyl | Vinyl, methyl | ECHE | Phenyl | Phenyl | ECHE | Phenyl |
| 12-10 | ECHE | Octyl | H, methyl | Phenyl | Octyl | Octyl | Phenyl | Octyl |
| 12-11 | Alkylthiol | Methyl | H, methyl | Methyl | Methyl | Methyl | Methyl | Methyl |
| 12-12 | Phenyl | Octyl | Vinyl, methyl | GlyP | Octyl | Octyl | GlyP | Octyl |
| 12-13 | Octyl | Octyl | H, methyl | POMMA | Octyl | Octyl | POMMA | Octyl |
| 12-14 | Methyl | Methyl | H, F | Phenyl | Methyl | Methyl | Phenyl | Methyl |
| 12-15 | Octyl | GlyP | CF$_3$, methyl | Phenyl | ECHE | GlyP | Phenyl | ECHE |
| 12-16 | Octyl | GlyP | Vinyl, methyl | Phenyl | Phenyl | GlyP | Phenyl | Phenyl |
| 12-17 | Methyl | Aminopropyl | H, methyl | Phenyl | POMMA | Aminopropyl | Phenyl | POMMA |
| 12-18 | GlyP | GlyP | H, F | ECHE | Methyl | GlyP | ECHE | Methyl |
| 12-19 | GlyP | POMMA | CF$_3$, methyl | Methyl | POMMA | POMMA | Methyl | POMMA |
| 12-20 | Aminopropyl | Methyl | H, methyl | GlyP | Propyl | Methyl | GlyP | Propyl |
| 12-21 | GlyP | POMMA | Alkylthiol, methyl | POMMA | Phenyl | POMMA | POMMA | Phenyl |
| 12-22 | POMMA | Propyl | H, acetyl | Methyl | Methyl | Propyl | Methyl | Methyl |
| 12-23 | POMMA | Methyl | Vinyl, methyl | Methyl | GlyP | Methyl | Methyl | GlyP |
| 12-24 | GlyP | GlyP | Vinyl, methyl | Methyl | ECHE | GlyP | Methyl | ECHE |
| 12-25 | Aminopropyl | GlyP | H, methyl | Methyl | GlyP | GlyP | Methyl | GlyP |
| 12-26 | Methyl | Aminopropyl | H, F | ECHE | Aminopropyl | Aminopropyl | ECHE | Aminopropyl |
| 12-27 | Methyl | GlyP | CF$_3$, methyl | Phenyl | GlyP | GlyP | Phenyl | GlyP |
| 12-28 | Methyl | Octyl | H, methyl | GlyP | Octyl | Octyl | GlyP | Octyl |
| 12-29 | Methyl | Methyl | H, acetyl | POMMA | Methyl | Methyl | POMMA | Methyl |
| 12-30 | Aminopropyl | GlyP | Vinyl, methyl | GlyP | GlyP | GlyP | GlyP | GlyP |
| 12-31 | GlyP | GlyP | H, methyl | GlyP | GlyP | GlyP | GlyP | GlyP |
| 12-32 | POMMA | Aminopropyl | H, methyl | GlyP | Aminopropyl | Aminopropyl | GlyP | Aminopropyl |
| 12-33 | Methyl | GlyP | Vinyl, methyl | GlyP | GlyP | GlyP | GlyP | GlyP |
| 12-34 | POMMA | POMMA | H, methyl | ECHE | POMMA | POMMA | ECHE | POMMA |
| 12-35 | Propyl | POMMA | H, F | Phenyl | POMMA | POMMA | Phenyl | POMMA |
| 12-36 | Methyl | GlyP | CF$_3$, methyl | Methyl | GlyP | GlyP | Methyl | GlyP |
| 12-37 | GlyP | Aminopropyl | Vinyl, methyl | POMMA | Aminopropyl | Aminopropyl | POMMA | Aminopropyl |
| 12-38 | GlyP | Methyl | H, methyl | POMMA | Methyl | Methyl | POMMA | Methyl |
| 12-39 | Aminopropyl | Methyl | H, F | POMMA | Methyl | Methyl | POMMA | Methyl |
| 12-40 | Aminopropyl | Methyl | CF$_3$, methyl | POMMA | Methyl | Methyl | POMMA | Methyl |
| 12-41 | GlyP | Methyl | H, methyl | POMMA | Methyl | Methyl | POMMA | Methyl |
| 12-42 | POMMA | GlyP | Alkylthiol, methyl | ECHE | GlyP | GlyP | ECHE | GlyP |
| 12-43 | POMMA | Aminopropyl | H, acetyl | Phenyl | Aminopropyl | Aminopropyl | Phenyl | Aminopropyl |
| 12-44 | POMMA | GlyP | Vinyl, methyl | Methyl | GlyP | GlyP | Methyl | GlyP |
| 12-45 | POMMA | POMMA | H, methyl | GlyP | POMMA | POMMA | GlyP | POMMA |

As specific examples, the silsesquioxane composite polymer of the above chemical formula 7 may be polymers listed in the following Tables 13 and 14.

TABLE 13

| No | R11 | R12 | R16 | R17 | R18 | R19 | R of X | R of Y |
|---|---|---|---|---|---|---|---|---|
| 13-1 | OH, methoxy | H, methyl | ECHE | ECHE | H, methyl | ECHE | ECHE | ECHE |

TABLE 13-continued

| No | R11 | R12 | R16 | R17 | R18 | R19 | R of X | R of Y |
|---|---|---|---|---|---|---|---|---|
| 13-2 | OH, methoxy | H, methyl | Phenyl | Phenyl | H, methyl | Phenyl | Phenyl | Phenyl |
| 13-3 | OH, methoxy | H, methyl | Methyl | Methyl | H, methyl | Methyl | Methyl | Methyl |
| 13-4 | OH, methoxy | H, methyl | GlyP | GlyP | H, methyl | GlyP | GlyP | GlyP |
| 13-5 | OH, methoxy | H, methyl | POMMA | POMMA | H, methyl | POMMA | POMMA | POMMA |
| 13-6 | OH, methoxy | H, methyl | ECHE | ECHE | H, methyl | Phenyl | ECHE | Phenyl |
| 13-7 | OH, methoxy | H, methyl | ECHE | ECHE | H, methyl | Methyl | ECHE | Methyl |
| 13-8 | OH, methoxy | H, methyl | ECHE | ECHE | H, methyl | GlyP | ECHE | GlyP |
| 13-9 | OH, methoxy | H, methyl | ECHE | ECHE | H, methyl | POMMA | ECHE | POMMA |
| 13-10 | OH, methoxy | H, methyl | Phenyl | Phenyl | H, methyl | ECHE | Phenyl | ECHE |
| 13-11 | OH, methoxy | H, methyl | Phenyl | Phenyl | H, methyl | Methyl | Phenyl | Methyl |
| 13-12 | OH, methoxy | H, methyl | Phenyl | Phenyl | H, methyl | GlyP | Phenyl | GlyP |
| 13-13 | OH, methoxy | H, methyl | Phenyl | Phenyl | H, methyl | POMMA | Phenyl | POMMA |
| 13-14 | OH, methoxy | H, methyl | Methyl | Methyl | H, methyl | ECHE | Methyl | ECHE |
| 13-15 | OH, methoxy | H, methyl | Methyl | Methyl | H, methyl | Phenyl | Methyl | Phenyl |
| 13-16 | OH, methoxy | H, methyl | Methyl | Methyl | H, methyl | GlyP | Methyl | GlyP |
| 13-17 | OH, methoxy | H, methyl | Methyl | Methyl | H, methyl | POMMA | Methyl | POMMA |
| 13-18 | OH, methoxy | H, methyl | GlyP | GlyP | H, methyl | ECHE | GlyP | ECHE |
| 13-19 | OH, methoxy | H, methyl | GlyP | GlyP | H, methyl | Phenyl | GlyP | Phenyl |
| 13-20 | OH, methoxy | H, methyl | GlyP | GlyP | H, methyl | Methyl | GlyP | Methyl |
| 13-21 | OH, methoxy | H, methyl | GlyP | GlyP | H, methyl | POMMA | GlyP | POMMA |
| 13-22 | OH, methoxy | H, methyl | POMMA | POMMA | H, methyl | ECHE | POMMA | ECHE |
| 13-23 | OH, methoxy | H, methyl | POMMA | POMMA | H, methyl | Phenyl | POMMA | Phenyl |
| 13-24 | OH, methoxy | H, methyl | POMMA | POMMA | H, methyl | Methyl | POMMA | Methyl |
| 13-25 | OH, methoxy | H, methyl | POMMA | POMMA | H, methyl | GlyP | POMMA | GlyP |

TABLE 14

| No | R11 | R12 | R16 | R17 | R18 | R19 | R of X | R of Y |
|---|---|---|---|---|---|---|---|---|
| 14-1 | OH, methoxy | H, methyl | ECHE | Alkylthiol | H, methyl | ECHE | Alkylthiol | ECHE |
| 14-2 | OH, CF$_3$ | H, ethyl | ECHE | Phenyl | H, ethyl | Phenyl | Phenyl | Phenyl |
| 14-3 | OH, methoxy | H, acetyl | ECHE | Methyl | H, acetyl | Methyl | Methyl | Methyl |
| 14-4 | CF$_3$, methoxy | Vinyl, methyl | Phenyl | GlyP | Vinyl, methyl | GlyP | GlyP | GlyP |
| 14-5 | OH, methoxy | H, methyl | Phenyl | POMMA | H, methyl | POMMA | POMMA | POMMA |
| 14-6 | OH, C$_8$F$_{13}$ | H, F | Phenyl | ECHE | H, F | Phenyl | ECHE | Phenyl |
| 14-7 | OH, CF$_3$ | CF$_3$, methyl | ECHE | ECHE | CF$_3$, methyl | Methyl | ECHE | Methyl |
| 14-8 | OH, C$_8$F$_{13}$ | H, methyl | Hexyl | ECHE | H, methyl | GlyP | ECHE | GlyP |
| 14-9 | OH, methoxy | H, CF$_3$ | GlyP | ECHE | H, CF$_3$ | POMMA | ECHE | POMMA |
| 14-10 | OH, methoxy | H, methyl | POMMA | Phenyl | H, methyl | ECHE | Phenyl | ECHE |
| 14-11 | OH, C$_8$F$_{13}$ | Aryl, methyl | Aminopropyl | Phenyl | Aryl, methyl | Hexyl | Phenyl | Hexyl |
| 14-12 | OH, alkylthiol | H, methacryl | Phenyl | Phenyl | H, methacryl | GlyP | Phenyl | GlyP |

TABLE 14-continued

| No | R11 | R12 | R16 | R17 | R18 | R19 | R of X | R of Y |
|---|---|---|---|---|---|---|---|---|
| 14-13 | OH, methoxy | H, methyl | GlyP | ECHE | H, methyl | POMMA | ECHE | POMMA |
| 14-14 | OH, acryl | H, octyl | POMMA | Hexyl | H, octyl | Aminopropyl | Hexyl | Aminopropyl |
| 14-15 | Vinyl, methoxy | H, methyl | Aminopropyl | GlyP | H, methyl | Phenyl | GlyP | Phenyl |
| 14-16 | Alkylamine | H, methyl | Phenyl | POMMA | H, methyl | GlyP | POMMA | GlyP |
| 14-17 | OH, ethyl, methyl | Alkylthiol, methyl | Octyl | Aminopropyl | Alkylthiol, methyl | POMMA | Aminopropyl | POMMA |
| 14-18 | Acetoxy, methoxy | H, methyl | POMMA | Phenyl | H, methyl | Aminopropyl | Phenyl | Aminopropyl |
| 14-19 | Propoxy, methoxy | H, $CF_3$ | ECHE | GlyP | H, $CF_3$ | Phenyl | GlyP | Phenyl |
| 14-20 | OH, methoxy | H, methyl | Phenyl | POMMA | H, methyl | Octyl | POMMA | Octyl |
| 14-21 | $C_8F_{13}$, methoxy | $C_8F_{13}$, methyl | Methyl | Aminopropyl | $C_8F_{13}$, methyl | POMMA | Aminopropyl | POMMA |
| 14-22 | OH, aryl | H, propyl | GlyP | Phenyl | H, propyl | ECHE | Phenyl | ECHE |
| 14-23 | OH, methoxy | F, methyl | POMMA | Octyl | F, methyl | Phenyl | Octyl | Phenyl |
| 14-24 | $CF_3$, methacryl | H, methyl | POMMA | POMMA | H, methyl | Methyl | POMMA | Methyl |
| 14-25 | OH, methoxy | H, methyl | POMMA | POMMA | H, methyl | GlyP | POMMA | GlyP |

As specific examples, the silsesquioxane composite polymer of the above chemical formula 8 may be polymers listed in the following Tables 15 and 16.

TABLE 15

| No | R13 | R14 | R16 | R17 | R18 | R19 | R of X | R of Y |
|---|---|---|---|---|---|---|---|---|
| 15-1 | H, methyl | H, methyl | ECHE | ECHE | H, methyl | ECHE | ECHE | ECHE |
| 15-2 | H, methyl | H, methyl | Phenyl | Phenyl | H, methyl | Phenyl | Phenyl | Phenyl |
| 15-3 | H, methyl | H, methyl | Methyl | Methyl | H, methyl | Methyl | Methyl | Methyl |
| 15-4 | H, methyl | H, methyl | GlyP | GlyP | H, methyl | GlyP | GlyP | GlyP |
| 15-5 | H, methyl | H, methyl | POMMA | POMMA | H, methyl | POMMA | POMMA | POMMA |
| 15-6 | H, methyl | H, methyl | ECHE | ECHE | H, methyl | Phenyl | ECHE | Phenyl |
| 15-7 | H, methyl | H, methyl | ECHE | ECHE | H, methyl | Methyl | ECHE | Methyl |
| 15-8 | H, methyl | H, methyl | ECHE | ECHE | H, methyl | GlyP | ECHE | GlyP |
| 15-9 | H, methyl | H, methyl | ECHE | ECHE | H, methyl | POMMA | ECHE | POMMA |
| 15-10 | H, methyl | H, methyl | Phenyl | Phenyl | H, methyl | ECHE | Phenyl | ECHE |
| 15-11 | H, methyl | H, methyl | Phenyl | Phenyl | H, methyl | Methyl | Phenyl | Methyl |
| 15-12 | H, methyl | H, methyl | Phenyl | Phenyl | H, methyl | GlyP | Phenyl | GlyP |
| 15-13 | H, methyl | H, methyl | Phenyl | Phenyl | H, methyl | POMMA | Phenyl | POMMA |
| 15-14 | H, methyl | H, methyl | Methyl | Methyl | H, methyl | ECHE | Methyl | ECHE |
| 15-15 | H, methyl | H, methyl | Methyl | Methyl | H, methyl | Phenyl | Methyl | Phenyl |
| 15-16 | H, methyl | H, methyl | Methyl | Methyl | H, methyl | GlyP | Methyl | GlyP |
| 15-17 | H, methyl | H, methyl | Methyl | Methyl | H, methyl | POMMA | Methyl | POMMA |
| 15-18 | H, methyl | H, methyl | GlyP | GlyP | H, methyl | ECHE | GlyP | ECHE |
| 15-19 | H, methyl | H, methyl | GlyP | GlyP | H, methyl | Phenyl | GlyP | Phenyl |
| 15-20 | H, methyl | H, methyl | GlyP | GlyP | H, methyl | Methyl | GlyP | Methyl |
| 15-21 | H, methyl | H, methyl | GlyP | GlyP | H, methyl | POMMA | GlyP | POMMA |
| 15-22 | H, methyl | H, methyl | POMMA | POMMA | H, methyl | ECHE | POMMA | ECHE |
| 15-23 | H, methyl | H, methyl | POMMA | POMMA | H, methyl | Phenyl | POMMA | Phenyl |
| 15-24 | H, methyl | H, methyl | POMMA | POMMA | H, methyl | Methyl | POMMA | Methyl |
| 15-25 | H, methyl | H, methyl | POMMA | POMMA | H, methyl | GlyP | POMMA | GlyP |

TABLE 16

| No | R13 | R14 | R16 | R17 | R18 | R19 | R of X | R of Y |
|---|---|---|---|---|---|---|---|---|
| 16-1 | H, methyl | $CF_3$, methyl | ECHE | Alkylthiol | H, methyl | ECHE | Alkylthiol | ECHE |
| 16-2 | H, ethyl | H, methyl | ECHE | Phenyl | Alkylthiol, methyl | Hexyl | Phenyl | Hexyl |
| 16-3 | H, acetyl | H, $CF_3$ | ECHE | Methyl | H, methyl | GlyP | Methyl | GlyP |
| 16-4 | Vinyl, methyl | H, methyl | Phenyl | GlyP | H, $CF_3$ | POMMA | GlyP | POMMA |
| 16-5 | H, methyl | H, methyl | Phenyl | POMMA | H, ethyl | Aminopropyl | POMMA | Aminopropyl |
| 16-6 | H, F | H, octyl | Phenyl | ECHE | H, F | Phenyl | ECHE | Phenyl |
| 16-7 | $CF_3$, methyl | H, methyl | ECHE | ECHE | Vinyl, methyl | GlyP | ECHE | GlyP |

TABLE 16-continued

| No | R13 | R14 | R16 | R17 | R18 | R19 | R of X | R of Y |
|---|---|---|---|---|---|---|---|---|
| 16-8 | H, methyl | H, methyl | Hexyl | ECHE | H, methyl | POMMA | ECHE | POMMA |
| 16-9 | H, $CF_3$ | Alkylthiol, methyl | GlyP | ECHE | H, F | Aminopropyl | ECHE | Aminopropyl |
| 16-10 | H, methyl | H, methyl | POMMA | Phenyl | $CF_3$, methyl | Phenyl | Phenyl | Phenyl |
| 16-11 | Aryl, methyl | H, methyl | Aminopropyl | Phenyl | H, methyl | Octyl | Phenyl | Octyl |
| 16-12 | H, methacryl | H, methyl | Phenyl | Phenyl | H, $CF_3$ | POMMA | Phenyl | POMMA |
| 16-13 | H, methyl | Alkylthiol, methyl | GlyP | ECHE | H, methyl | ECHE | ECHE | ECHE |
| 16-14 | H, octyl | H, methyl | POMMA | Hexyl | H, methyl | Phenyl | Hexyl | Phenyl |
| 16-15 | H, methyl | H, F | Aminopropyl | GlyP | H, octyl | Methyl | GlyP | Methyl |
| 16-16 | H, methyl | $CF_3$, methyl | Phenyl | POMMA | H, methyl | GlyP | POMMA | GlyP |
| 16-17 | Alkylthiol, methyl | H, methyl | Octyl | Aminopropyl | H, methyl | POMMA | Aminopropyl | POMMA |
| 16-18 | H, methyl | H, $CF_3$ | POMMA | Phenyl | Alkylthiol, methyl | Aminopropyl | Phenyl | Aminopropyl |
| 16-19 | H, $CF_3$ | H, methyl | ECHE | GlyP | H, methyl | Phenyl | GlyP | Phenyl |
| 16-20 | H, methyl | H, methyl | Phenyl | POMMA | H, methyl | Octyl | POMMA | Octyl |
| 16-21 | $C_8F_{13}$, methyl | H, methyl | Methyl | Aminopropyl | H, methyl | POMMA | Aminopropyl | POMMA |
| 16-22 | H, propyl | Alkylthiol, methyl | GlyP | Phenyl | Alkylthiol, methyl | ECHE | Phenyl | ECHE |
| 16-23 | F, methyl | H, methyl | POMMA | Octyl | H, methyl | Phenyl | Octyl | Phenyl |
| 16-24 | H, methyl | H, $CF_3$ | POMMA | POMMA | H, $CF_3$ | Methyl | POMMA | Methyl |
| 16-25 | H, ethyl | H, methyl | POMMA | ECHE | H, methyl | GlyP | ECHE | GlyP |

As specific examples, the silsesquioxane composite polymer of the above chemical formula 9 may be polymers listed in the following Tables 17 and 18.

TABLE 17

| No | R16 | R17 | R18 | R19 | R20 | R of X | R of Y | Terminal R of E |
|---|---|---|---|---|---|---|---|---|
| 17-1 | ECHE | ECHE | H, methyl | ECHE | ECHE | ECHE | ECHE | ECHE |
| 17-2 | Phenyl | Phenyl | H, methyl | Phenyl | Phenyl | Phenyl | Phenyl | Phenyl |
| 17-3 | Methyl | Methyl | H, methyl | Methyl | Methyl | Methyl | Methyl | Methyl |
| 17-4 | GlyP | EGCDX | H, methyl | EGCDX | GlyP | EGCDX | EGCDX | GlyP |
| 17-5 | POMMA | POMMA | H, methyl | POMMA | POMMA | POMMA | POMMA | POMMA |
| 17-6 | ECHE | ECHE | H, methyl | ECHE | Phenyl | ECHE | ECHE | Phenyl |
| 17-7 | ECHE | ECHE | H, methyl | ECHE | Methyl | ECHE | ECHE | Methyl |
| 17-8 | ECHE | ECHE | H, methyl | ECHE | GlyP | ECHE | ECHE | GlyP |
| 17-9 | ECHE | ECHE | H, methyl | ECHE | POMMA | ECHE | ECHE | POMMA |
| 17-10 | ECHE | Phenyl | H, methyl | Phenyl | ECHE | Phenyl | Phenyl | ECHE |
| 17-11 | ECHE | Methyl | H, methyl | Methyl | ECHE | Methyl | Methyl | ECHE |
| 17-12 | ECHE | GlyP | H, methyl | GlyP | ECHE | GlyP | GlyP | ECHE |
| 17-13 | ECHE | POMMA | H, methyl | POMMA | ECHE | POMMA | POMMA | ECHE |
| 17-14 | Phenyl | Phenyl | H, methyl | Phenyl | ECHE | Phenyl | Phenyl | ECHE |
| 17-15 | Phenyl | Phenyl | H, methyl | Phenyl | Methyl | Phenyl | Phenyl | Methyl |
| 17-16 | Phenyl | Phenyl | H, methyl | Phenyl | EGDCX | Phenyl | Phenyl | EGDCX |
| 17-17 | Phenyl | Phenyl | H, methyl | Phenyl | POMMA | Phenyl | Phenyl | POMMA |
| 17-18 | Phenyl | ECHE | H, methyl | ECHE | Phenyl | ECHE | ECHE | Phenyl |
| 17-19 | Phenyl | Methyl | H, methyl | Methyl | Phenyl | Methyl | Methyl | Phenyl |
| 17-20 | Phenyl | GlyP | H, methyl | GlyP | Phenyl | GlyP | GlyP | Phenyl |
| 17-21 | Phenyl | POMMA | H, methyl | POMMA | Phenyl | POMMA | POMMA | Phenyl |
| 17-22 | Methyl | Methyl | H, methyl | Methyl | ECHE | Methyl | Methyl | ECHE |
| 17-23 | Methyl | Methyl | H, methyl | Methyl | Phenyl | Methyl | Methyl | Phenyl |
| 17-24 | Methyl | Methyl | H, methyl | Methyl | GlyP | Methyl | Methyl | GlyP |
| 17-25 | Methyl | Methyl | H, methyl | Methyl | POMMA | Methyl | Methyl | POMMA |
| 17-26 | Methyl | ECHE | H, methyl | ECHE | Methyl | ECHE | ECHE | Methyl |
| 17-27 | Methyl | Phenyl | H, methyl | Phenyl | Methyl | Phenyl | Phenyl | Methyl |
| 17-28 | Methyl | GlyP | H, methyl | GlyP | Methyl | GlyP | GlyP | Methyl |
| 17-29 | Methyl | POMMA | H, methyl | POMMA | Methyl | POMMA | POMMA | Methyl |
| 17-30 | GlyP | GlyP | H, methyl | GlyP | ECHE | GlyP | GlyP | ECHE |
| 17-31 | GlyP | GlyP | H, methyl | GlyP | Phenyl | GlyP | GlyP | Phenyl |
| 17-32 | GlyP | GlyP | H, methyl | GlyP | Methyl | GlyP | GlyP | Methyl |
| 17-33 | GlyP | GlyP | H, methyl | GlyP | POMMA | GlyP | GlyP | POMMA |
| 17-34 | GlyP | ECHE | H, methyl | ECHE | GlyP | ECHE | ECHE | GlyP |
| 17-35 | GlyP | Phenyl | H, methyl | Phenyl | GlyP | Phenyl | Phenyl | GlyP |
| 17-36 | GlyP | Methyl | H, methyl | Methyl | GlyP | Methyl | Methyl | GlyP |
| 17-37 | GlyP | POMMA | H, methyl | POMMA | GlyP | POMMA | POMMA | GlyP |

TABLE 17-continued

| No | R16 | R17 | R18 | R19 | R20 | R of X | R of Y | Terminal R of E |
|---|---|---|---|---|---|---|---|---|
| 17-38 | POMMA | POMMA | H, methyl | POMMA | ECHE | POMMA | POMMA | ECHE |
| 17-39 | POMMA | POMMA | H, methyl | POMMA | Phenyl | POMMA | POMMA | Phenyl |
| 17-40 | POMMA | POMMA | H, methyl | POMMA | Methyl | POMMA | POMMA | Methyl |
| 17-41 | POMMA | POMMA | H, methyl | POMMA | GlyP | POMMA | POMMA | GlyP |
| 17-42 | POMMA | ECHE | H, methyl | ECHE | POMMA | ECHE | ECHE | POMMA |
| 17-43 | POMMA | Phenyl | H, methyl | Phenyl | POMMA | Phenyl | Phenyl | POMMA |
| 17-44 | POMMA | Methyl | H, methyl | Methyl | POMMA | Methyl | Methyl | POMMA |
| 17-45 | POMMA | GlyP | H, methyl | GlyP | POMMA | GlyP | GlyP | POMMA |

TABLE 18

| No | R16 | R17 | R18 | R19 | R20 | R of X | R of Y | Terminal R of E |
|---|---|---|---|---|---|---|---|---|
| 18-1 | ECHE | POMMA | H, methyl | ECHE | POMMA | POMMA | ECHE | POMMA |
| 18-2 | Phenyl | POMMA | H, ethyl | Phenyl | POMMA | POMMA | Phenyl | POMMA |
| 18-3 | POMMA | ECHE | H, acetyl | Methyl | ECHE | ECHE | Methyl | ECHE |
| 18-4 | Methyl | ECHE | Vinyl, methyl | EGCDX | ECHE | ECHE | EGCDX | ECHE |
| 18-5 | POMMA | F | H, methyl | POMMA | F | F | POMMA | F |
| 18-6 | Propyl | Aminopropyl | CF$_3$, methyl | ECHE | Aminopropyl | Aminopropyl | ECHE | Aminopropyl |
| 18-7 | Phenyl | Phenyl | H, methyl | ECHE | Phenyl | Phenyl | ECHE | Phenyl |
| 18-8 | Methyl | Alkylthiol | H, acetyl | ECHE | Alkylthiol | Alkylthiol | ECHE | Alkylthiol |
| 18-9 | GlyP | Phenyl | Vinyl, methyl | ECHE | Phenyl | Phenyl | ECHE | Phenyl |
| 18-10 | ECHE | Octyl | H, methyl | Phenyl | Octyl | Octyl | Phenyl | Octyl |
| 18-11 | Alkylthiol | Methyl | H, methyl | Methyl | Methyl | Methyl | Methyl | Methyl |
| 18-12 | Phenyl | Octyl | Vinyl, methyl | GlyP | Octyl | Octyl | GlyP | Octyl |
| 18-13 | Octyl | Octyl | H, methyl | POMMA | Octyl | Octyl | POMMA | Octyl |
| 18-14 | Methyl | Methyl | H, F | Phenyl | Methyl | Methyl | Phenyl | Methyl |
| 18-15 | Octyl | GlyP | CF$_3$, methyl | Phenyl | ECHE | GlyP | Phenyl | ECHE |
| 18-16 | Octyl | GlyP | Vinyl, methyl | Phenyl | Phenyl | GlyP | Phenyl | Phenyl |
| 18-17 | Methyl | Aminopropyl | H, methyl | Phenyl | POMMA | Aminopropyl | Phenyl | POMMA |
| 18-18 | GlyP | GlyP | H, F | ECHE | Methyl | GlyP | ECHE | Methyl |
| 18-19 | GlyP | POMMA | CF$_3$, methyl | Methyl | POMMA | POMMA | Methyl | POMMA |
| 18-20 | Aminopropyl | Methyl | H, methyl | GlyP | Propyl | Methyl | GlyP | Propyl |
| 18-21 | GlyP | POMMA | Alkylthiol, methyl | POMMA | Phenyl | POMMA | POMMA | Phenyl |
| 18-22 | POMMA | Propyl | H, acetyl | Methyl | Methyl | Propyl | Methyl | Methyl |
| 18-23 | POMMA | Methyl | Vinyl, methyl | Methyl | GlyP | Methyl | Methyl | GlyP |
| 18-24 | GlyP | GlyP | Vinyl, methyl | Methyl | ECHE | GlyP | Methyl | ECHE |
| 18-25 | Aminopropyl | GlyP | H, methyl | Methyl | GlyP | GlyP | Methyl | GlyP |
| 18-26 | Methyl | Aminopropyl | H, F | ECHE | Aminopropyl | Aminopropyl | ECHE | Aminopropyl |
| 18-27 | Methyl | GlyP | CF$_3$, methyl | Phenyl | GlyP | GlyP | Phenyl | GlyP |
| 18-28 | Methyl | Octyl | H, methyl | GlyP | Octyl | Octyl | GlyP | Octyl |
| 18-29 | Methyl | Methyl | H, acetyl | POMMA | Methyl | Methyl | POMMA | Methyl |
| 18-30 | Aminopropyl | GlyP | Vinyl, methyl | GlyP | GlyP | GlyP | GlyP | GlyP |
| 18-31 | GlyP | GlyP | H, methyl | GlyP | GlyP | GlyP | GlyP | GlyP |
| 18-32 | POMMA | Aminopropyl | H, methyl | GlyP | Aminopropyl | Aminopropyl | GlyP | Aminopropyl |
| 18-33 | Methyl | GlyP | Vinyl, methyl | GlyP | GlyP | GlyP | GlyP | GlyP |
| 18-34 | POMMA | POMMA | H, methyl | ECHE | POMMA | POMMA | ECHE | POMMA |
| 18-35 | Propyl | POMMA | H, F | Phenyl | POMMA | POMMA | Phenyl | POMMA |
| 18-36 | Methyl | GlyP | CF$_3$, methyl | Methyl | GlyP | GlyP | Methyl | GlyP |
| 18-37 | GlyP | Aminopropyl | Vinyl, methyl | POMMA | Aminopropyl | Aminopropyl | POMMA | Aminopropyl |
| 18-38 | GlyP | Methyl | H, methyl | POMMA | Methyl | Methyl | POMMA | Methyl |
| 18-39 | Aminopropyl | Methyl | H, F | POMMA | Methyl | Methyl | POMMA | Methyl |
| 18-40 | Aminopropyl | Methyl | CF$_3$, methyl | POMMA | Methyl | Methyl | POMMA | Methyl |
| 18-41 | GlyP | Methyl | H, methyl | POMMA | Methyl | Methyl | POMMA | Methyl |
| 18-42 | POMMA | GlyP | Alkylthiol, methyl | ECHE | GlyP | GlyP | ECHE | GlyP |
| 18-43 | POMMA | Aminopropyl | H, acetyl | Phenyl | Aminopropyl | Aminopropyl | Phenyl | Aminopropyl |
| 18-44 | POMMA | GlyP | Vinyl, methyl | Methyl | GlyP | GlyP | Methyl | GlyP |
| 18-45 | POMMA | POMMA | H, methyl | GlyP | POMMA | POMMA | GlyP | POMMA |

The condensation rate of the silsesquioxane composite polymer of the present invention may be adjusted to 1 to 99.9% or more in order to obtain a wide range of applicability by ensuring excellent storage stability. That is, the content of an alkoxy group coupled to terminal and center Si may be adjusted to 50% to 0.01% with regard to the entire couplers of the polymer.

Also, the silsesquioxane composite polymer of the invention may have a weight average molecular weight of 1,000 to 1,000,000, preferably 5,000 to 100,000, and more preferably 7,000 to 50,000. Within this range, the processability and the physical properties of silsesquioxane can be simultaneously enhanced.

The coating composition containing the silsesquioxane composite polymer represented by any one of the above chemical formulae 1 to 9 in the present invention may comprise two or more kinds of the composite polymers, and preferably, it is advisable to use the silsesquioxane composite polymer represented by any one of the chemical formulae 3 to 9. In this case, the physical properties of a transparent substrate including surface hardness can be further enhanced by comprising a repeat unit [B]b or [E]e.

In the present invention, in the case that the silsesquioxane composite polymer is liquid, the coating composition may be applied alone as a solvent-free type, and in the case of solid phase, it can be constituted by including an organic solvent. In addition, the coating composition may further comprise an initiator or a curing agent.

Preferably, the coating composition is characterized in that it comprises the silsesquioxane composite polymer represented by any one of the above chemical formulae 1 to 9, an organic solvent typically used in the pertinent art which is compatible with the composite polymer, and an initiator, and further may optionally comprise additives such as a curing agent, a plasticizer, a sunscreen, other functional additives to improve curing properties, heat resistance, UV block, plasticity effects, etc.

In the coating composition of the present invention, the silsesquioxane composite polymer may be included at least 5 parts by weight, preferably 5 to 90 parts by weight, and more preferably 10 to 50 parts by weight with regard to 100 parts by weight of the coating composition. Within the above ranges, the mechanical properties of the cured film of the coating composition may be further improved.

The organic solvent may use not only alcohols such as methyl alcohol, isopropyl alcohol, and cellosolve type, lactates, ketones such as acetone and methyl(isobutyl)ethylketone, glycols such as ethylene glycol, furans such as tetrahydrofuran, polar solvents such as dimethylformamide, dimethylacetamide, and N-methyl-2-pyrrolidone, but also various solvents such as hexane, cyclohexane, cyclohexanone, toluene, xylene, cresol, chloroform, dichlorobenzene, dimethylbenzene, trimethylbenzene, pyridine, methylnaphthalene, nitromethane, acrylonitrile arc, methylene chloride, octadecylamine, aniline, dimethyl sulfoxide, benzyl alcohol and the like, but is not limited thereto. The amount of the organic solvent may be included as residual amount other than the composite polymer, the initiator, and the optionally added additives.

Also, in the coating composition of the present invention, the initiator or the curing agent may be suitably selected according to the organic functional groups included in the silsesquioxane composite polymer.

As specific examples, where organic functional groups such as unsaturated hydrocarbons, a thiol type, an epoxy type, an amine type, an isocyanate type and the like, of which the post-curing is possible are introduced, various curing methods using heat or light are possible. In this case, a change due to the heat or light can be achieved in the polymer itself, but it can preferably achieve the curing process by diluting it in the organic solvent as described above.

Also, for the curing and post-reaction of the composite polymer in the present invention, various initiators may be used, and the initiators may be preferably included 0.1-20 parts by weight with regard to the total weight 100 parts by weight of the composition, and when it is included at a content within the above ranges, it can satisfy transmittance and coating stability at the same time after the curing.

Further, when the unsaturated hydrocarbons and the like are introduced to the above organic functional groups, a radical initiator may be used, and the radical initiator may include photo radical initiators such as trichloro acetophenone, diethoxy acetophenone, 1-phenyl-2-hydroxyl-2-methylpropane-1-one, 1-hydroxycyclohexylphenylketone, 2-methyl-1-(4-methyl thiophenyl)-2-morpholinopropane-1-one, 2,4,6-trimethyl benzoyl diphenylphosphine oxide, camphor quinine, 2,2'-azobis(2-methylbutyronitrile), dimethyl-2,2'-azobis(2-methyl butylrate), 3,3-dimethyl-4-methoxybenzophenone, p-methoxybenzophenone, 2,2-diethoxy acetophenone, and 2,2-dimethoxy-1,2-diphenyl ethan-1-one, thermal radical initiators such as t-butylperoxy maleic acid, t-butylhydroperoxide, 2,4-dichlorobenzoylperoxide, 1,1-di(t-butylperoxy)-3,3,5-trimethylcyclohexane, and N-butyl-4,4'-di(t-butylperoxy)valerate, and a combination thereof.

Further, when the epoxy and the like are included in the above organic functional groups, there can be used, as a photo polymerization initiator (cation), sulfoniums such as triphenylsulfonium and diphenyl-4-(phenylthio) sulfonium, iodoniums such as diphenyl iodonium or bis (dodecyl phenyl) iodonium, diazoniums such as phenyl diazonium, ammoniums such as 1-benzyl-2-cyano-pyridinium or 1-(naphthylmethyl)-2-cyano pyridinium, (4-methylphenyl)[4-(2-methylpropyl)phenyl]-hexafluorophosphate iodonium, bis(4-t-butylphenyl) iodonium hexafluoro phosphate, diphenyl iodonium hexafluorophosphate, diphenyl trifluoro methane iodonium sulfonate, triphenylsulfonium tetra borate, tri-P-toylsulfonium hexafluoro phosphate, tri-p-toylsulfonium trifluoromethane sulfonate, and a combination of Fe cations such as (2,4-cyclopentadiene-1-yl)[(1-methylethyl)benzene]-Fe and $[BQ_4]^-$ onium salts such as $BF_4^-$, $PF_6^-$, and $SbF_6^-$ (wherein Q is a phenyl group substituted with at least two fluorines or trifluoromethyl groups).

The cationic initiators which act by heat may include, without limitation, cationic or protonic catalysts such as triple acid salts, boron trifluoride ether complex, and boron trifluoride, various onium salts such as ammonium salt, phosphonium salt and sulfonium salt, and methyltriphenyl phosphonium bromide, ethyltriphenyl phosphonium bromide, phenyltriphenyl phosphonium bromide, etc., and these initiators can also be added in various mixture forms and they can further be mixed with the various radical initiators described in the above.

In addition, according to the type of the organic functional groups, there can be used amine curing agents such as ethylene diamine, triethylene tetramine, tetraethylene pentamine, 1,3-diaminopropane, dipropylene triamine, 3-(2-aminoethyl)amino-propylamine, N,N'-bis(3-aminopropyl) ethylenediamine, 4,9-dioxadodecan-1,12-diamine, 4,7,10-trioxatridecan-1,13-diamine, hexamethylene diamine, 2-methylpentamethylenediamine, 1,3-bisaminomethylcyclohexane, bis(4-aminocyclo-hexyl)methane, norbornenediamine, 1,2-diaminocyclohexane and the like.

In addition, acid anhydride curing agents such as phthalic anhydride, trimellitic anhydride, pyromellitic anhydride, maleic anhydride, tetrahydrophthalic anhydride, methyl hexahydrophthalic anhydride, methyltetrahydrophthalic anhydride, nadic methyl anhydride, nadic hydrogenated methyl anhydride, trialkyltetrahydrophthalic anhydride, dodecenyl succinic anhydride, 2,4-diethyl glutaric anhydride and the like may also be used widely.

The curing agent may be preferably included at 0.1-20 parts by weight with regard to 100 parts by weight of the composition.

Further, as a curing accelerator for promoting the curing action, there can be used triazine based compounds such as acetoguanamine, benzoguanamine and 2,4-diamino-6-vinyl-s-triazine, imidazole based compounds such as imidazole, 2-methylimidazole, 2-ethyl-4-methylimidazole, 2-phenyl imidazole, 2-phenyl-4-methylimidazole, vinyl imidazole and 1-methylimidazole, 1,5-diazabicyclo [4.3.0] nonen-5,1, 8-diazabicyclo [5.4.0] undecene-7, triphenylphosphine, diphenyl (p-trill) phosphine, tris(alkylphenyl) phosphine, tris(alkoxyphenyl) phosphine, ethyl triphenyl phosphonium phosphate, tetrabutylphosphonium hydroxide, tetrabutylphosphonium acetate, tetrabutylphosphonium hydrogen difluoride, tetrabutyl phosphonium dihydrogen trifluoro and the like.

Further, the coating composition may further comprise a pigment. The silsesquioxane composite polymer represented by any one of the chemical formulae 1 to 9 of the present invention can enhance the dispersibility of the pigment, and it has excellent compatibility with the pigment and thus may have a good coloring effect when it includes the pigment. Any known pigments can be used as the pigment, and the content of the pigment can be selected within a suitable range by those skilled in the art.

Furthermore, the present invention may further comprise additives such as a UV absorber, an antioxidant, an antifoaming agent, a leveling agent, a water repellent, a flame retardant, an adhesion improver and the like for the purpose of improving hardness, strength, durability, and moldability through the curing process or post-reaction. The use of the additives is not particularly restricted, but they may be suitably added within such a range that is not detrimental to the characteristics of the substrate, that is, the physical properties such as flexibility, transparency, heat resistance, hardness, strength and the like. The additives may be each independently included at 0.01-10 parts by weight with regard to 100 parts by weight of the composition.

As the additives to be used in the present invention, there are polyether-modified polydimethylsiloxane (for example, BYK company products BYK-300, BYK-301, BYK-302, BYK-331, BYK-335, BYK-306, BYK-330, BYK-341, BYK-344, BYK-307, BYK-333, BYK-310, etc.), polyether modified hydroxyfunctional poly-dimethyl-siloxane (for example, BYK company products BYK-308, BYK-373, etc.), methylalkylpolysiloxane (for example, BYK-077, BYK-085, etc.), polyether modified methylalkylpolysiloxane (for example, BYK-320, BYK-325, etc.), polyester modified poly-methyl-alkyl-siloxane (for example, BYK-315, etc.), aralkyl modified methylalkyl polysiloxane (for example, BYK-322, BYK-323, etc.), polyester modified hydroxy functional polydimethylsiloxane (for example, BYK-370, etc.), acrylic functional polyester modified poly-dimethylsiloxane (for example, BYK-371, BYK-UV 3570, etc.), polyether-polyester modified hydroxy functional poly-dimethylsiloxane (for example, BYK-375, etc.), polyether modified dimethylpolysiloxane (for example, BYK-345, BYK-348, BYK-346, BYK-UV3510, BYK-332, BYK-337, etc.), non-ionic acrylic copolymer (for example, BYK-380, etc.), ionic acrylic copolymer (for example, BYK-381, etc.), polyacrylate (for example, BYK-353, BYK-356, BYK-354, BYK-355, BYK-359, BYK-361 N, BYK-357, BYK-358 N, BYK-352, etc.), polymethacrylate (for example, BYK-390, etc.), polyether modified acryl functional polydimethylsiloxane (for example, BYK-UV 3500, BYK-UV3530, etc.), polyether modified siloxane (for example, BYK-347, etc.), alcohol alkoxylates (for example, BYK-DYNWET 800, etc.), acrylate (for example, BYK-392, etc.), silicone modified polyacrylate (OH-functional) (for example, BYK-Silclean 3700, etc.), and so on.

The substrates in the present invention may comprise any ordinary substrates in that warpage may occur, and as specific examples, the materials may be plastic, glass, metal thin film, timber or pulp, and in particular, in the case of plastic, it may be not only a single plastic material such as polyethylene (PE), polypropylene (PP), polystyrene (PS), polyethylene terephthalate (PET), polyamide (PA), polyester (PES), polyvinyl chloride (PVC), polyurethane (PU), polycarbonate (PC), high hardness polycarbonate (high hardness PC), polyvinylidene chloride (PVDC), polytetrafluoroethylene (PTFE), polyetheretherketone (PEEK), epoxy, (polyacrylonitrile (PAN), silicon polymer, polyethylene oxide (PEO), polymethylene oxide (PMO), polyimide (PI), bio plastic, and polyetherimide (PEI), acryl and the like, but also a combination of two or more plastic materials and it may be a composite plastic in which plastic and glass fiber or inorganic fiber such as carbon fiber are combined, the timber is not particularly limited as long as it consists of timber and it comprises not only a natural timber but also a plywood and a fiberboard (including MDF), and the pulp, which is a collection of cellulose fibers obtained from timbers or other fibrous plants by mechanical, chemical or other in-between means, originally contains lots of moisture so that it is in a porridge shape, and refers to a moistened thing dehydrated by a method such as compression, and in general, the pulp materials may include seed fibers such as cotton, stalks of gramineous plants such as bamboo, straw, esparto and bagasse, stalks of abaca, and tree barks such as hemp, flax, paper mulberry, mitsumata, and gampi, but are not limited thereto and also include paper such as traditional Korean paper (including handmade and machine made paper) and ordinary paper (including paper and cardboard).

Also, in terms of forms, since the substrates go through a solution process, they can be applied to all forms of products including sheets, films, extrusions, sculptures and beads.

As specific articles, there can be a window covering substrate, protective film, or protective plate of display; wood furniture; interior and exterior wooden building materials; wood accessories; wooden public facilities; wall coverings, floorings, tiles, roofings, or windows of buildings or structures; cups, plates, or bowls; semiconductor manufacturing apparatus; cardboard or paper coated products; glass of motor vehicles; glasses; or glass used in optical products, electronics, or solar cells, but not limited thereto.

The coating composition containing the silsesquioxane composite polymer represented by any one of the above chemical formulae 1 to 9 in the present invention may comprise two or more kinds of the composite polymers, and preferably, it is advisable to synthesize the silsesquioxane composite polymer represented by any one of the chemical formulae 1 to 9 having a different density by varying the substituents therein and to alternately coat with the silsesquioxane composite polymers having different densities as coating compositions.

In the coating compositions used for forming two or more coating layers in the present invention, at least one is a coating composition containing the silsesquioxane composite polymer represented by any one of the above chemical formulae 1 to 9, and the other coating layer (can be either a single layer or multiple layers), as a coating composition having a different density from the above coating composition containing the silsesquioxane composite polymer, can be a known coating composition that can be used on a substrate, or a coating composition containing the silsesquioxane composite polymer represented by any one of the chemical formulae 1 to 9. By coating a substrate with the coating compositions having different densities, the warpage of the substrate can be corrected, and in particular, the substrate can have excellent flatness by using the coating composition containing the silsesquioxane composite polymer as at least one layer, thereby increasing surface stability. Preferably, it is advisable to form all the coating layers using the coating compositions containing the silsesquioxane composite polymer represented by any one of the chemical formulae 1 to 9.

Figure 2:
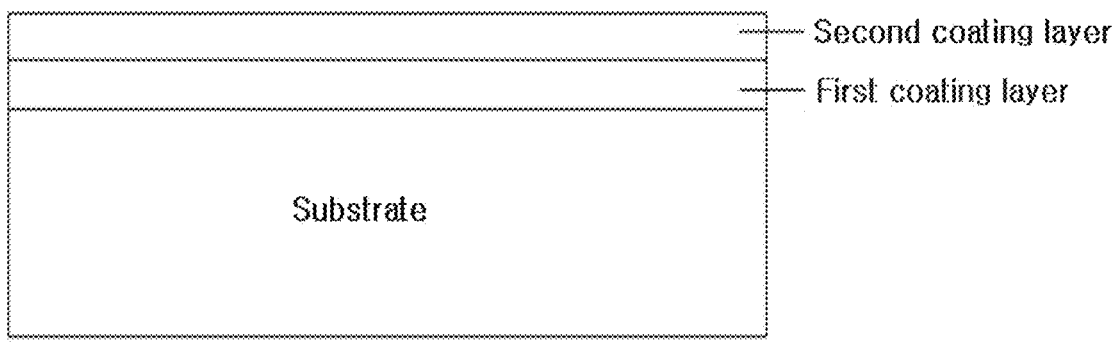
FIGS. 2 to 5 are schematic views showing warpage preventing substrates according to the present invention, respectively.
Figure 3:
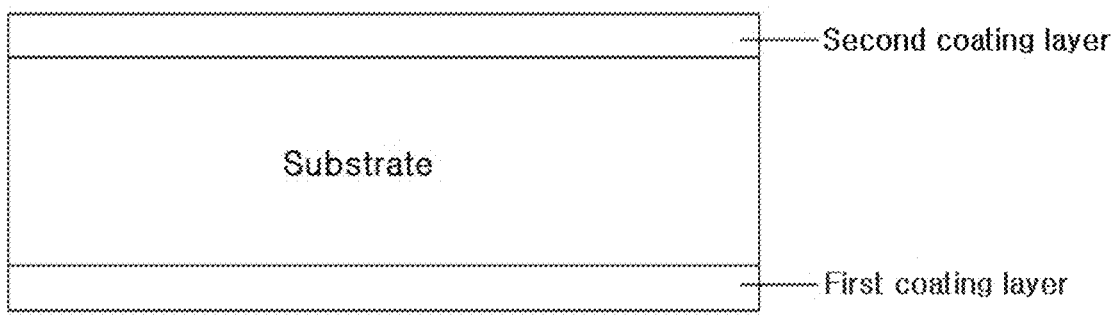
Figure 4:
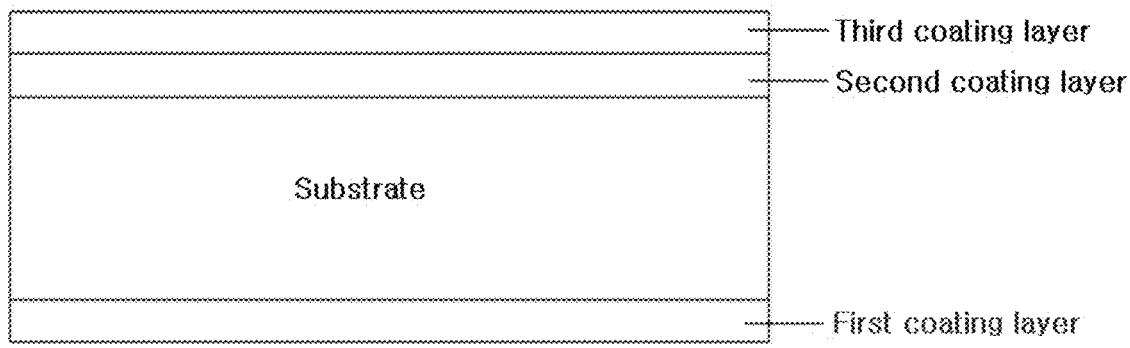
Figure 5:
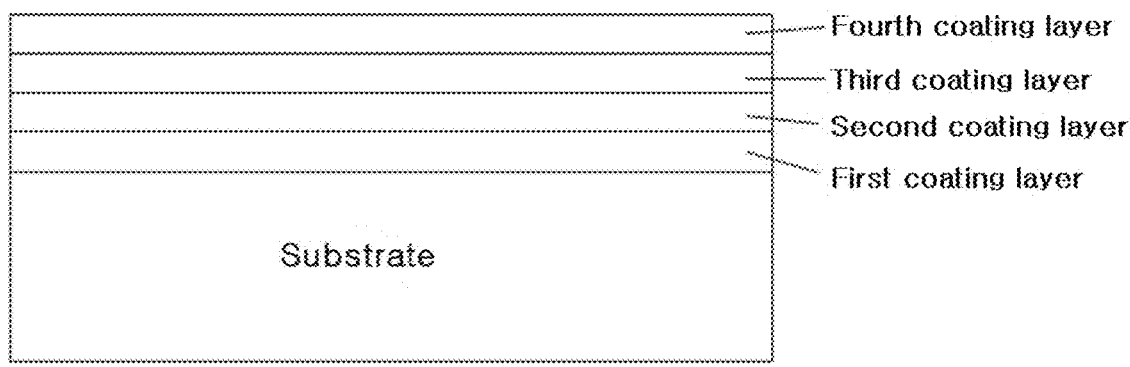

The number of the layers in the above coating layers is two or more, and can be suitably selected by those skilled in the art, preferably 2 to 10 layers, more preferably 2 to 6 layers. In this case, productivity and warpage prevention effects can be simultaneously satisfied. In addition, the coating layers of two or more layers can be formed on one side of a substrate as shown in FIG. 2, or can be formed on both sides of a substrate as shown in FIG. 3 and FIG. 4. Further, as shown in FIG. 4 and FIG. 5, in case of forming coating layers having three or more layers, the coating layers of two separate layers (for example, a first coating layer and a third coating layer of FIG. 4, and a second coating layer and a fourth coating layer of FIG. 5) can be formed with the same coating composition, and preferably, the outermost layer of the coating layers may be a coating composition containing the silsesquioxane composite polymer. In this case, high surface hardness, excellent transparency, scratch resistance, water repellent characteristics, anti-fouling characteristics, anti-fingerprint property, thermal stability and gloss characteristics can be provided to the surface of the substrate. The polymer density difference of the coating compositions having different densities may be preferably 0.001 g/cm$^3$ or more, more preferably 0.01 to 2 g/cm$^3$.

In the present invention, a method for coating the coating composition on the surface of a substrate may be optionally selected and carried out by those skilled in the art among any known methods such as spin coating, bar coating, slit coating, dip coating, a natural coating, reverse coating, roll coating, spin coating, curtain coating, spray coating, immersion, impregnation, and a gravure coating, and in terms of a curing method, photosetting or thermosetting can be suitably selected, depending on the functional groups of the composite polymer. Preferably, in the case of thermosetting, the curing temperature is 80 to 120° C.

In the case of forming two or more coating layers on one side of a substrate, after one coating layer is completed with its curing process, another coating layer can be formed thereon, or after the first coating composition is coated and dried, then the second coating layer can be coated and dried on the dried coating layer, and then they can go through a single curing process to form two coating layers.

The coating thickness of the coating compositions in the present invention may be optionally adjusted, and it may be preferably in the range of 0.01 to 500 um, more preferably 0.1 to 300 um, and even more preferably 1 to 100 um. In particular, the coating thickness of the outermost layer may be preferably 1 to 100 um. Within the above ranges, it can not only stably secure the surface hardness of at least 7H in the outermost surface but also exhibit superior physical properties even in the coated surface characteristics. In particular, in the case that the coating layers are laminated to a thickness of at least 5 um, the surface hardness of the coating layers can stably have 9H.

In addition, the present invention provides a warpage preventing substrate comprising two or more coating layers formed by coating its surface with coating compositions having different densities wherein at least one of the coating layers is formed with the coating composition containing the silsesquioxane composite polymer represented by any one of the above chemical formulae 1 to 9, and an article comprising the same, and the warpage preventing substrate can be prepared by the above coating method for preventing substrate warpage. The warpage preventing substrate in accordance with the present invention may have a flatness of less than 0.1 mm on the basis of the substrate of 100 mm×300 mm, and in the case of a substrate having coating layers on both sides of the substrate (FIG. 3 and FIG. 4), it can show more excellent warpage prevention effects, and in the case that a coating layer is formed with the coating composition containing the silsesquioxane composite polymer on the outermost layer, the coating layer has a very high surface hardness and it has excellent transparency, scratch resistance, water repellent characteristics, anti-fouling characteristics, anti-fingerprint property, thermal stability and gloss characteristics.

The article comprising the warpage preventing substrate in accordance with the present invention is not particularly limited and as specific examples, it may include a window covering substrate, protective film, or protective plate of display; wood furniture; interior and exterior wooden building materials; wood accessories; wooden public facilities; wall coverings, floorings, tiles, roofings, or windows of buildings or structures; cups, plates, or bowls; semiconductor manufacturing apparatus; cardboard or paper coated products; glass of motor vehicles; glasses; or glass used in optical products, electronics, or solar cells.

For a better understanding of the present invention, preferred examples follow. The following examples are intended to merely illustrate the invention without limiting the scope of the invention. In the following examples of the invention, ECHETMS refers to 2-(3,4-epoxycyclohexyl)ethyltrimethoxysilane, GPTMS refers to glycidoxypropyltrimethoxysilane, MAPTMS refers to (methacryloyloxy)propyltrimethoxysilane, PTMS refers to phenyltrimethoxysilane, MTMS refers to methyltrimethoxysilane, ECHETMDS refers to di(epoxycyclohexyethyl) tetramethoxy disiloxane, GPTMDS refers to di(glycidoxypropyl) tetramethoxy disiloxane, MAPTMDS refers to di(methacryloyloxy)propy, PTMDS refers to di(phenyl) tetramethoxy disiloxane, and MTMDS refers to di(Methyl) tetramethoxy disiloxane.

EXAMPLES

Example 1

Preparation of Coating Composition Containing Copolymers 1 and 9

Synthesis was carried out by successive hydrolysis and condensation in stages as described below.

[Example 1-a] Preparation of Catalyst

To control the basicity, catalyst 1a was prepared by mixing tetramethylammonium hydroxide (TMAH) 25 wt % aqueous solution with 10 wt % potassium hydroxide (KOH) aqueous solution.

[Example 1-b] Synthesis of Linear Silsesquioxane Structure

5 Parts by weight of distilled water, 15 parts by weight of tetrahydrofuran, and 1 part by weight of the catalyst prepared in Example 1-a were dropwise added in a dry flask equipped with a cooling tube and a stirrer and stirred at a room temperature for one hour, and after that, 20 parts by weight of 2-(3,4-epoxycyclohexyl)ethyltrimethoxysilane were dropwise added thereto and 15 parts by weight of tetrahydrofuran were dropwise added again, and then the mixture was further stirred for 5 hours. The stirring mixture solution was taken and rinsed twice to remove the catalyst and impurities, and after filtration, it was confirmed that SI—OH functional groups were produced at the terminal group through the IR analysis (3200 $cm^{-1}$), and as a result of measuring its molecular weight, it was confirmed that silsesquioxane of a linear structure such as the chemical formula 4 structure has a styrene-converted molecular weight of 8,000.

[Example 1-c] Production of Successive Cage Structure

5 Parts by weight of 0.36 wt % HCl aqueous solution were very slowly dropwise added to the above Example 1-b mixture solution to adjust pH to acidic condition and stirred at the temperature of 4° C. for 30 min. After that, 5 parts by weight of diphenyltetramethoxydisiloxane were dropwise added at a time to achieve stable hydrolysis, and after one-hour stirring, 7 parts by weight of the catalyst prepared in Example 1-a were added again to adjust the pH of the mixture solution to basic condition. In this process, unlikely the linear polymer, a precursor of D structure where alkoxy is open was formed. A small amount of the sample was taken and examined to see the residual rate of methoxy using the H-NMR and IR analysis, and when the residual rate was 20%, 10 parts by weight of 0.36 wt % HCl aqueous solution were slowly dropwise added to adjust its pH to acidic condition. After that, 1 part by weight of phenyltrimethoxysilane was dropwise added at a time, and after 15-min stirring, 20 parts by weight of the catalyst prepared in Example 1-a were added. After 4-hour mixing and stirring, it was confirmed that a cage type polymer was produced in the polymers. After that, the temperature was changed into a room temperature, and tetrahydrofuran in the mixture solution was eliminated using vacuum to convert the whole reactants into an aqueous solution mixture. After 4-hour mixing and stirring, a portion was taken and analyzed, and as a result of $^{29}$Si-NMR analysis, it was confirmed that two analysis peaks of the structures introduced using phenyl groups appeared in a sharp form, and A-D polymer such as chemical formula 1 was prepared 50% or more without any separate residual by-products. In addition, the styrene-converted molecular weight was measured as 11,000 and n value was 4-6. $^{29}$Si-NMR (CDCl$_3$) δ

[Example 1-d] Preparation of Photosetting Resin Composition

30 G of the composite polymers obtained in Example 1-c were dissolved at 30 wt % in methylisobutylketone to prepare a coating composition of 100 g. Thereafter, 3 parts by weight of chloroacetophenone and 1 part by weight of BYK-347, and 1 part by weight of BYK-UV 3500 were each added to 100 parts by weight of the coating composition, and stirred for 10 min to prepare a photosetting coating composition.

[Example 1-e] Preparation of Thermosetting Resin Composition

50 G of the silsesquioxane composite polymer obtained in the above Example 1-c were dissolved at 50 wt % in methylethylketone to prepare a coating composition of 100 g. Thereafter, 3 parts by weight of 1,3-diaminopropane and 1 part by weight of BYK-357 and BYK-348, respectively were added to 100 part by weight of the prepared coating composition, and stirred for 10 min. to prepare a thermosetting coating composition.

[Example 1-f] Coating Composition Consisting of Polymer Itself

A coating composition was prepared using Example 1-c only without other compositions.

Further, silsesquioxane composite polymers were prepared by applying monomers listed in the following Table 19 and then coating compositions were prepared therefrom. The methods used in the above Examples 1-b, 1-c, 1-d, 1-e and 1-f were equally applied for the preparation thereof.

TABLE 19

| | | Methods | | |
| | | Monomer applied in method 1-c | | |
| No. | Monomer applied in method 1-b | Precursor | Cage incorporation | Molecular weight (Mw) |
| --- | --- | --- | --- | --- |
| 1 | ECHETMS | PTMDS | PTMS | 11,000 |
| 1-1 | PTMS | PTMDS | PTMS | 8,000 |
| 1-2 | MTMS | MTMDS | MTMS | 48,000 |
| 1-3 | GPTMS | GPTMDS | GPTMS | 25,000 |
| 1-4 | MAPTMS | MAPTMDS | MAPTMS | 21,000 |
| 1-5 | ECHETMS | ECHETMDS | ECHETMS | 3,000 |
| 1-6 | ECHETMS | MTMDS | MTMS | 9,000 |
| 1-7 | ECHETMS | GPTMDS | GPTMS | 11,000 |
| 1-8 | ECHETMS | MAPTMDS | MAPTMS | 18,000 |
| 1-9 | PTMS | ECHETMDS | ECHETMS | 36,000 |
| 1-10 | PTMS | MTMDS | MTMS | 120,000 |
| 1-11 | PTMS | GPTMDS | GPTMS | 11,000 |
| 1-12 | PTMS | MAPTMDS | MAPTMS | 110,000 |
| 1-13 | MTMS | ECHETMDS | ECHETMS | 18,000 |
| 1-14 | MTMS | PTMDS | PTMS | 5,000 |
| 1-15 | MTMS | GPTMDS | GPTMS | 80,000 |
| 1-16 | MTMS | MAPTMDS | MAPTMS | 35,000 |
| 1-17 | GPTMS | ECHETMDS | ECHETMS | 7,000 |
| 1-18 | GPTMS | PTMDS | PTMS | 120,000 |
| 1-19 | GPTMS | MTMDS | MTMS | 100,000 |
| 1-20 | GPTMS | MAPTMDS | MAPTMS | 4,000 |
| 1-21 | MAPTMS | ECHETMDS | ECHETMS | 35,000 |
| 1-22 | MAPTMS | PTMDS | PTMS | 2,800 |
| 1-23 | MAPTMS | MTMDS | MTMS | 8,000 |
| 1-24 | MAPTMS | GPTMDS | GPTMS | 180,000 |

Example 2

Synthesis of Silsesquioxane D-A-D Structure Composite Polymer

To prepare composite polymers of D-A-D structure, the following examples were carried out, and coating compositions were prepared by methods equivalent to the methods described in the above Example 1. For the preparation of the catalysts and linear structures, the methods of Examples 1-a and 1-b were used in the same way, and after that, to prepare successive D-A-D structures, the following preparation methods were carried out.

[Example 2-a] Production of Excessive Successive Cage Structure

5 Parts by weight of 0.36 wt % HCl aqueous solution were very slowly dropwise added to the above Example 1-b mixture solution to adjust pH to acidic condition and stirred at the temperature of 4° C. for 30 min. After that, 25 parts by weight of diphenyltetramethoxydisiloxane which were 5 times the amount used in Example 1-b were dropwise added at a time to achieve stable hydrolysis, and after one-hour stirring, 7 parts by weight of the catalyst prepared in Example 1-a were added again to adjust the pH of the mixture solution to basic condition. In this process, unlikely the linear polymer, a precursor of D structure where alkoxy is open was formed. A small amount of the sample was taken and examined to see the residual rate of methoxy using H-NMR and IR analysis, and when the residual rate was 20%, 10 parts by weight of 0.36 wt % HCl aqueous solution were slowly dropwise added to adjust its pH to acidic condition. After that, 1 part by weight of phenyltrimethoxysilane was dropwise added at a time, and after 15-min stirring, 20 parts by weight of the catalyst prepared in Example 1-a were added. After 4-hour mixing and stirring, it was confirmed that a cage type polymer was produced in the polymers. After that, the temperature was changed into a room temperature, and tetrahydrofuran in the mixture solution was eliminated using vacuum to convert the whole reactants into an aqueous solution mixture. After 4-hour mixing and stirring, a portion was taken and analyzed, and as a result of $^{29}$Si-NMR analysis, it was confirmed that two analysis peaks of the structures introduced using phenyl groups appeared in a sharp form, and A-D polymer such as chemical formula 1 was prepared without any separate residual by-products. In addition, the styrene-converted molecular weight was measured as 14,000, and n value was 4-6. Further, since unlike the A-D structure, a peak at the vicinity of −68 ppm which appeared at the terminal of A structure disappeared in Si-NMR analysis, it was confirmed that the terminal of the A structure was all converted into D structure to produce D-A-D structure. $^{29}$Si-NMR (CDCl$_3$) δ −72.3(broad), −81.1(sharp), −80.8(sharp), −82.5(broad)

Further, silsesquioxane composite polymers were prepared by applying monomers listed in the following Table 20 and then coating compositions were prepared therefrom. The methods used in the above Example 2 were equally applied for the preparation thereof.

TABLE 20

| No. | Methods | | | Molecular weight (Mw) |
|---|---|---|---|---|
| | Monomer applied in method 1-b | Monomer applied in method 2-a | | |
| | | Precursor | Cage incorporation | |
| 2 | ECHETMS | PTMDS | PTMS | 14,000 |
| 2-1 | PTMS | PTMDS | PTMS | 9,000 |
| 2-2 | MTMS | MTMDS | MTMS | 52,000 |
| 2-3 | GPTMS | GPTMDS | GPTMS | 30,000 |

TABLE 20-continued

| No. | Methods | | | Molecular weight (Mw) |
|---|---|---|---|---|
| | Monomer applied in method 1-b | Monomer applied in method 2-a | | |
| | | Precursor | Cage incorporation | |
| 2-4 | MAPTMS | MAPTMDS | MAPTMS | 24,000 |
| 2-5 | ECHETMS | ECHETMDS | ECHETMS | 6,000 |
| 2-6 | ECHETMS | MTMDS | MTMS | 12,000 |
| 2-7 | ECHETMS | GPTMDS | GPTMS | 13,000 |
| 2-8 | ECHETMS | MAPTMDS | MAPTMS | 21,000 |
| 2-9 | PTMS | ECHETMDS | ECHETMS | 38,000 |
| 2-10 | PTMS | MTMDS | MTMS | 150,000 |
| 2-11 | PTMS | GPTMDS | GPTMS | 18,000 |
| 2-12 | PTMS | MAPTMDS | MAPTMS | 123,000 |
| 2-13 | MTMS | ECHETMDS | ECHETMS | 23,000 |
| 2-14 | MTMS | PTMDS | PTMS | 9,000 |
| 2-15 | MTMS | GPTMDS | GPTMS | 91,000 |
| 2-16 | MTMS | MAPTMDS | MAPTMS | 41,000 |
| 2-17 | GPTMS | ECHETMDS | ECHETMS | 12,000 |
| 2-18 | GPTMS | PTMDS | PTMS | 131,000 |
| 2-19 | GPTMS | MTMDS | MTMS | 110,000 |
| 2-20 | GPTMS | MAPTMDS | MAPTMS | 6,000 |
| 2-21 | MAPTMS | ECHETMDS | ECHETMS | 38,000 |
| 2-22 | MAPTMS | PTMDS | PTMS | 5,000 |
| 2-23 | MAPTMS | MTMDS | MTMS | 12,000 |
| 2-24 | MAPTMS | GPTMDS | GPTMS | 192,000 |

Example 3

Synthesis of Silsesquioxane E-A-D Structure Composite Polymer

To prepare composite polymers of E-A-D structure, the following examples were carried out, and a coating composition was prepared by methods equivalent to the methods described in the above Example 1. For the preparation of the catalysts and linear structures, the methods of Example 1 were used in the same way, and after that, the following preparation methods were carried out to produce E-A-D structure.

[Example 3-a] Production of Chain Terminal E Structure

20 Parts by weight of methylenechloride were dropwise added to the A-D mixture obtained in Example 1-c without separate purification, 5 parts by weight of 0.36 wt % HCl aqueous solution were dropwise added to adjust pH to acidic condition, and the mixture was stirred at the temperature of 4° C. for 30 min. Thereafter, 1 part by weight of dimethyltetramethoxysilane was dropwise added at a time. In the process, portions which were not yet hydrolyzed in the molecular structure were easily converted into hydrolysates in an acidic aqueous solution layer separated from the solvent and condensed with the produced separate reactants in the organic solvent layer to incorporate E into the terminal unit. After 5-hour stirring, the stirring of the reaction was ceased and the temperature of the reactor was adjusted to a room temperature.

[Example 3-b] Cage Incorporation into Terminal E Structure

The organic layer of the outcome obtained in the above Example 3-a was prepared without any separate purification and then its terminal was converted into a cage structure using a 3-functional monomer. 3 Parts by weight of methyltrimethoxysilane were dropwise added at a time to the mixture solution of Example 3-a of which the reaction was in progress, to achieve stable hydrolysis, and after 24-hour stirring, 3 parts by weight of the catalyst prepared in Example 1-a were added again to adjust the pH of the mixture solution to basic condition. In this process, a cage type polymer was incorporated into the terminal of E structure, and reaction continued successively in the reactor to form a polymer such as chemical formula 3. However, since other by-products were obtained altogether, separate purification was needed. After that, the temperature was changed into a room temperature, and tetrahydrofuran in the mixture solution was eliminated using vacuum to prepare purification.

[Example 3-c] Removal of By-products and Yield of Outcome Through Precipitation and Recrystallization After the mixture of which the reaction was complete in the above Example 3-b was obtained, it was washed using distilled water, and when the pH of distilled water layer indicated neutral, the solvent was completely eliminated using vacuum under a reduced pressure. Thereafter, the product was precipitated twice in methanol to remove unreacted monomers, and after 30 parts by weight were dissolved in a solvent where tetrahydrofuran and aqueous solution were mixed at a weight ratio of 9.5:0.5, it was stored at the temperature of −20° C. for two days. This was done to make purification easy by promoting the recrystallization of the substances which were not incorporated into the polymer and were closed as a cage structure.

After the filtration of the solid substances obtained after the recrystallization process, it was confirmed that the polymer of chemical formula 3 was obtained without several by-products using vacuum under a reduced pressure. In addition, when comparing GPC results and NMR results, it was confirmed, from the fact that a cage type in a sharp form was obtained as an outcome without any low molecules obtained alone from the growth of the polymers of each step, that a composite polymer could be obtained without any problems. This time, the molecular weight was 17,000 in styrene conversion value, n value was 4-6, and in particular, the result of chemical formula 3 is as follows.

$^{29}$Si-NMR (CDCl$_3$) δ −68.2, −71.8(sharp). −72.3(broad), −81.1(sharp), −80.8(sharp), −82.5(broad)

Further, silsesquioxane composite polymers were prepared by applying monomers listed in the following Table 21 and then coating compositions were prepared therefrom. The methods used in the above Example 3 were equally applied for the preparation thereof.

TABLE 21

| | | Methods | | | | |
|---|---|---|---|---|---|---|
| | | Monomer applied in method 1-c | | | | |
| | Monomer | | | Monomer | Monomer | |
| No. | applied in method 1-b | Precursor | Cage incorporation | applied in method 3-a | applied in method 3-b | Mw |
| 3 | ECHETMS | PTMDS | PTMS | MTMDS | MAPTMS | 17,000 |
| 3-1 | ECHETMS | ECHETMDS | ECHETMS | ECHETMDS | ECHETMS | 12,000 |
| 3-2 | PTMS | PTMDS | PTMS | PTMDS | PTMS | 18,000 |
| 3-3 | MTMS | MTMDS | MTMS | MTMDS | MTMS | 59,000 |
| 3-4 | GPTMS | ECHETMDS | ECHETMS | GPTMDS | GPTMS | 41,000 |
| 3-5 | MAPTMS | MAPTMDS | MAPTMS | MAPTMDS | MAPTMS | 31,000 |
| 3-6 | ECHETMS | ECHETMDS | ECHETMS | PTMDS | PTMS | 16,000 |
| 3-7 | ECHETMS | ECHETMDS | ECHETMS | MTMDS | MTMS | 12,000 |
| 3-8 | ECHETMS | ECHETMDS | ECHETMS | GPTMDS | GPTMS | 16,000 |
| 3-9 | ECHETMS | ECHETMDS | ECHETMS | MAPTMDS | MAPTMS | 92,000 |
| 3-10 | ECHETMS | PTMDS | PTMS | ECHETMDS | ECHETMS | 25,000 |
| 3-11 | ECHETMS | MTMDS | MTMS | ECHETMDS | ECHETMS | 38,000 |
| 3-12 | ECHETMS | GPTMDS | GPTMS | ECHETMDS | ECHETMS | 56,000 |
| 3-13 | ECHETMS | MAPTMDS | MAPTMS | ECHETMDS | ECHETMS | 97,000 |
| 3-14 | PTMS | PTMDS | PTMS | ECHETMDS | ECHETMS | 24,000 |
| 3-15 | PTMS | PTMDS | PTMS | MTMDS | MTMS | 31,000 |
| 3-16 | PTMS | PTMDS | PTMS | ECHETMDS | ECHETMS | 21,000 |
| 3-17 | PTMS | PTMDS | PTMS | MAPTMDS | MAPTMS | 64,000 |
| 3-18 | PTMS | ECHETMDS | ECHETMS | PTMDS | PTMS | 120,000 |
| 3-19 | PTMS | MTMDS | MTMS | PTMDS | PTMS | 210,000 |
| 3-20 | PTMS | GPTMDS | GPTMS | PTMDS | PTMS | 23,000 |
| 3-21 | PTMS | MAPTMDS | MAPTMS | PTMDS | PTMS | 160,000 |
| 3-22 | MTMS | MTMDS | MTMS | ECHETMDS | ECHETMS | 63,000 |
| 3-23 | MTMS | MTMDS | MTMS | PTMDS | PTMS | 52,000 |
| 3-24 | MTMS | MTMDS | MTMS | GPTMDS | GPTMS | 73,000 |
| 3-25 | MTMS | MTMDS | MTMS | MAPTMDS | MAPTMS | 98,000 |
| 3-26 | MTMS | ECHETMDS | ECHETMS | MTMDS | MTMS | 41,000 |
| 3-27 | MTMS | PTMDS | PTMS | MTMDS | MTMS | 15,000 |
| 3-28 | MTMS | GPTMDS | GPTMS | MTMDS | MTMS | 110,000 |
| 3-29 | MTMS | MAPTMDS | MAPTMS | MTMDS | MTMS | 45,000 |
| 3-30 | GPTMS | GPTMDS | GPTMS | ECHETMDS | ECHETMS | 35,000 |
| 3-31 | GPTMS | GPTMDS | GPTMS | PTMDS | PTMS | 33,000 |
| 3-32 | GPTMS | GPTMDS | GPTMS | MTMDS | MTMS | 48,000 |
| 3-33 | GPTMS | GPTMDS | GPTMS | MAPTMDS | MAPTMS | 29,000 |
| 3-34 | GPTMS | ECHETMDS | ECHETMS | GPTMDS | GPTMS | 19,000 |
| 3-35 | GPTMS | PTMDS | PTMS | GPTMDS | GPTMS | 156,000 |
| 3-36 | GPTMS | MTMDS | MTMS | GPTMDS | GPTMS | 116,000 |
| 3-37 | GPTMS | MAPTMDS | MAPTMS | GPTMDS | GPTMS | 12,000 |
| 3-38 | MAPTMS | MAPTMDS | MAPTMS | ECHETMDS | ECHETMS | 31,000 |

TABLE 21-continued

| | | Methods | | | |
|---|---|---|---|---|---|
| | | Monomer applied in method 1-c | | Monomer | Monomer |
| No. | Monomer applied in method 1-b | Precursor | Cage incorporation | applied in method 3-a | applied in method 3-b | Mw |
| 3-39 | MAPTMS | MAPTMDS | MAPTMS | PTMDS | PTMS | 28,000 |
| 3-40 | MAPTMS | MAPTMDS | MAPTMS | MTMDS | MTMS | 35,000 |
| 3-41 | MAPTMS | MAPTMDS | MAPTMS | GPTMDS | GPTMS | 31,000 |
| 3-42 | MAPTMS | ECHETMDS | ECHETMS | MAPTMDS | MAPTMS | 57,000 |
| 3-43 | MAPTMS | PTMDS | PTMS | MAPTMDS | MAPTMS | 9,000 |
| 3-44 | MAPTMS | MTMDS | MTMS | MAPTMDS | MAPTMS | 19,000 |
| 3-45 | MAPTMS | GPTMDS | GPTMS | MAPTMDS | MAPTMS | 213,000 |

Example 4

Synthesis of A-B-D Structure Composite Silsesquioxane Polymer

Synthesis was carried out by successive hydrolysis and condensation in stages as described below to prepare composite polymers of A-B-D structure, and coating compositions were prepared by methods equivalent to the methods described in the above Example 1.

[Example 4-a] Preparation of Catalyst for Hydrolysis and Condensation Reaction

To control the basicity, catalyst 1a was prepared by mixing tetramethylammonium hydroxide (TMAH) 25 wt % aqueous solution with 10 wt % potassium hydroxide (KOH) aqueous solution.

[Example 4-b] Synthesis of Linear Silsesquioxane Structure (Synthesis of A-B Precursor)

5 Parts by weight of distilled water, 40 parts by weight of tetrahydrofuran, and 0.5 part by weight of the catalyst prepared in Example 4-a were dropwise added in a dry flask equipped with a cooling tube and a stirrer and stirred at a room temperature for one hour, and after that, 10 parts by weight of 2-(3,4-epoxycyclohexyl)ethyltrimethoxysilane were dropwise added thereto and 20 parts by weight of tetrahydrofuran were dropwise added again, and then the mixture was further stirred for 2 hours. The stirring mixture solution was taken and rinsed twice to remove the catalyst and impurities, and after filtration, a linear silsesquioxane where remaining alkoxy group was 0.1 mmol/g or less through $^1$H-NMR analysis was obtained, and this was a portion used to subsequently generate a cage type by successive reaction. The configuration of the linear structure was analyzed through XRD analysis, which confirmed that the overall structure is a linear structure. As a result of measuring its molecular weight, it was confirmed that silsesquioxane of the linear structure has a styrene-converted molecular weight of 6,000.

$^1$H-NMR (CDCl$_3$) δ 3.7, 3.4, 3.3(broad), 3.1, 2.8, 2.6, 1.5(broad), 0.6.

[Example 4-c] pH Conversion Reaction for Production of Cage Structure within Chain (Incorporation of B,D Structure)

5 Parts by weight of 0.36 wt % HCl aqueous solution were very slowly dropwise added to the above Example 4-b mixture solution of which the reaction was in progress to adjust pH to acidic condition and stirred at the temperature of 4° C. for 30 min. After that, 5 parts by weight of diphenyltetramethoxydisiloxane were dropwise added at a time, and after one-hour stirring, 5 parts by weight of the catalyst prepared in Example 4-a were added again to adjust the pH of the mixture solution to basic condition. In this process, it was confirmed that separately from the linear structure, a cage-type structure was produced and incorporated into the polymer chain, the temperature was changed into a room temperature, and tetrahydrofuran in the mixture solution was eliminated using vacuum to convert the whole reactants into an aqueous mixture. After 4-hour mixing and stirring, a portion was taken and analyzed, and as a result of $^{29}$Si-NMR and $^1$H-NMR analysis, it was confirmed that the amount of alkoxy group present in the B structure was changed into 0.025 mmol/g and repeat units of B and D were introduced at about 5:5 ratio. In addition, the styrene-converted molecular weight was measured as 10,000. Furthermore, although a cage type structure was incorporated, there was no molecular weight distribution for a single cage type substance in the GPC forms of the polymer, and it was thus confirmed that the cage type structure was well incorporated into the polymer chain via successive reaction.

$^1$H-NMR (CDCl$_3$) δ 7.5, 7.2, 3.7, 3.4, 3.3(broad), 3.1, 2.8, 2.6, 1.5(broad), 0.6. $^{29}$Si-NMR (CDCl$_3$) δ −72.5(broad), −81.1(sharp), −80.8(sharp), −79.9(sharp), −82.5(broad)

[Example 4-d] Incorporation of X into B Structure (Incorporation of B,D Structure)

The organic layer of the outcome obtained in the above Example 4-c was prepared without any separate purification and then its terminal was converted into a cage structure using a 3-functional monomer. 100 Parts by weight of the substance obtained in Example 4-c were dissolved in 50 parts by weight of tetrahydrofuran and then 5 parts by weight of distilled water were added thereto to prepare a mixture solution. Thereafter, 10 parts by weight of 0.36 wt % HCl were added to the prepared mixture solution and stirred for 10 min and then, 3 parts by weight of methyltrimethoxysilane were dropwise added at a time to achieve stable hydrolysis. After 24-hour stirring, 3 parts by weight of the catalyst prepared in Example 4-a were added again to adjust the pH of the mixture solution to basic condition. In this process, a cage type polymer was incorporated into X portion of B structure, and reaction continued successively in the reactor to form a polymer such as chemical formula 4. However, since other by-products were obtained altogether, separate purification was needed. After that, the temperature was changed into a room temperature, and tetrahydrofuran in the mixture solution was eliminated using vacuum to prepare purification.

[Example 4-e] Removal of By-products and Yield of Outcome Through Precipitation and Recrystallization 200 Parts by weight of methylenechloride were added to the mixture of which the reaction was complete in the above Example 4-d, were subject to fractionation wash along with distilled water, and when the pH of distilled water layer indicated neutral, the solvent was completely eliminated using vacuum under a reduced pressure. Thereafter, the product was precipitated twice in methanol to remove unreacted monomers, and after 30 parts by weight were dissolved in a solvent where tetrahydrofuran and aqueous solution were mixed at a weight ratio of 9.5:0.5, it was stored at the temperature of −20° C. for two days. This was done to make purification easy by promoting recrystallization of the substances which were not incorporated into the polymer and were closed as a cage structure.

After the filtration of the solid substances obtained after the recrystallization process, it was confirmed that the polymer of chemical formula 4 was obtained without several by-products using vacuum under a reduced pressure. In addition, when comparing GPC results and NMR results, it was confirmed, from the fact that a cage type in a sharp form was obtained as an outcome without any low molecules obtained alone from the growth of the polymers of each step, that a composite polymer could be obtained without any problems. This time, the molecular weight was 12,000 in styrene conversion value, n value of X was 4-6, n value of Y was 4-6, and in particular, the result of chemical formula 4 is as follows.

$^{29}$Si-NMR (CDCl$_3$) δ −72.5(broad), −81.1(sharp), −80.8(sharp), −79.9(sharp), −81.5(sharp), −82.5(broad)

Further, silsesquioxane composite polymers were prepared by applying monomers listed in the following Table 22 and then coating compositions were prepared therefrom. The methods used in the above Example 4 were equally applied for the preparation thereof.

TABLE 22

| | Methods | | | |
|---|---|---|---|---|
| No. | Monomer applied in method 4-b | Monomer applied in method 4-c | Monomer applied in method 4-d | Molecular weight (Mw) |
| 4 | ECHETMS | PTMDS | MTMS | 12,000 |
| 4-1 | PTMS | PTMDS | PTMS | 15,000 |
| 4-2 | MTMS | MTMDS | MTMS | 16,000 |
| 4-3 | GPTMS | GPTMDS | GPTMS | 56,000 |
| 4-4 | MAPTMS | MAPTMDS | MAPTMS | 9,500 |
| 4-5 | ECHETMS | ECHETMDS | ECHETMS | 7,500 |
| 4-6 | ECHETMS | MTMDS | MTMS | 16,000 |
| 4-7 | ECHETMS | GPTMDS | GPTMS | 23,000 |
| 4-8 | ECHETMS | MAPTMDS | MAPTMS | 9,500 |
| 4-9 | PTMS | ECHETMDS | ECHETMS | 72,000 |
| 4-10 | PTMS | MTMDS | MTMS | 68,000 |
| 4-11 | PTMS | GPTMDS | GPTMS | 11,000 |
| 4-12 | PTMS | MAPTMDS | MAPTMS | 110,000 |
| 4-13 | MTMS | ECHETMDS | ECHETMS | 23,000 |
| 4-14 | MTMS | PTMDS | PTMS | 9,500 |
| 4-15 | MTMS | GPTMDS | GPTMS | 64,000 |
| 4-16 | MTMS | MAPTMDS | MAPTMS | 12,000 |
| 4-17 | GPTMS | ECHETMDS | ECHETMS | 8,000 |
| 4-18 | GPTMS | PTMDS | PTMS | 451,000 |
| 4-19 | GPTMS | MTMDS | MTMS | 320,000 |

TABLE 22-continued

| | Methods | | | |
|---|---|---|---|---|
| No. | Monomer applied in method 4-b | Monomer applied in method 4-c | Monomer applied in method 4-d | Molecular weight (Mw) |
| 4-20 | GPTMS | MAPTMDS | MAPTMS | 15,000 |
| 4-21 | MAPTMS | ECHETMDS | ECHETMS | 45,000 |
| 4-22 | MAPTMS | PTMDS | PTMS | 351,000 |
| 4-23 | MAPTMS | MTMDS | MTMS | 14,000 |
| 4-24 | MAPTMS | GPTMDS | GPTMS | 160,000 |

Example 5

Synthesis of D-A-B-D Structure Composite Silsesquioxane Polymer

The following methods were used to prepare composite polymers of D-A-B-D structure, and coating compositions were prepared by methods equivalent to the methods described in the above Example 1.

[Example 5-a] pH Conversion Reaction for Production of Excess D Structure (Incorporation of B,D Structure)

5 Parts by weight of 0.36 wt % HCl aqueous solution were very slowly added to the mixture solution of Example 4-b of which the reaction was in progress, to adjust pH to acidic condition, and stirred at the temperature of 4° C. for 30 min. Thereafter, diphenyltetramethoxydisiloxane was prepared in an amount of 25 parts by weight which was 5 times of Example 4-b and dropwise added at a time, and after one-hour stirring, 5 parts by weight of the catalyst prepared in Example 1-a were added again to adjust the pH of the mixture solution to basic condition. After the reaction was complete, the temperature was changed into a room temperature, tetrahydrofuran in the mixture solution was eliminated using vacuum to convert the whole reactants into an aqueous mixture. After 4-hour mixing and stirring, a portion was taken and analyzed, and as a result of $^{29}$Si-NMR and $^1$H-NMR analysis, it was confirmed that the amount of alkoxy group present in the B structure was changed into 0.012 mmol/g and repeat units of B and D were introduced at about 1:9 ratio. In addition, the styrene-converted molecular weight was measured as 24,000. Furthermore, although a cage type structure was introduced, there was no molecular weight distribution for a single cage type substance in the GPC forms of the polymer, and it was thus confirmed that the cage type structure was well incorporated into the polymer chain via successive reaction.

$^1$H-NMR (CDCl$_3$) δ 7.5, 7.2, 3.7, 3.4, 3.3(broad), 3.1, 2.8, 2.6, 1.5(broad), 0.6. $^{29}$Si-NMR (CDCl$_3$) δ −72.5(broad), −81.1(sharp), −80.8(sharp), −79.9(sharp), −82.5(broad)

[Example 5-b] Incorporation of X into B Structure (Incorporation of B,D Structure)

The organic layer of the outcome obtained in the above Example 5-a was prepared without any separate purification and then its terminal was converted into a cage structure using a 3-functional monomer. 100 parts by weight of the substance obtained in Example 5-a were dissolved in 50 parts by weight of tetrahydrofuran and then 5 parts by weight of distilled water were added thereto to prepare a mixture solution. Thereafter, 10 parts by weight of 0.36 wt % HCl were added to the prepared mixture solution and stirred for 10 min and then, 3 parts by weight of methyltrimethoxysilane were dropwise added at a time to achieve stable hydrolysis. After 24-hour stirring, 3 parts by weight of the catalyst prepared in Example 4-a were added again to adjust the pH of the mixture solution to basic condition. In this process, a cage type polymer was incorporated into X portion of B structure, and reaction continued successively in the reactor to form a polymer such as chemical formula 5. However, since other by-products were obtained altogether, separate purification was needed. Thereafter, the temperature was changed into a room temperature, and tetrahydrofuran in the mixture solution was eliminated using vacuum to prepare purification.

[Example 5-c] Removal of By-products and Yield of Outcome Through Precipitation and Recrystallization 200 Parts by weight of methylenechloride were added to the mixture of which the reaction was complete in the above Example 5-b, were subject to fractionation wash along with distilled water, and when the pH of distilled water layer indicated neutral, the solvent was completely eliminated using vacuum under a reduced pressure. Thereafter, the product was precipitated twice in methanol to remove unreacted monomers, and after 30 parts by weight were dissolved in a solvent where tetrahydrofuran and aqueous solution were mixed at a weight ratio of 9.5:0.5, it was stored at the temperature of −20° C. for two days. This was done to make purification easy by promoting recrystallization of the substances which were not incorporated into the polymer and were closed as a cage structure.

After the filtration of the solid substances obtained after the recrystallization process, it was confirmed that the polymer of chemical formula 5 was obtained without several by-products using vacuum under a reduced pressure. In addition, when comparing GPC results and NMR results, it was confirmed, from the fact that a cage type in a sharp form was obtained as an outcome without any low molecules obtained alone from the growth of the polymers of each step, that a composite polymer could be obtained without any problems. This time, the molecular weight was 16,000 in styrene conversion value, n value of X was 4-6, n value of Y was 4-6, and in particular, the result of chemical formula 5 is as follows.

$^{29}$Si-NMR (CDCl$_3$) δ −72.5(broad), −81.1(sharp), −80.8(sharp), −79.9(sharp), −81.5(sharp), −82.5(broad)

Further, silsesquioxane composite polymers were prepared by applying monomers listed in the following Table 23 and then coating compositions were prepared therefrom. The methods used in the above Example 5 were equally applied for the preparation thereof.

TABLE 23

| No. | Method | | | Molecular weight (Mw) |
|---|---|---|---|---|
| | Monomer applied in method 4-b | Monomer applied in method 4-a | Monomer applied in method 5-b | |
| 2 | ECHETMS | PTMDS | MTMS | 16,000 |
| 5-1 | PTMS | PTMDS | PTMS | 19,000 |
| 5-2 | MTMS | MTMDS | MTMS | 20,000 |
| 5-3 | GPTMS | GPTMDS | GPTMS | 63,000 |
| 5-4 | MAPTMS | MAPTMDS | MAPTMS | 12,000 |
| 5-5 | ECHETMS | ECHETMDS | ECHETMS | 14,500 |
| 5-6 | ECHETMS | MTMDS | MTMS | 19,000 |
| 5-7 | ECHETMS | GPTMDS | GPTMS | 25,000 |
| 5-8 | ECHETMS | MAPTMDS | MAPTMS | 11,500 |
| 5-9 | PTMS | ECHETMDS | ECHETMS | 78,000 |
| 5-10 | PTMS | MTMDS | MTMS | 79,000 |
| 5-11 | PTMS | GPTMDS | GPTMS | 15,000 |
| 5-12 | PTMS | MAPTMDS | MAPTMS | 124,000 |
| 5-13 | MTMS | ECHETMDS | ECHETMS | 30,000 |
| 5-14 | MTMS | PTMDS | PTMS | 12,000 |
| 5-15 | MTMS | GPTMDS | GPTMS | 64,000 |
| 5-16 | MTMS | MAPTMDS | MAPTMS | 13,000 |
| 5-17 | GPTMS | ECHETMDS | ECHETMS | 12,000 |
| 5-18 | GPTMS | PTMDS | PTMS | 631,000 |
| 5-19 | GPTMS | MTMDS | MTMS | 421,000 |
| 5-20 | GPTMS | MAPTMDS | MAPTMS | 18,000 |
| 5-21 | MAPTMS | ECHETMDS | ECHETMS | 65,000 |
| 2-22 | MAPTMS | PTMDS | PTMS | 425,000 |
| 5-23 | MAPTMS | MTMDS | MTMS | 25,000 |
| 5-24 | MAPTMS | GPTMDS | GPTMS | 213,000 |

Example 6

Synthesis of Silsesquioxane E-A-B-D Structure Composite Polymer

The following methods were used to prepare composite polymers of E-A-B-D structure, and coating compositions were prepared by methods equivalent to the methods described in the above Example 1.

[Example 6-a] Production of Chain Terminal E Structure

20 Parts by weight of methylenechloride were dropwise added to the mixture obtained in Example 4-c without separate purification, 5 parts by weight of 0.36 wt % HCl aqueous solution were dropwise added to adjust pH to acidic condition, and the mixture was stirred at the temperature of 4° C. for 30 min. Thereafter, 1 part by weight of dimethyltetramethoxysilane was dropwise added at a time. In the process, portions which were not yet hydrolyzed in the molecular structure were easily converted into hydrolysates in an acidic aqueous solution layer separated from the solvent and condensed with the produced separate reactants in the organic solvent layer to incorporate E into the terminal unit. After 5-hour stirring, the stirring of the reaction was ceased and the temperature of the reactor was adjusted to a room temperature.

[Example 6-b] Cage Incorporation into X of B Structure and Terminal E Structure

The organic layer of the outcome obtained in the above Example 6-a was prepared without any separate purification and then its terminal was converted into a cage structure using a 3-functional monomer. 3 Parts by weight of methyltrimethoxysilane were dropwise added at a time to the mixture solution of Example 6-a of which the reaction was in progress, to achieve stable hydrolysis. After 24-hour stirring, 3 parts by weight of the catalyst prepared in Example 1-a were added again to adjust the pH of the mixture solution to basic condition. In this process, a cage type polymer was incorporated into the terminal of E structure, and reaction continued successively in the reactor to form a polymer such as chemical formula 6. However, since other by-products were obtained altogether, separate purification was needed. Thereafter, the temperature was changed into a room temperature, and tetrahydrofuran in the mixture solution was eliminated using vacuum to prepare purification.

[Example 6-c] Removal of by-products and Yield of Outcome Through Precipitation and Recrystallization After the mixture of which the reaction was complete in the above Example 6-b was obtained, it was washed with distilled water, and when the pH of distilled water layer indicated neutral, the solvent was completely eliminated using vacuum under a reduced pressure. Thereafter, the product was precipitated twice in methanol to remove unreacted monomers, and after 30 parts by weight were dissolved in a solvent where tetrahydrofuran and aqueous solution were mixed at a weight ratio of 9.5:0.5, it was stored at the temperature of −20° C. for two days. This was done to make purification easy by promoting the recrystallization of the substances which were not incorporated into the polymer and were closed as a cage structure.

After the filtration of the solid substances obtained after the recrystallization process, it was confirmed that the polymer of chemical formula 6 was obtained without several by-products using vacuum under a reduced pressure. In addition, when comparing GPC results and NMR results, it was confirmed, from the fact that a cage type in a sharp form was obtained as an outcome without any low molecules obtained alone from the growth of the polymers of each step, that a composite polymer could be obtained without any problems. This time, the molecular weight was 21,000 in styrene conversion value, n value of X was 4-6, n value of Y was 4-6, and in particular, the result of chemical formula 6 is as follows.

$^{29}$Si-NMR (CDCl$_3$) δ 68.2, −71.8(sharp). −72.3(broad), −81.1(sharp), −80.8(sharp), −82.5(broad)

Further, silsesquioxane composite polymers were prepared by applying monomers listed in the following Table 24. The methods used in the above Example 6 were equally applied for the preparation thereof.

TABLE 24

| No. | Monomer applied in method 4-b | Monomer applied in method 4-c | Monomer applied in method 6-a | Monomer applied in method 6-b | Mw |
|---|---|---|---|---|---|
| 6 | ECHETMS | PTMDS | MTMDS | MAPTMS | 21,000 |
| 6-1 | ECHETMS | ECHETMDS | ECHETMDS | ECHETMS | 18,000 |
| 6-2 | PTMS | PTMDS | PTMDS | PTMS | 19,000 |
| 6-3 | MTMS | MTMDS | MTMDS | MTMS | 31,000 |
| 6-4 | GPTMS | ECHETMDS | GPTMDS | GPTMS | 63,000 |
| 6-5 | MAPTMS | MAPTMDS | MAPTMDS | MAPTMS | 125,000 |
| 6-6 | ECHETMS | ECHETMDS | PTMDS | PTMS | 18,000 |
| 6-7 | ECHETMS | ECHETMDS | MTMDS | MTMS | 14,000 |
| 6-8 | ECHETMS | ECHETMDS | GPTMDS | GPTMS | 20,000 |
| 6-9 | ECHETMS | ECHETMDS | MAPTMDS | MAPTMS | 91,000 |
| 6-10 | ECHETMS | PTMDS | ECHETMDS | ECHETMS | 18,000 |
| 6-11 | ECHETMS | MTMDS | ECHETMDS | ECHETMS | 121,000 |
| 6-12 | ECHETMS | GPTMDS | ECHETMDS | ECHETMS | 80,000 |
| 6-13 | ECHETMS | MAPTMDS | ECHETMDS | ECHETMS | 112,000 |
| 6-14 | PTMS | PTMDS | ECHETMDS | ECHETMS | 35,000 |
| 6-15 | PTMS | PTMDS | MTMDS | MTMS | 91,000 |
| 6-16 | PTMS | PTMDS | ECHETMDS | ECHETMS | 45,000 |
| 6-17 | PTMS | PTMDS | MAPTMDS | MAPTMS | 75,000 |
| 6-18 | PTMS | ECHETMDS | PTMDS | PTMS | 140,000 |
| 6-19 | PTMS | MTMDS | PTMDS | PTMS | 220,000 |
| 6-20 | PTMS | GPTMDS | PTMDS | PTMS | 51,000 |
| 6-21 | PTMS | MAPTMDS | PTMDS | PTMS | 73,000 |
| 6-22 | MTMS | MTMDS | ECHETMDS | ECHETMS | 69,000 |
| 6-23 | MTMS | MTMDS | PTMDS | PTMS | 51,000 |
| 6-24 | MTMS | MTMDS | GPTMDS | GPTMS | 91,000 |
| 6-25 | MTMS | MTMDS | MAPTMDS | MAPTMS | 128,000 |
| 6-26 | MTMS | ECHETMDS | MTMDS | MTMS | 68,000 |
| 6-27 | MTMS | PTMDS | MTMDS | MTMS | 45,000 |
| 6-28 | MTMS | GPTMDS | MTMDS | MTMS | 265,000 |
| 6-29 | MTMS | MAPTMDS | MTMDS | MTMS | 105,000 |
| 6-30 | GPTMS | GPTMDS | ECHETMDS | ECHETMS | 101,000 |
| 6-31 | GPTMS | GPTMDS | PTMDS | PTMS | 95,000 |
| 6-32 | GPTMS | GPTMDS | MTMDS | MTMS | 73,000 |
| 6-33 | GPTMS | GPTMDS | MAPTMDS | MAPTMS | 51,000 |
| 6-34 | GPTMS | ECHETMDS | GPTMDS | GPTMS | 31,000 |
| 6-35 | GPTMS | PTMDS | GPTMDS | GPTMS | 315,000 |
| 6-36 | GPTMS | MTMDS | GPTMDS | GPTMS | 125,000 |
| 6-37 | GPTMS | MAPTMDS | GPTMDS | GPTMS | 45,000 |
| 6-38 | MAPTMS | MAPTMDS | ECHETMDS | ECHETMS | 94,000 |
| 6-39 | MAPTMS | MAPTMDS | PTMDS | PTMS | 35,000 |
| 6-40 | MAPTMS | MAPTMDS | MTMDS | MTMS | 80,000 |
| 6-41 | MAPTMS | MAPTMDS | GPTMDS | GPTMS | 83,000 |
| 6-42 | MAPTMS | ECHETMDS | MAPTMDS | MAPTMS | 74,000 |
| 6-43 | MAPTMS | PTMDS | MAPTMDS | MAPTMS | 10,000 |
| 6-44 | MAPTMS | MTMDS | MAPTMDS | MAPTMS | 65,000 |
| 6-45 | MAPTMS | GPTMDS | MAPTMDS | MAPTMS | 418,000 |

Example 7

Synthesis of Silsesquioxane A-B-A-D Structure Composite Polymer

Synthesis was carried out by successive hydrolysis and condensation in stages as described below, and coating compositions were prepared by methods equivalent to the methods described in the above Example 1.

[Example 7-a] Preparation of Catalyst

To control the basicity, catalyst 1a was prepared by mixing tetramethylammonium hydroxide (TMAH) 25 wt % aqueous solution with 10 wt % potassium hydroxide (KOH) aqueous solution.

[Example 7-b] Synthesis of Linear Silsesquioxane (A Precursor)

5 Parts by weight of distilled water, 15 parts by weight of tetrahydrofuran, and 1 part by weight of the catalyst prepared in Example 1-a were dropwise added in a dry flask equipped with a cooling tube and a stirrer and stirred at a room temperature for one hour, and after that, 20 parts by weight of 2-(3,4-epoxycyclohexyl)ethyltrimethoxysilane were dropwise added thereto and 15 parts by weight of tetrahydrofuran were dropwise added again, and then the mixture was further stirred for 5 hours. The stirring mixture solution was taken and rinsed twice to remove the catalyst and impurities, and after filtration, it was confirmed that SI—OH functional groups were produced at the terminal group through the IR analysis (3200 $cm^{-1}$) and as a result of measuring its molecular weight, it was confirmed that silsesquioxane of a linear structure has a styrene-converted molecular weight of 6,000.

[Example 7-c] Synthesis of Linear Silsesquioxane Structure (Synthesis of A-B Precursor)

5 Parts by weight of distilled water, 40 parts by weight of tetrahydrofuran, and 0.5 part by weight of the catalyst prepared in Example 1-a were dropwise added in a dry flask equipped with a cooling tube and a stirrer and stirred at a room temperature for one hour, and after that, 10 parts by weight of 2-(3,4-epoxycyclohexyl)ethyltrimethoxysilane were dropwise added thereto and 20 parts by weight of tetrahydrofuran were dropwise added again, and then the mixture was further stirred for 2 hours. The stirring mixture solution was taken and rinsed twice to remove the catalyst and impurities, and after filtration, a linear silsesquioxane where remaining alkoxy group is 0.1 mmol/g or less through $^1$H-NMR analysis was obtained, and this was a portion used to subsequently generate a cage type by successive reaction. The configuration of the linear structure was analyzed through XRD analysis, which confirmed that its overall structure is a linear structure. As a result of measuring its molecular weight, it was confirmed that silsesquioxane of the linear structure has a styrene-converted molecular weight of 8,000.

[Example 7-d] Synthesis of Linear Silsesquioxane Structure (Synthesis of A-B-A Precursor)

5 Parts by weight of distilled water, 5 parts by weight of tetrahydrofuran, and 10 part by weight of the catalyst prepared in Example 7-a were dropwise added in a dry flask equipped with a cooling tube and a stirrer and stirred at a room temperature for one hour, and after that, 20 parts by weight of Example 7-b precursor and 7-c precursor respectively were dropwise added thereto and 10 parts by weight of tetrahydrofuran were dropwise added again, and then the mixture was further stirred for 24 hours. The stirring mixture solution was taken and rinsed twice to remove the catalyst and impurities, and after filtration, it was confirmed that SI—OH functional groups were produced at the terminal group through the IR analysis (3200 $cm^{-1}$) and as a result of measuring its molecular weight, it was confirmed that silsesquioxane of a linear structure has a styrene-converted molecular weight of 15,000.

$^1$H-NMR (CDCl$_3$) δ 3.7, 3.4, 3.3(broad), 3.1, 2.8, 2.6, 1.5(broad), 0.6.

[Example 7-e] Production of Successive Cage Structure (Incorporation of D Structure)

5 Parts by weight of 0.36 wt % HCl aqueous solution was very slowly dropwise added to the above Example 7-d mixture solution to adjust pH to acidic condition and stirred at the temperature of 4° C. for 30 min. After that, 5 parts by weight of diphenyltetramethoxydisiloxane were dropwise added at a time to achieve stable hydrolysis, and after one-hour stirring, 7 parts by weight of the catalyst prepared in Example 7-a were added again to adjust the pH of the mixture solution to basic condition. In this process, unlikely the linear polymer, a precursor of D structure where alkoxy is open was formed. A small amount of the sample was taken and examined to see the residual rate of methoxy using H-NMR and IR analysis, and when the residual rate was 10%, 10 parts by weight of 0.36 wt % HCl aqueous solution were slowly dropwise added to adjust its pH to acidic condition. After that, 1 part by weight of phenyltrimethoxysilane was dropwise added at a time, and after 15-min stirring, 20 parts by weight of the catalyst prepared in Example 1-a were added. After 4-hour mixing and stirring, it was confirmed that a cage type polymer was produced in the polymers. After that, the temperature was changed into a room temperature, and tetrahydrofuran in the mixture solution was eliminated using vacuum to convert the whole reactants into an aqueous solution mixture. After 4-hour mixing and stirring, a portion was taken and analyzed, and as a result of $^{29}$Si-NMR analysis, it was confirmed that two analysis peaks of the structures introduced using phenyl groups appeared in a sharp form and a polymer such as chemical formula 7 was prepared without any separate residual by-products. In addition, the styrene-converted molecular weight was measured as 18,000.

$^{29}$Si-NMR (CDCl$_3$) δ −68.2, −72.3(broad), −81.1(sharp), −80.8(sharp), −82.5(broad)

[Example 7-f] Incorporation of X into B Structure (Completion of A-B-A-D Structure)

The organic layer of the outcome obtained in the above Example 1-e was prepared without any separate purification and then its terminal was converted into a cage structure using a 3-functional monomer. 100 Parts by weight of the substance obtained in Example 7-e were dissolved in 50 parts by weight of tetrahydrofuran and then 5 parts by weight of distilled water were added thereto to prepare a mixture solution. Thereafter, 10 parts by weight of 0.36 wt % HCl were added to the prepared mixture solution and stirred for 10 min and then, 3 parts by weight of methyltrimethoxysilane were dropwise added at a time to achieve stable hydrolysis. After 24-hour stirring, 3 parts by weight of the catalyst prepared in Example 7-a were added again to adjust the pH of the mixture solution to basic condition. In this process, a cage type polymer was incorporated into X portion of B structure, and reaction continued successively in a reactor to form a polymer such as chemical formula 7. However, since other by-products were obtained altogether, separate purification was needed. Thereafter, the temperature was changed into a room temperature, and tetrahydrofuran in the mixture solution was eliminated using vacuum to prepare purification.

[Example 7-g] Removal of By-products and Yield of Outcome Through Precipitation and Recrystallization 200 Parts by weight of methylenechloride were added to the mixture of which the reaction was complete in the above Example 7-f, were subject to fractionation wash along with distilled water, and when the pH of distilled water layer indicated neutral, the solvent was completely eliminated using vacuum under a reduced pressure. Thereafter, the product was precipitated twice in methanol to remove unreacted monomers, and after 30 parts by weight were dissolved in a solvent where tetrahydrofuran and aqueous solution were mixed at a weight ratio of 9.5:0.5, it was stored at the temperature of −20° C. for two days. This was done to make purification easy by promoting recrystallization of the substances which were not incorporated into the polymer and were closed as a cage structure.

After the filtration of the solid substances obtained after the recrystallization process, it was confirmed that the polymer of chemical formula 7 was obtained without several by-products using vacuum under a reduced pressure. In addition, when comparing GPC results and NMR results, it was confirmed, from the fact that a cage type in a sharp form was obtained as an outcome without any low molecules obtained alone from the growth of the polymers of each step, that a composite polymer could be obtained without any problems. This time, the molecular weight was 24,000 in styrene conversion value, n value of X was 4-6, and n value of Y was 4-6.

Further, silsesquioxane composite polymers were prepared by applying monomers listed in the following Table 25. The methods used in the above Example 7 were equally applied for the preparation thereof.

TABLE 25

| No. | Monomer applied in method 7-b, c | Monomer applied in method 7-e | Monomer applied in method 7-f | Molecular weight (Mw) |
| --- | --- | --- | --- | --- |
| 7 | ECHETMS | PTMDS | MTMS | 24,000 |
| 7-1 | PTMS | PTMDS | PTMS | 11,000 |
| 7-2 | MTMS | MTMDS | MTMS | 13,000 |
| 7-3 | GPTMS | GPTMDS | GPTMS | 23,000 |
| 7-4 | MAPTMS | MAPTMDS | MAPTMS | 14,500 |
| 7-5 | ECHETMS | ECHETMDS | ECHETMS | 12,500 |
| 7-6 | ECHETMS | MTMDS | MTMS | 53,000 |
| 7-7 | ECHETMS | GPTMDS | GPTMS | 11,000 |
| 7-8 | ECHETMS | MAPTMDS | MAPTMS | 9,000 |
| 7-9 | PTMS | ECHETMDS | ECHETMS | 48,000 |
| 7-10 | PTMS | MTMDS | MTMS | 90,000 |
| 7-11 | PTMS | GPTMDS | GPTMS | 32,000 |
| 7-12 | PTMS | MAPTMDS | MAPTMS | 150,000 |
| 7-13 | MTMS | ECHETMDS | ECHETMS | 17,000 |
| 7-14 | MTMS | PTMDS | PTMS | 38,500 |
| 7-15 | MTMS | GPTMDS | GPTMS | 15,000 |
| 7-16 | MTMS | MAPTMDS | MAPTMS | 17,000 |
| 7-17 | GPTMS | ECHETMDS | ECHETMS | 6,000 |
| 7-18 | GPTMS | PTMDS | PTMS | 18,000 |
| 7-19 | GPTMS | MTMDS | MTMS | 457,000 |
| 7-20 | GPTMS | MAPTMDS | MAPTMS | 16,000 |
| 7-21 | MAPTMS | ECHETMDS | ECHETMS | 97,000 |
| 7-22 | MAPTMS | PTMDS | PTMS | 951,000 |
| 7-23 | MAPTMS | MTMDS | MTMS | 15,000 |
| 7-24 | MAPTMS | GPTMDS | GPTMS | 12,000 |

Example 8

Synthesis of D-A-B-A-D Structure Composite Silsesquioxane Polymer

The following examples were carried out to prepare composite polymers of D-A-B-A-D structure, and coating compositions were prepared by methods equivalent to the above Example 1.

[Example 8-a] pH Conversion Reaction for Production of Excess D Structure

15 Parts by weight of 0.36 wt % HCl aqueous solution were very slowly added to the mixture solution of Example 7-d of which the reaction was in progress, to adjust pH to acidic condition, and stirred at the temperature of 4° C. for 30 min. Thereafter, diphenyltetramethoxydisiloxane was prepared in an amount of 25 parts by weight which was 5 times of Example 7-e and dropwise added at a time, and after one-hour stirring, 20 parts by weight of the catalyst prepared in Example 7-a were added again to adjust the pH of the mixture solution to basic condition. After the reaction was complete, the temperature was changed into a room temperature, tetrahydrofuran in the mixture solution was eliminated using vacuum to convert the whole reactants into an aqueous mixture. After 4-hour mixing and stirring, a portion was taken and analyzed, and as a result of $^{29}$Si-NMR and $^1$H-NMR analysis, it was confirmed that the amount of alkoxy group present in the B structure was changed into 0.006 mmol/g and repeat units of B and D were introduced at about 5:5 ratio. In addition, the styrene-converted molecular weight was measured as 32,000. Furthermore, although a cage type structure was introduced, there was no molecular weight distribution for a single cage type substance in the GPC forms of the polymer, and it was thus confirmed that the cage type structure was well incorporated into the polymer chain via successive reaction.

$^1$H-NMR (CDCl$_3$) δ 7.5, 7.2, 3.7, 3.4, 3.3(broad), 3.1, 2.8, 2.6, 1.5(broad), 0.6. $^{29}$Si-NMR (CDCl$_3$) δ −72.5(broad), −81.1(sharp), −80.8(sharp), −79.9(sharp), −82.5(broad)

[Example 8-b] Incorporation of X into B Structure

The organic layer of the outcome obtained in the above Example 8-a was prepared without any separate purification and then its terminal was converted into a cage structure using a 3-functional monomer. 100 parts by weight of the substance obtained in Example 8-a were dissolved in 50 parts by weight of tetrahydrofuran and then 5 parts by weight of distilled water were added thereto to prepare a mixture solution. Thereafter, 10 parts by weight of 0.36 wt % HCl were added to the prepared mixture solution and stirred for 10 min and then, 3 parts by weight of methyltrimethoxysilane were dropwise added at a time to achieve stable hydrolysis. After 24-hour stirring, 3 parts by weight of the catalyst prepared in Example 7-a were added again to adjust the pH of the mixture solution to basic condition. In this process, a cage type polymer was incorporated into X portion of B structure, and reaction continued successively in the reactor to form a polymer such as chemical formula 8. However, since other by-products were obtained altogether, separate purification was needed. Thereafter, the temperature was changed into a room temperature, and tetrahydrofuran in the mixture solution was eliminated using vacuum to prepare purification.

[Example 8-c] Removal of By-products and Yield of Outcome Through Precipitation and Recrystallization 200 Parts by weight of methylenechloride were added to the mixture of which the reaction was complete in the above Example 8-b, were subject to fractionation wash along with distilled water, and when the pH of distilled water layer indicated neutral, the solvent was completely eliminated using vacuum under a reduced pressure. Thereafter, the product was precipitated twice in methanol to remove unreacted monomers, and after 30 parts by weight were dissolved in a solvent where tetrahydrofuran and aqueous solution were mixed at a weight ratio of 9.5:0.5, it was stored at the temperature of −20° C. for two days. This was done to make purification easy by promoting the recrystallization of the substances which were not incorporated into the polymer and were closed as a cage structure.

After the filtration of the solid substances obtained after the recrystallization process, it was confirmed that the polymer of chemical formula 8 was obtained without several by-products using vacuum under a reduced pressure. In addition, when comparing GPC results and NMR results, it was confirmed, from the fact that a cage type in a sharp form was obtained as an outcome without any low molecules obtained alone from the growth of the polymers of each step, that a composite polymer could be obtained without any problems. This time, the molecular weight was 36,000 in styrene conversion value, n value of X was 4-6, n value of Y was 4-6, and in particular, the result of chemical formula 8 is as follows.

$^{29}$Si-NMR (CDCl$_3$) δ−72.5(broad), −81.1(sharp), −80.8(sharp), −79.9(sharp), −81.5(sharp), −82.5(broad)

Further, silsesquioxane composite polymers were prepared by applying monomers listed in the following Table 26, and coating compositions were prepared therefrom. The methods used in the above Example 8 were equally applied for the preparation thereof.

TABLE 26

| | Method | | | |
|---|---|---|---|---|
| No. | Monomer applied in method 7-b, c | Monomer applied in method 8-a | Monomer applied in method 8-b | Molecular weight (Mw) |
| 8 | ECHETMS | PTMDS | MTMS | 36,000 |
| 8-1 | PTMS | PTMDS | PTMS | 14,000 |
| 8-2 | MTMS | MTMDS | MTMS | 18,000 |
| 8-3 | GPTMS | GPTMDS | GPTMS | 27,000 |
| 8-4 | MAPTMS | MAPTMDS | MAPTMS | 19,500 |
| 8-5 | ECHETMS | ECHETMDS | ECHETMS | 19,500 |
| 8-6 | ECHETMS | MTMDS | MTMS | 58,000 |
| 8-7 | ECHETMS | GPTMDS | GPTMS | 19,000 |
| 8-8 | ECHETMS | MAPTMDS | MAPTMS | 12,000 |
| 8-9 | PTMS | ECHETMDS | ECHETMS | 53,000 |
| 8-10 | PTMS | MTMDS | MTMS | 113,000 |
| 8-11 | PTMS | GPTMDS | GPTMS | 42,000 |
| 8-12 | PTMS | MAPTMDS | MAPTMS | 173,000 |
| 8-13 | MTMS | ECHETMDS | ECHETMS | 19,000 |
| 8-14 | MTMS | PTMDS | PTMS | 45,000 |
| 8-15 | MTMS | GPTMDS | GPTMS | 32,000 |
| 8-16 | MTMS | MAPTMDS | MAPTMS | 34,000 |
| 8-17 | GPTMS | ECHETMDS | ECHETMS | 12,000 |
| 8-18 | GPTMS | PTMDS | PTMS | 24,000 |
| 8-19 | GPTMS | MTMDS | MTMS | 486,000 |
| 8-20 | GPTMS | MAPTMDS | MAPTMS | 32,000 |
| 8-21 | MAPTMS | ECHETMDS | ECHETMS | 181,000 |
| 8-22 | MAPTMS | PTMDS | PTMS | 981,000 |
| 8-23 | MAPTMS | MTMDS | MTMS | 21,000 |
| 8-24 | MAPTMS | GPTMDS | GPTMS | 20,000 |

Example 9

Synthesis of E-A-B-A-D Structure Composite Silsesquioxane Polymer

The following examples were carried out to prepare composite polymers of E-A-B-A-D structure, and a coating composition was prepared by methods equivalent to the above Example 1.

[Example 9-a] Production of Chain Terminal E Structure

20 Parts by weight of methylenechloride were dropwise added to the mixture obtained in Example 7-g without separate purification, 5 parts by weight of 0.36 wt % HCl aqueous solution were dropwise added to adjust pH to acidic condition, and the mixture was stirred at the temperature of 4° C. for 30 min. Thereafter, 1 part by weight of dimethyltetramethoxysilane was dropwise added at a time. In the process, portions which were not yet hydrolyzed in the molecular structure were easily converted into hydrolysates in an acidic aqueous solution layer separated from the solvent and condensed with the produced separate reactants in the organic solvent layer to incorporate E into the terminal unit. After 5-hour stirring, the stirring of the reaction was ceased and the temperature of the reactor was adjusted to a room temperature.

[Example 9-b] Cage Incorporation into X of B Structure and Terminal E Structure

The organic layer of the outcome obtained in the above Example 9-a was prepared without any separate purification and then its terminal was converted into a cage structure using a 3-functional monomer. 3 parts by weight of methyltrimethoxysilane were dropwise added at a time to the mixture solution of Example 9-a of which the reaction was in progress, to achieve stable hydrolysis. After 24-hour stirring, 3 parts by weight of the catalyst prepared in Example 7-a were added again to adjust the pH of the mixture solution to basic condition. In this process, a cage type polymer was incorporated into the terminal of E structure, and reaction continued successively in the reactor to form a polymer such as chemical formula 9. However, since other by-products were obtained altogether, separate purification was needed. Thereafter, the temperature was changed into a room temperature, and tetrahydrofuran in the mixture solution was eliminated using vacuum to prepare purification.

[Example 9-c] Removal of By-products and Yield of Outcome Through Precipitation and Recrystallization After the mixture of which the reaction was complete in the above Example 9-b was obtained, it was washed with distilled water, and when the pH of distilled water layer indicated neutral, the solvent was completely eliminated using vacuum under a reduced pressure. Thereafter, the product was precipitated twice in methanol to remove unreacted monomers, and after 30 parts by weight were dissolved in a solvent where tetrahydrofuran and aqueous solution were mixed at a weight ratio of 9.5:0.5, it was stored at the temperature of −20° C. for two days. This was done to make purification easy by promoting the recrystallization of the substances which were not incorporated into the polymer and were closed as a cage structure.

After the filtration of the solid substances obtained after the recrystallization process, it was confirmed that the polymer of chemical formula 9 was obtained without several by-products using vacuum under a reduced pressure. In addition, when comparing GPC results and NMR results, it was confirmed, from the fact that a cage type in a sharp form was obtained as an outcome without any low molecules obtained alone from the growth of the polymers of each step, that a composite polymer could be obtained without any problems. This time, the molecular weight was 28,000 in styrene conversion value, n value of X was 4-6, and n value of Y was 4-6.

Further, silsesquioxane composite polymers were prepared by applying monomers listed in the following Table 27. The methods used in the above Example 9 were equally applied for the preparation thereof.

TABLE 27

| | Method | | | | |
|---|---|---|---|---|---|
| No. | Monomer applied in method 7-b, c | Monomer applied in method 7-e | Monomer applied in method 9-a | Monomer applied in method 9-b | Mw |
| 9 | ECHETMS | PTMDS | MTMDS | MAPTMS | 28,000 |
| 9-1 | ECHETMS | ECHETMDS | ECHETMDS | ECHETMS | 24,000 |
| 9-2 | PTMS | PTMDS | PTMDS | PTMS | 21,000 |
| 9-3 | MTMS | MTMDS | MTMDS | MTMS | 36,000 |
| 9-4 | GPTMS | ECHETMDS | GPTMDS | GPTMS | 62,000 |
| 9-5 | MAPTMS | MAPTMDS | MAPTMDS | MAPTMS | 153,000 |
| 9-6 | ECHETMS | ECHETMDS | PTMDS | PTMS | 24,000 |
| 9-7 | ECHETMS | ECHETMDS | MTMDS | MTMS | 19,000 |
| 9-8 | ECHETMS | ECHETMDS | GPTMDS | GPTMS | 26,000 |
| 9-9 | ECHETMS | ECHETMDS | MAPTMDS | MAPTMS | 99,000 |
| 9-10 | ECHETMS | PTMDS | ECHETMDS | ECHETMS | 21,000 |
| 9-11 | ECHETMS | MTMDS | ECHETMDS | ECHETMS | 142,000 |
| 9-12 | ECHETMS | GPTMDS | ECHETMDS | ECHETMS | 70,000 |
| 9-13 | ECHETMS | MAPTMDS | ECHETMDS | ECHETMS | 72,000 |
| 9-14 | PTMS | PTMDS | ECHETMDS | ECHETMS | 15,000 |
| 9-15 | PTMS | PTMDS | MTMDS | MTMS | 51,000 |
| 9-16 | PTMS | PTMDS | ECHETMDS | ECHETMS | 85,000 |
| 9-17 | PTMS | PTMDS | MAPTMDS | MAPTMS | 95,000 |
| 9-18 | PTMS | ECHETMDS | PTMDS | PTMS | 160,000 |
| 9-19 | PTMS | MTMDS | PTMDS | PTMS | 240,000 |
| 9-20 | PTMS | GPTMDS | PTMDS | PTMS | 56,000 |
| 9-21 | PTMS | MAPTMDS | PTMDS | PTMS | 71,000 |
| 9-22 | MTMS | MTMDS | ECHETMDS | ECHETMS | 81,000 |
| 9-23 | MTMS | MTMDS | PTMDS | PTMS | 63,000 |
| 9-24 | MTMS | MTMDS | GPTMDS | GPTMS | 121,000 |
| 9-25 | MTMS | MTMDS | MAPTMDS | MAPTMS | 153,000 |
| 9-26 | MTMS | ECHETMDS | MTMDS | MTMS | 82,000 |
| 9-27 | MTMS | PTMDS | MTMDS | MTMS | 63,000 |
| 9-28 | MTMS | GPTMDS | MTMDS | MTMS | 310,000 |
| 9-29 | MTMS | MAPTMDS | MTMDS | MTMS | 125,000 |
| 9-30 | GPTMS | GPTMDS | ECHETMDS | ECHETMS | 97,000 |
| 9-31 | GPTMS | GPTMDS | PTMDS | PTMS | 45,000 |
| 9-32 | GPTMS | GPTMDS | MTMDS | MTMS | 61,000 |
| 9-33 | GPTMS | GPTMDS | MAPTMDS | MAPTMS | 52,000 |
| 9-34 | GPTMS | ECHETMDS | GPTMDS | GPTMS | 37,000 |
| 9-35 | GPTMS | PTMDS | GPTMDS | GPTMS | 365,000 |
| 9-36 | GPTMS | MTMDS | GPTMDS | GPTMS | 85,000 |
| 9-37 | GPTMS | MAPTMDS | GPTMDS | GPTMS | 75,000 |
| 9-38 | MAPTMS | MAPTMDS | ECHETMDS | ECHETMS | 144,000 |
| 9-39 | MAPTMS | MAPTMDS | PTMDS | PTMS | 85,000 |
| 9-40 | MAPTMS | MAPTMDS | MTMDS | MTMS | 60,000 |
| 9-41 | MAPTMS | MAPTMDS | GPTMDS | GPTMS | 53,000 |
| 9-42 | MAPTMS | ECHETMDS | MAPTMDS | MAPTMS | 12,000 |
| 9-43 | MAPTMS | PTMDS | MAPTMDS | MAPTMS | 10,000 |
| 9-44 | MAPTMS | MTMDS | MAPTMDS | MAPTMS | 32,000 |
| 9-45 | MAPTMS | GPTMDS | MAPTMDS | MAPTMS | 231,000 |

[Experiment Example] Warpage Measurement

Figure 6:
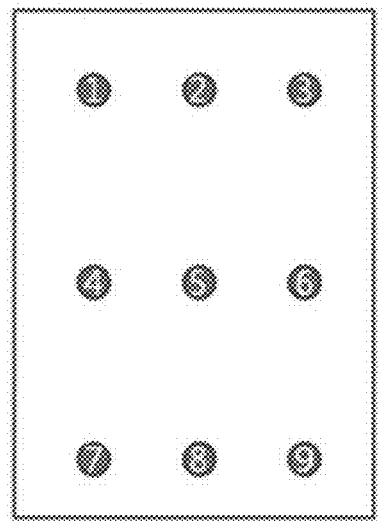
FIG. 6 shows virtual reference points of the coated surface which was used to measure warpage in the present invention.

Warpage prevention characteristics were evaluated with regard to plastic PC (i-components Co, Glastic 0.5T), glass (Asahi, soda lime 0.5T) and natural timber (Wood and Human Douglas fir) substrates, and the results are shown in Table 28 (plastic), Table 29 (glass) and Table 30 (Timber), respectively. In Table 28 to 30, "two-layered" configuration has a structure as shown in FIG. 2, "four-layered" configuration has a structure as shown in FIG. 5, and "both-sided" configuration has a structure as shown in FIG. 3. With regard to the coating thickness, in case of a single layer, it was coated to the thickness of 10 um, in case of two or more layers, each layer was coated to 5 um (in case of two layers, the whole thickness was 10 um, and in case of four layers, it was 20 um), and in case of both sides, each layer was coated to the thickness of 10 um. The evaluation method was carried out using a 3-dimensional warpage measuring device to measure a degree of warpage, and as shown in FIG. 6, the whole surface was divided into 9 pieces, the points of numbers 1, 3, 7, and 9 were designated as virtual reference planes, and then heights at all the points from 1 through 9 were measured. The maximum (+height) and minimum (−height) values between the reference planes and distant points were obtained and listed. Negative values in warpage refer to bending-down and positive values refer to bending-over.

In the following Tables 28 to 30, Example 1 to Example 9 refer to the thermosetting coating compositions prepared in Examples 1 and 9, respectively, and "single" refers to a single layer, "two-layered" configuration was laminated as shown in FIG. 2, in which the first listed layer is a first coating layer of the substrate of FIG. 2, and the later listed layer is a second coating layer, "four-layered" configuration was laminated as shown in FIG. 5, in which the listed layers are a first coating layer, a second coating layer, a third coating layer, and a fourth coating layer in order, and "both-sided" configuration was laminated as shown in FIG. 3, in which the first listed coating layer is a first coating layer and the later listed coating layer is a second coating layer.

TABLE 28

(Plastic substrate)

| Coating layer No | Coating layer configuration | Warpage measurement (mm) |
|---|---|---|
| 1 | Example 1 (single) | 0.401 |
| 2 | Example 2 (single) | 0.310 |
| 3 | Example 3 (single) | 0.300 |
| 4 | Example 4 (single) | 0.502 |
| 5 | Example 5 (single) | −0.525 |
| 6 | Example 6 (single) | −0.301 |
| 7 | Example 7 (single) | −0.505 |
| 8 | Example 8 (single) | −0.355 |
| 9 | Example 9 (single) | −0.404 |
| 10 | Example 1 + Example 9 (two-layered) | 0.150 |
| 11 | Example 2 + Example 8 (two-layered) | 0.195 |
| 12 | Example 3 + Example 7 (two-layered) | 0.181 |
| 13 | Example 4 + Example 6 (two-layered) | 0.160 |
| 14 | Example 5 + Example 1 (two-layered) | 0.181 |
| 15 | Example 6 + Example 2 (two-layered) | 0.138 |
| 16 | Example 7 + Example 3 (two-layered) | 0.145 |
| 17 | Example 8 + Example 6 (two-layered) | 0.161 |
| 18 | Example 9 + Example 5 (two-layered) | 0.181 |
| 19 | Example 1 + Example 5 + Example 4 + Example 6 (four-layered) | 0.088 |
| 20 | Example 2 + Example 6 + Example 8 + Example 4 (four-layered) | 0.080 |
| 21 | Example 3 + Example 7 + Example 5 + Example 2 (four-layered) | 0.093 |
| 22 | Example 4 + Example 8 + Example 6 + Example 9 (four-layered) | 0.070 |
| 23 | Example 5 + Example 9 + Example 2 + Example 7 (four-layered) | 0.065 |
| 24 | Example 6 + Example 1 + Example 3 + Example 5 (four-layered) | 0.085 |
| 25 | Example 7 + Example 2 + Example 5 + Example 3 (four-layered) | 0.081 |
| 26 | Example 8 + Example 3 + Example 7 + Example 1 (four-layered) | 0.051 |
| 27 | Example 9 + Example 4 + Example 1 + Example 8 (four-layered) | 0.055 |
| 28 | Example 1 + Example 9 (both-sided) | 0.008 |
| 29 | Example 2 + Example 8 (both-sided) | 0.010 |
| 30 | Example 3 + Example 7 (both-sided) | 0.011 |
| 31 | Example 4 + Example 6 (both-sided) | 0.008 |
| 32 | Example 5 + Example 1 (both-sided) | 0.001 |
| 33 | Example 6 + Example 2 (both-sided) | 0.005 |
| 34 | Example 7 + Example 3 (both-sided) | 0.003 |
| 35 | Example 8 + Example 6 (both-sided) | 0.007 |
| 36 | Example 9 + Example 5 (both-sided) | 0.012 |

TABLE 29

(Glass substrate)

| Coating layer No | Coating layer configuration | Warpage measurement (mm) |
|---|---|---|
| 1 | Example 1 (single) | 0.201 |
| 2 | Example 2 (single) | 0.160 |
| 3 | Example 3 (single) | 0.180 |
| 4 | Example 4 (single) | 0.152 |
| 5 | Example 5 (single) | −0.255 |
| 6 | Example 6 (single) | −0.151 |
| 7 | Example 7 (single) | −0.205 |
| 8 | Example 8 (single) | −0.175 |
| 9 | Example 9 (single) | −0.104 |
| 10 | Example 1 + Example 9 (two-layered) | 0.115 |
| 11 | Example 2 + Example 8 (two-layered) | 0.114 |
| 12 | Example 3 + Example 7 (two-layered) | 0.104 |
| 13 | Example 4 + Example 6 (two-layered) | 0.103 |
| 14 | Example 5 + Example 1 (two-layered) | 0.113 |
| 15 | Example 6 + Example 2 (two-layered) | 0.115 |
| 16 | Example 7 + Example 3 (two-layered) | 0.108 |
| 17 | Example 8 + Example 6 (two-layered) | 0.112 |
| 18 | Example 9 + Example 5 (two-layered) | 0.114 |
| 19 | Example 1 + Example 5 + Example 4 + Example 6 (four-layered) | 0.008 |
| 20 | Example 2 + Example 6 + Example 8 + Example 4 (four-layered) | 0.007 |
| 21 | Example 3 + Example 7 + Example 5 + Example 2 (four-layered) | 0.006 |
| 22 | Example 4 + Example 8 + Example 6 + Example 9 (four-layered) | 0.006 |
| 23 | Example 5 + Example 9 + Example 2 + Example 7 (four-layered) | 0.005 |
| 24 | Example 6 + Example 1 + Example 3 + Example 5 (four-layered) | 0.008 |
| 25 | Example 7 + Example 2 + Example 5 + Example 3 (four-layered) | 0.007 |
| 26 | Example 8 + Example 3 + Example 7 + Example 1 (four-layered) | 0.007 |
| 27 | Example 9 + Example 4 + Example 1 + Example 8 (four-layered) | 0.006 |
| 28 | Example 1 + Example 9 (both-sided) | 0.001 |
| 29 | Example 2 + Example 8 (both-sided) | 0.002 |
| 30 | Example 3 + Example 7 (both-sided) | 0.002 |

TABLE 29-continued (Glass substrate)

| Coating layer No | Coating layer configuration | Warpage measurement (mm) |
|---|---|---|
| 31 | Example 4 + Example 6 (both-sided) | 0.002 |
| 32 | Example 5 + Example 1 (both-sided) | 0.001 |
| 33 | Example 6 + Example 2 (both-sided) | 0.002 |
| 34 | Example 7 + Example 3 (both-sided) | 0.001 |
| 35 | Example 8 + Example 6 (both-sided) | 0.002 |
| 36 | Example 9 + Example 5 (both-sided) | 0.002 |

TABLE 30

(Timber substrate)

| Coating layer No | Coating layer configuration | Warpage measurement (mm) |
|---|---|---|
| 1 | Example 1 (single) | 0.311 |
| 2 | Example 2 (single) | 0.350 |
| 3 | Example 3 (single) | 0.300 |
| 4 | Example 4 (single) | 0.352 |
| 5 | Example 5 (single) | −0.355 |
| 6 | Example 6 (single) | −0.451 |
| 7 | Example 7 (single) | −0.325 |
| 8 | Example 8 (single) | −0.305 |
| 9 | Example 9 (single) | −0.354 |
| 10 | Example 1 + Example 9 (two-layered) | 0.180 |
| 11 | Example 2 + Example 8 (two-layered) | 0.175 |
| 12 | Example 3 + Example 7 (two-layered) | 0.191 |
| 13 | Example 4 + Example 6 (two-layered) | 0.170 |
| 14 | Example 5 + Example 1 (two-layered) | 0.191 |
| 15 | Example 6 + Example 2 (two-layered) | 0.165 |
| 16 | Example 7 + Example 3 (two-layered) | 0.175 |
| 17 | Example 8 + Example 6 (two-layered) | 0.171 |
| 18 | Example 9 + Example 5 (two-layered) | 0.175 |
| 19 | Example 1 + Example 5 + Example 4 + Example 6 (four-layered) | 0.012 |
| 20 | Example 2 + Example 6 + Example 8 + Example 4 (four-layered) | 0.011 |
| 21 | Example 3 + Example 7 + Example 5 + Example 2 (four-layered) | 0.010 |
| 22 | Example 4 + Example 8 + Example 6 + Example 9 (four-layered) | 0.011 |
| 23 | Example 5 + Example 9 + Example 2 + Example 7 (four-layered) | 0.012 |
| 24 | Example 6 + Example 1 + Example 3 + Example 5 (four-layered) | 0.013 |
| 25 | Example 7 + Example 2 + Example 5 + Example 3 (four-layered) | 0.013 |
| 26 | Example 8 + Example 3 + Example 7 + Example 1 (four-layered) | 0.012 |
| 27 | Example 9 + Example 4 + Example 1 + Example 8 (four-layered) | 0.011 |
| 28 | Example 1 + Example 9 (both-sided) | 0.006 |
| 29 | Example 2 + Example 8 (both-sided) | 0.007 |
| 30 | Example 3 + Example 7 (both-sided) | 0.006 |
| 31 | Example 4 + Example 6 (both-sided) | 0.005 |
| 32 | Example 5 + Example 1 (both-sided) | 0.002 |
| 33 | Example 6 + Example 2 (both-sided) | 0.004 |
| 34 | Example 7 + Example 3 (both-sided) | 0.006 |
| 35 | Example 8 + Example 6 (both-sided) | 0.002 |
| 36 | Example 9 + Example 5 (both-sided) | 0.005 |

As shown in the above Tables 28 to 30, the warpage preventing substrates of the present invention showed a significantly enhanced excellent warpage prevention property if the laminate materials were suitably controlled. In particular, in the case of both-sided coating, it showed a remarkably excellent warpage prevention property.

In addition, the above Tables 28 to 30 showed the measurement results of the thermosetting coating compositions only, but the photosetting resin compositions also showed equal results to the thermosetting resin compositions.

Surface hardness measurement: The coating films were scratched by moving a pencil 10 mm horizontally at the speed of 0.5 mm/sec. at 45 degree angle to the coated surface with 1 kgf load which is more harsh condition than 750 g load which is generally used in the pencil hardness method (JIS 5600-5-4), and they were evaluated with scratch marks. If scratch marks of 3 mm or above were not found twice or more out of 5 experiments, a pencil of higher hardness was selected and then evaluated, and if scratch marks were twice or more, a pencil of one lower level than the hardness of the pencil was selected and evaluated as the pencil hardness of the given coating film, and they were listed in Table 21 below. Evaluation results showed that 9H hardness of a glass level was all observed at the coating thickness of 10 um or higher regardless of the type of the substrates.

Scratch test measurement (JIS K5600-5-9): Whereas a sample is rubbed back and forth 15 times by steel wool of #0000 which is wound up the tip of a sledgehammer of about 1 kg weight and its haze value is measured in a typical abrasion assessment by steel wool, this evaluation used more harsh conditions under which the samples were rubbed by steel wool for 400 times to measure their haze values and visually inspected with a microscopy. As a result, if haze increase was 0.05% or more increased, it was determined "failure." The coatings having the coating thickness of 5 um or above had all excellent resistance against scratch occurring at the surfaces.

Adhesive strength evaluation (JIS K5600-5-6): The coating film was scratched with a cutter blade at 1-5 mm intervals, a cellophane tape was attached thereonto and then the attached tape was pulled off. In this procedure, the number of corning off was used to determine adhesion. The adhesion was evaluated by the number of spaces that came off out of the 100 spaces formed by a cutter blade, and the results are shown in Table 31 below. They were designated by the number of grids which did not come off out of 100 grids "(the number of not being come off/100)," and for example, if 100 grids did not come off, it was designated "(100/100)." The adhesion was confirmed to be extremely superior.

Transmittance ((ASTM D1746): The total light transmittance of the incident light was measured using a UV/vis spectroscopy.

Contact angle: After a water drop was dropwise added on the surface of the sample, the contact angle against the water drop was measured after 1 min using a contact angle measuring device (DSA100 of KRUSS Co.). The contact angles were measured five times per sample and its average values were used.

TABLE 31

| Evaluation items | PC | | | | | Glass | | |
| --- | --- | --- | --- | --- | --- | --- | --- | --- |
| | Before coating | After coating | | | | Before coating | After coating | |
| | | Single | Two-layered | Four-layered | Both-sided | | Single | Two-layered |
| Surface hardness(1 Kgf) (No. of success/ attempts) | 6B 이하 | 9H (5/5) | 9H (5/5) | 9H (5/5) | 9H (5/5) | 9H | 9H (5/5) | 9H (5/5) |
| Adhesive strength (PASS-100/100) | — | pass | pass | pass | pass | — | pass | pass |
| Transmittance (%) UV-Vis | 89.2 | 88.5 | 88.5 | 88.5 | 88.4 | 92.3 | 91.8 | 91.7 |
| Scratch test (Steel wool, 1 kgfload, 400 times) | fail | pass | pass | pass | pass | — | pass | pass |
| Haze (%) | 0.15 | 0.12 | 0.11 | 0.09 | 0.03 | 0.01 | 0.05 | 0.08 |
| Contact angle (°)(D₂0) | 31 | 111 | 110 | 113 | 113 | 25 | 113 | 110 |

| Evaluation items | Glass | | Timber | | | | |
| --- | --- | --- | --- | --- | --- | --- | --- |
| | After coating | | Before coating | After coating | | | |
| | Four-layered | Both-sided | | Single | Two-layered | Four-layered | Both-sided |
| Surface hardness(1 Kgf) (No. of success/ attempts) | 9H (5/5) | 9H (5/5) | | 9H (5/5) | 9H (5/5) | 9H (5/5) | 9H (5/5) |
| Adhesive strength (PASS-100/100) | pass | pass | — | pass | pass | pass | pass |
| Transmittance (%) UV-Vis | 91.8 | 91.9 | — | — | — | — | — |
| Scratch test (Steel wool, 1 kgfload, 400 times) | pass | pass | — | pass | pass | pass | pass |
| Haze (%) | 0.01 | 0.01 | — | — | — | — | — |
| Contact angle (°)(D₂0) | 112 | 111 | Invasive | 110 | 111 | 113 | 112 |

As shown in the above Table 31, the coating layers of the warpage preventing substrates of the present invention showed excellent physical properties, and even in the case of four-layered lamination, it did not get loose due to excellent adhesion between the coating layers.

What is claimed is:

1. A coating method for preventing substrate warpage comprising forming two or more coating layers by coating the surface of a substrate with coating compositions having different densities, wherein at least one layer of the two or more coating layers is coated and cured with a coating composition containing a silsesquioxane composite polymer represented by any one of the following chemical formulae 1 to 9:

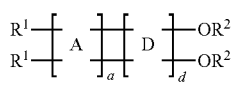

[Chemical formula 1]

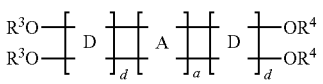

[Chemical formula 2]

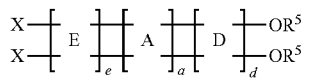

[Chemical formula 3]

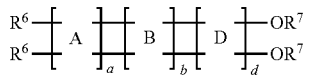

[Chemical formula 4]

-continued

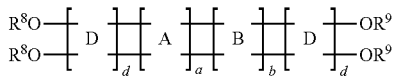
[Chemical formula 5]

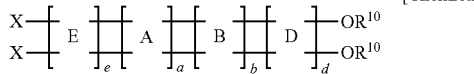
[Chemical formula 6]

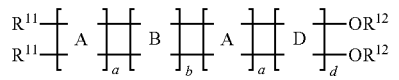
[Chemical formula 7]

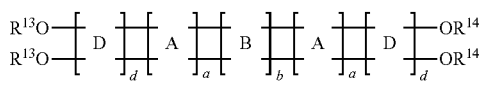
[Chemical formula 8]

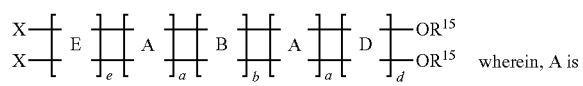
[Chemical formula 9]

wherein, A is

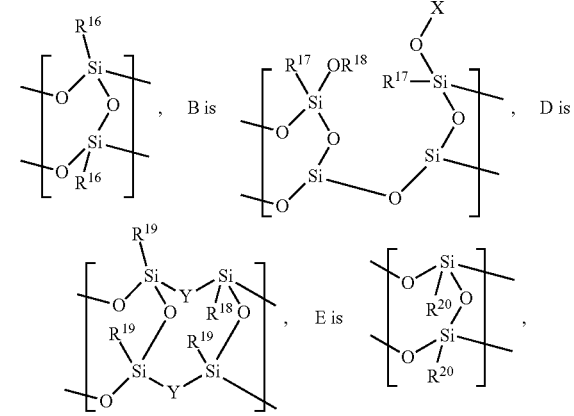

Y is each independently O, $NR^{21}$ or $[(SiO_{3/2}R)_{4+2n}O]$, with the proviso that at least one is $[(SiO_{3/2}R)_{4+2n}O]$,
X is each independently $R^{22}$ or $[(SiO_{3/2}R)_{4+2n}R]$, with the proviso that at least one is $[(SiO_{3/2}R)_{4+2n}R]$,
R, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ are each independently hydrogen; deuterium; halogen; amine group; epoxy group; cyclohexylepoxy group; (meth) acryl group; thiol group; isocyanate group; nitrile group; nitro group; phenyl group; alkyl group of $C_1$~$C_{40}$; alkenyl group of $C_2$~$C_{40}$; alkoxy group of $C_1$~$C_{40}$; cycloalkyl group of $C_3$~$C_{40}$; heterocycloalkyl group of $C_3$~$C_{40}$; aryl group of $C_6$~$C_{40}$; heteroaryl group of $C_3$~$C_{40}$; aralkyl group of $C_3$~$C_{40}$; aryloxy group of $C_3$~$C_{40}$; or arylthiol group of $C_3$~$C_{40}$ unsubstituted or substituted by deuterium, halogen, amine group, epoxy group, (meth)acryl group, thiol group, isocyanate group, nitrile group, nitro group, or phenyl group, a and d are each independently an integer of 1 to 100,000,
b is each independently an integer of 1 to 500,
e is each independently 1 to 2, and
n is each independently an integer of 1 to 20.

2. The coating method for preventing substrate warpage of claim 1, wherein the substrate is plastic, glass, metal thin film, timber or pulp.

3. The coating method for preventing substrate warpage of claim 2, wherein the plastic is one or more selected from the group consisting of polyethylene (PE), polypropylene (PP), polystyrene (PS), polyethylene terephthalate (PET), polyamide (PA), polyester (PES), polyvinyl chloride (PVC), polyurethane (PU), polycarbonate (PC), polyvinylidene chloride (PVDC), polytetrafluoroethylene (PTFE), polyetheretherketone (PEEK), and polyetherimide (PEI).

4. The coating method for preventing substrate warpage of claim 1, wherein the coating thickness of each of the coating layers is 0.01 to 500 um.

5. The coating method for preventing substrate warpage of claim 1, wherein a is 3 to 1000, b is 1 to 500, and d is 1 to 500.

6. The coating method for preventing substrate warpage of claim 1, wherein the weight average molecular weight of the silsesquioxane composite polymer is 1,000 to 1,000,000.

7. The coating method for preventing substrate warpage of claim 1, wherein density difference between the coating compositions is at least 0.001 g/cm³ or more.

8. The coating method for preventing substrate warpage of claim 1, wherein the coating layers are formed on the both sides of the substrate.

9. The coating method for preventing substrate warpage of claim 1, wherein the outermost layer of the coating layers is coated and cured with the coating composition containing the silsesquioxane composite polymer represented by any one of the chemical formulae 1 to 9.

10. The coating method for preventing substrate warpage of claim 1, wherein all the coating layers are coated and cured with the coating compositions containing the silsesquioxane composite polymer represented by any one of the chemical formulae 1 to 9 having different densities.

11. The coating method for preventing substrate warpage of claim 1, wherein the coating composition containing the silsesquioxane composite polymer comprises
the silsesquioxane composite polymer represented by any one of the chemical formulae 1 to 9;
an initiator; and
an organic solvent.

12. A warpage preventing substrate comprising two or more coating layers formed by coating its surface with coating compositions having different densities wherein at least one of the coating layers is formed with a coating composition containing a silsesquioxane composite polymer represented by any one of the following chemical formulae 1 to 9:

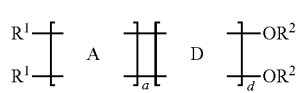
[Chemical formula 1]

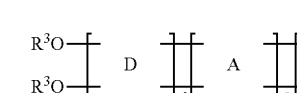
[Chemical formula 2]

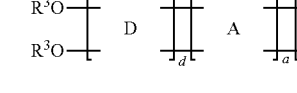
[Chemical formula 3]

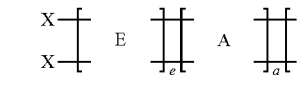
[Chemical formula 5]

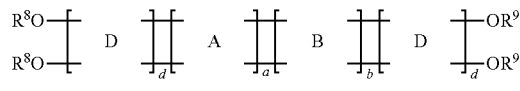

-continued

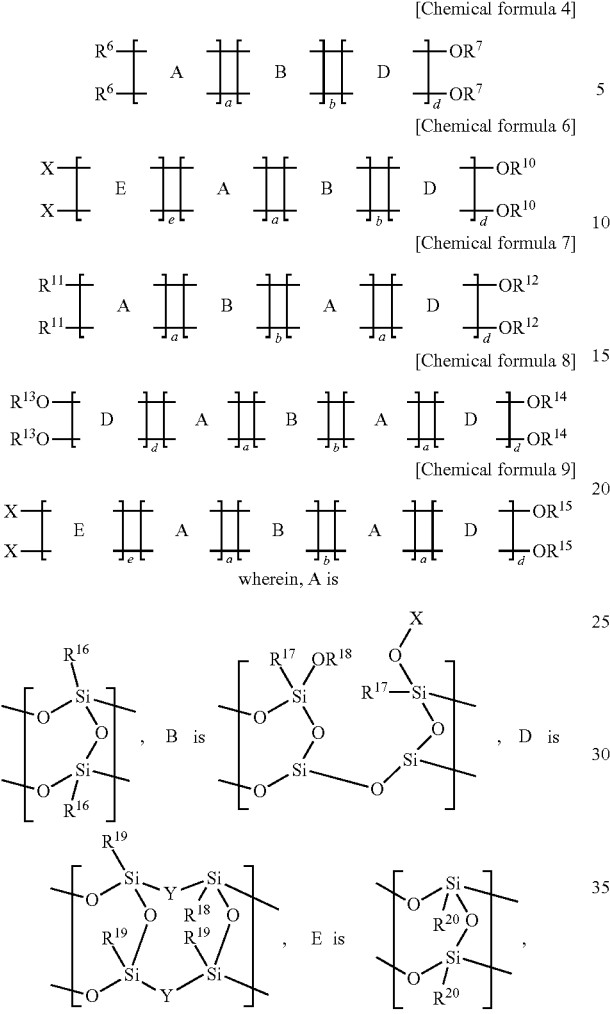

Y is each independently O, $NR^{21}$ or $[(SiO_{3/2}R)_{4+2n}O]$, with the proviso that at least one is $[(SiO_{3/2}R)_{4+2n}O]$, X is each independently $R^{22}$ or $[(SiO_{3/2}R)_{4+2n}R]$, with the proviso that at least one is $[(SiO_{3/2}R)_{4+2n}R]$, R, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ are each independently hydrogen; deuterium; halogen; amine group; epoxy group; cyclohexylepoxy group; (meth) acryl group; thiol group; isocyanate group; nitrile group; nitro group; phenyl group; alkyl group of $C_1$~$C_{40}$; alkenyl group of $C_2$~$C_{40}$; alkyl group of $C_1$~$C_{40}$ cycloalkyl group of $C_3$~$C_{40}$ heterocycloalkyl group of $C_3$~$C_{40}$ aryl group of $C_6$~$C_{40}$ heteroaryl group of $C_3$~$C_{40}$ aralkyl group of $C_3$~$C_{40}$ aryloxy group of $C_3$~$C_{40}$ ; or arylthiol group of $C_3$~$C_{40}$ unsubstituted or substituted by deuterium, halogen, amine group, epoxy group, (meth)acryl group, thiol group, isocyanate group, nitrile group, nitro group, or phenyl group, a and d are each independently an integer of 1 to 100,000, b is each independently an integer of 1 to 500, e is each independently 1 to 2, and n is each independently an integer of 1 to 20.

13. The warpage preventing substrate of claim 12, wherein the warpage preventing substrate is formed by the method described in claim 1.

14. The warpage preventing substrate of claim 12, wherein the substrate is plastic, glass, timber or pulp.

15. An article comprising the warpage preventing substrate described in claim 12.

16. The article of claim 15, wherein the article is a window covering substrate, protective film, or protective plate of display; wood furniture; interior and exterior wooden building materials; wood accessories; wooden public facilities; wall coverings, floorings, tiles, roofings, or windows of buildings or structures; cups, plates, or bowls; semiconductor manufacturing apparatus; cardboard or paper coated products; glass of motor vehicles; glasses; or glass used in optical products, electronics, or solar cells.

* * * * *